United States Patent [19]

Carbonato et al.

[11] 4,280,424

[45] Jul. 28, 1981

[54] HOUSEHOLD TYPE SEWING MACHINE HAVING MICROPROCESSOR CONTROL

[75] Inventors: Gianfranco Carbonato, Turin; Nereo Bianchi, Pavia, both of Italy

[73] Assignee: Necchi S.p.A., Pavia, Italy

[21] Appl. No.: 973,386

[22] Filed: Dec. 26, 1978

[30] Foreign Application Priority Data

Feb. 21, 1978 [IT] Italy .................. 42904 A/78

[51] Int. Cl.³ .......................................... D05B 3/02
[52] U.S. Cl. .......................................... 112/158 E
[58] Field of Search ............ 112/158 E, 158 A, 158 F, 112/158 D, 121.11, 121.12, 121.13; 364/107, 474; 318/567, 663, 603; 66/50 R

[56] References Cited

U.S. PATENT DOCUMENTS

| | | | |
|---|---|---|---|
| 2,906,219 | 9/1959 | Vigorelli | 112/158 A |
| 3,005,136 | 10/1961 | Fluckiger | 112/158 E |
| 3,076,066 | 1/1963 | Caron | 112/158 E |
| 3,081,724 | 3/1963 | Bono | 112/158 A |
| 3,306,242 | 2/1967 | Szostak | 112/158 B |
| 3,356,051 | 12/1967 | Eguchi | 112/158 A |
| 3,512,060 | 5/1970 | Floyd | 318/603 |
| 3,596,618 | 8/1971 | Goldbach et al. | 112/158 B |
| 3,613,608 | 10/1971 | Hinerfeld et al. | 112/121.11 |
| 3,724,404 | 4/1973 | Marsh et al. | 112/158 B |
| 3,752,098 | 8/1973 | Logan et al. | 112/121.12 |
| 3,807,329 | 4/1974 | Daman | 112/158 D |
| 3,834,332 | 9/1974 | Gude | 112/158 A |
| 3,844,139 | 10/1974 | De Cerjat et al. | 66/50 R |
| 3,847,100 | 11/1974 | Garron | 112/158 E |
| 3,872,808 | 3/1975 | Wurst | 112/158 E |
| 3,906,324 | 9/1975 | Smith | 318/567 |
| 3,913,506 | 10/1975 | Adams et al. | 112/121.13 |
| 3,969,912 | 7/1976 | Kouklik | 66/154 A |
| 3,977,338 | 8/1976 | Wurst et al. | 112/158 E X |
| 3,982,491 | 9/1976 | Herzer et al. | 112/121.12 |
| 3,983,370 | 9/1976 | Caspi et al. | 66/50 R X |
| 3,984,745 | 10/1976 | Minalga | 112/158 E X |
| 3,986,466 | 10/1976 | Herzer et al. | 112/121.12 |
| 3,987,739 | 10/1976 | Wurst et al. | 112/158 E |
| 4,005,664 | 2/1977 | Garron | 112/158 E |
| 4,014,275 | 3/1977 | Herr et al. | 112/158 E |
| 4,016,821 | 4/1977 | Minalga | 112/158 E |
| 4,048,932 | 9/1977 | Odermann et al. | 112/158 E |
| 4,051,794 | 10/1977 | Herzer et al. | 112/121.12 |
| 4,055,130 | 10/1977 | Larsen et al. | 112/158 R |
| 4,055,131 | 10/1977 | O'Brien et al. | 112/158 E |
| 4,069,778 | 1/1978 | Kozawa | 112/121.12 |
| 4,072,114 | 2/1978 | Sugiyama et al. | 112/121.12 |
| 4,078,506 | 3/1978 | Sasaki | 112/158 R |
| 4,079,235 | 3/1978 | Froyd et al. | 364/107 |
| 4,086,862 | 5/1978 | Makabe et al. | 112/158 E |
| 4,092,938 | 6/1978 | Coughenour et al. | 112/158 E |
| 4,100,865 | 7/1978 | Landau, Jr. et al. | 112/121.11 |
| 4,103,632 | 8/1978 | Bowles | 112/158 E |
| 4,107,591 | 8/1978 | Herr et al. | 318/663 |
| 4,108,090 | 8/1978 | Landau, Jr. et al. | 112/121.11 |
| 4,108,091 | 8/1978 | Hedstrom | 112/158 E |
| 4,108,093 | 8/1978 | Watanabe et al. | 112/158 E |
| 4,109,597 | 8/1978 | Adams | 112/158 E |
| 4,115,858 | 9/1978 | Kaufman | 364/474 |
| 4,116,144 | 9/1978 | Tanimoto et al. | 112/158 E |
| 4,122,786 | 10/1978 | Tanimoto et al. | 112/158 E |
| 4,123,981 | 11/1978 | Brown | 112/158 E |
| 4,142,473 | 3/1979 | Itoh | 112/158 E |
| 4,144,827 | 3/1979 | Brown | 112/158 E |

FOREIGN PATENT DOCUMENTS

| | | | |
|---|---|---|---|
| 2813220 | 10/1978 | Fed. Rep. of Germany | 112/158 E |
| 45-15713 | 6/1970 | Japan | 112/158 E |
| 47-8675 | 3/1972 | Japan | 112/158 E |
| 341703 | 11/1959 | Switzerland | 112/158 E |

OTHER PUBLICATIONS

"Necchi Silvia Multimatic 584, Maximatic 586, Instructions", 1977.
"Necchi Lydia MK 2, 542–544, Instructions", 1977.
Fr. Gegauf Ltd., "The New Bernina", Nov. 1965, Steckborn TG/Switzerland.
The Singer Co., "Singer Athena 2000 Operator's Guide", 1975.
Machine Design, "A Mechanical View of Electronic Logic", 9-9-76, pp. 129–136.
"Necchi Automatic Supernova Ultra Mark 2, Instructions", Dec. 1959.

*Primary Examiner*—Peter P. Nerbun
*Attorney, Agent, or Firm*—Hubbell, Cohen, Stiefel & Gross

[57] ABSTRACT

An improved household type sewing machine having a needle bar and a feed dog wherein an actuator adjusts the transverse position of the needle bar and the positional displacement of the feed dog in response to control signals provided thereto, in which a microcomputer integrated circuit is provided for controlling the machine in response to keyboard selectable pattern and control information stored in a static memory which is interchangeable with other memory configurations to provide different patterns, such as alphabetic stitch patterns. The keyboard contains a numeric display with each of the patterns having a corresponding numeric equivalent which is displayed on the keyboard to indicate which pattern is selected. The microcomputer is capable of selectively controllably functionally operating on the stored stitch pattern data in response to input control signals from the keyboard for controllably redefining the stored stitch pattern data to selectively create output control signals for the actuator different from the output control signals corresponding to any one of the stored stitch patterns whereby the position of the stitch forming instrumentalities may be selectively varied to redefine a stitch pattern arrangement different from any one of the stored stitch patterns. Thus, for example, a constant stitch density may be maintained for a selected pattern as the length of the pattern is varied by the operator in such a manner that the selected stitch pattern shape may be maintained.

39 Claims, 55 Drawing Figures

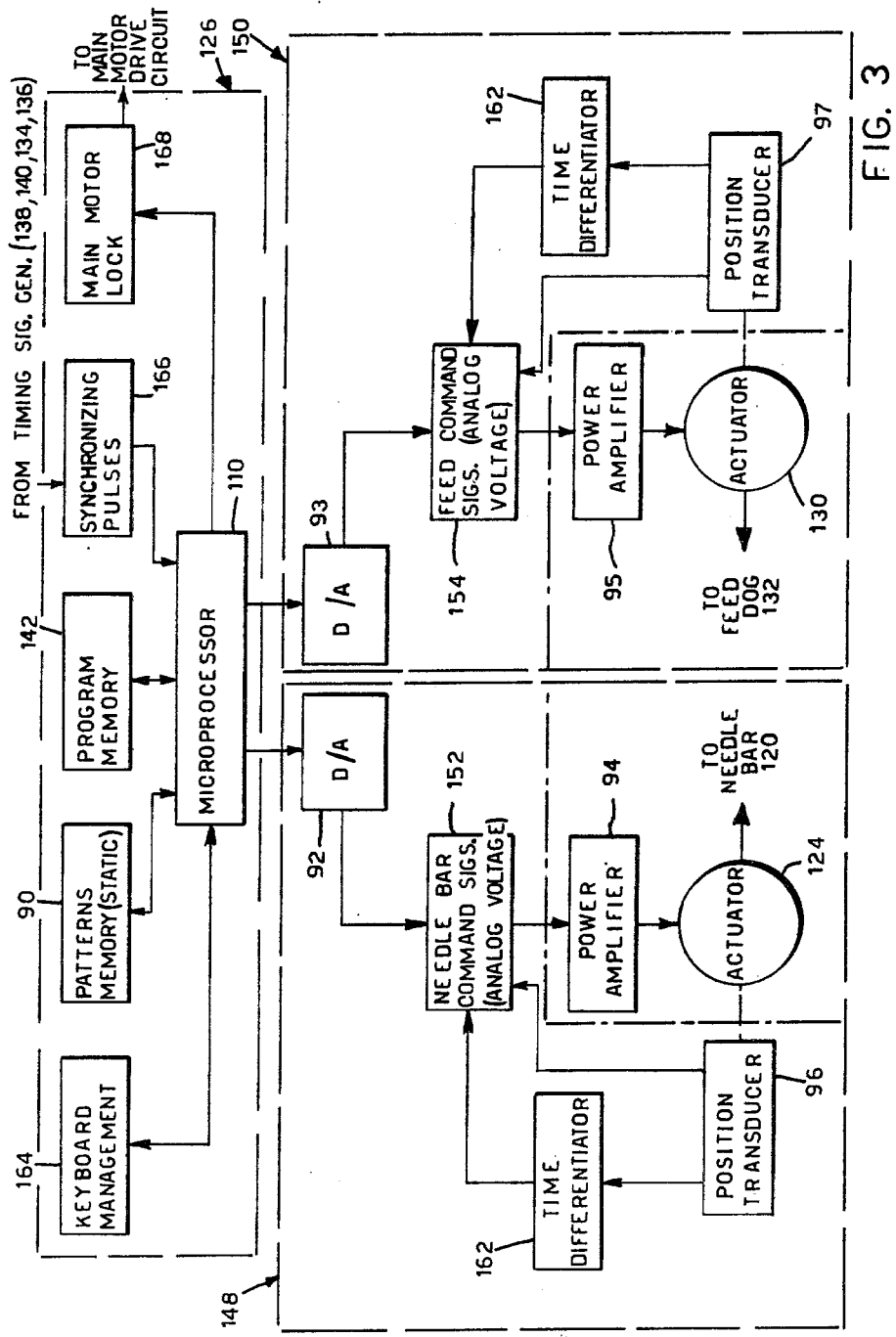

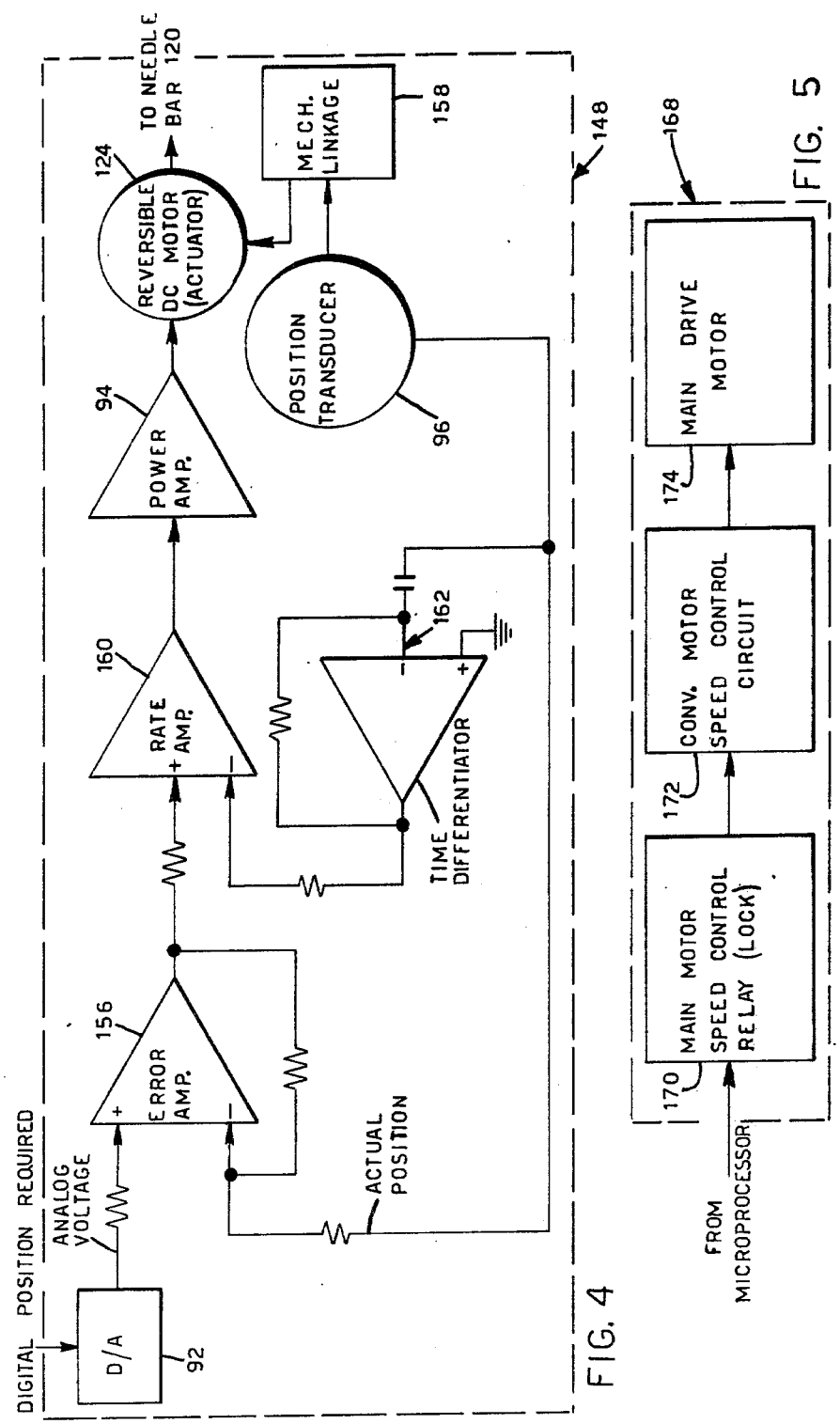

ROUTINE OF MANAGEMENT OF THE KEY: "ZIG-ZAG"

ROUTINE OF MANAGEMENT OF THE KEY: "TACKING"

PATTERN NO. 3
PATTERN NO. 4
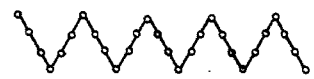
PATTERN NO. 17
PATTERN NO. 18
PATTERN NO. 19
PATTERN NO. 20
PATTERN NO. 21
PATTERN NO. 22
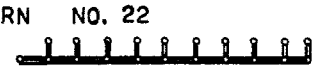
PATTERN NO. 23
PATTERN NO. 24
PATTERN NO. 25
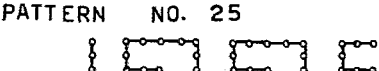
PATTERN NO. 27
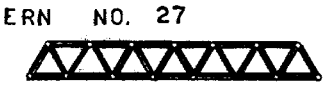
PATTERN NO. 31
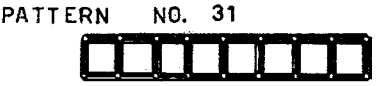
PATTERN NO. 41
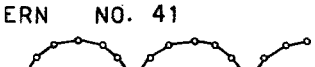
SATIN STITCHES
PATTERN NO. 43
PATTERN NO. 44
PATTERN NO. 45
PATTERN NO. 97
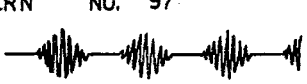
PATTERN NO. 91
PATTERN NO. 92
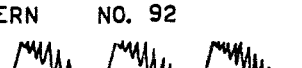
PATTERN NO. 93
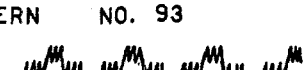
PATTERN NO. 95
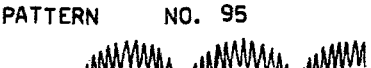
PATTERN NO. 98
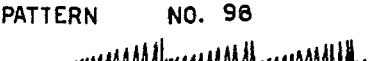
PATTERN NO. 99
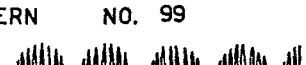
COMPOSITE STITCH PATTERN ARRANGEMENT (PATTERN NOS. 98,95)
FIG. 47

INTERPOLATION OF ARROW PATTERN NO. 98

| PATTERN: CLUBS | | | | STITCH | BIGHT | | FEED | |
|---|---|---|---|---|---|---|---|---|
| PROGRAMMED DATA | | STITCH NO. PER CYCLE | 51 | 25 | − | 29 | + | 3 |
| | | WIDTH | 8 | 26 | − | 29 | | 0 |
| | | FEED | VARIABLE | 27 | + | 6 | + | 4 |
| | | | | 28 | + | 26 | − | 1 |
| MAX. NEEDLE BIGHT | | | | 29 | + | 16 | + | 3 |
| MAX. FEED VAR. | | | | 30 | + | 6 | − | 2 |
| STITCH | BIGHT | | FEED | | 31 | 0 | + | 4 |
| 0 | | 0 | | | 32 | − | 6 | + | 4 |
| 1 | | 0 | + | 10 | 33 | − | 26 | − | 1 |
| 2 | | 0 | + | 10 | 34 | − | 16 | − | 3 |
| 3 | − | 7 | + | 1 | 35 | − | 6 | + | 2 |
| 4 | + | 7 | | 0 | 36 | 0 | + | 4 |
| 5 | − | 11 | + | 2 | 37 | + | 3 | | 0 |
| 6 | + | 11 | | 0 | 38 | − | 3 | + | 2 |
| 7 | − | 14 | + | 3 | 39 | + | 3 | | 0 |
| 8 | + | 14 | | 0 | 40 | − | 3 | + | 2 |
| 9 | − | 15 | + | 3 | 41 | + | 4 | | 0 |
| 10 | + | 15 | | 0 | 42 | − | 4 | + | 2 |
| 11 | − | 14 | + | 3 | 43 | + | 5 | | 0 |
| 12 | + | 13 | | 0 | 44 | − | 5 | + | 2 |
| 13 | − | 13 | + | 3 | 45 | + | 5 | | 0 |
| 14 | + | 14 | | 0 | 46 | − | 5 | + | 3 |
| 15 | − | 20 | + | 2 | 47 | + | 6 | | 0 |
| 16 | + | 20 | | 0 | 48 | − | 6 | + | 3 |
| 17 | − | 27 | + | 2 | 49 | + | 7 | | 0 |
| 18 | + | 27 | | 0 | 50 | − | 7 | + | 2 |
| 19 | − | 30 | + | 3 | 51=0 | | | | |
| 20 | + | 30 | | 0 | | | | | |
| 21 | − | 31 | + | 3 | | | | | |
| 22 | + | 31 | | 0 | | | | | |
| 23 | − | 30 | + | 3 | | | | | |
| 24 | + | 30 | | 0 | | | | | |

FABRIC ADVANCING WITH FORWARD FEED ←

| EYELET | | | |
|---|---|---|---|
| THREE-CYCLES PROGRAM:<br>A= STITCHES 0-1-2-1-2 ETC.<br>B= STITCHES 3-4-5....32-33-32-33<br>C= STITCHES 34-35....,41-42<br>CHANGE OF CYCLE THROUGH A SIGNAL FROM FABRIC<br>PATTERN WIDTH = 5.94<br>MAX. NEEDLE BIGHT = 4.39<br>MAX. FEED VAR. = 4.26 | STITCH | BIGHT | FEED |
| | 0 | − 2 | 0 |
| | 1 | − 17 | + 2 |
| | 2 | − 2 | + 2 |
| | 3 | − 19 | + 2 |
| | 4 | − 2 | + 2 |
| | 5 | − 22 | + 2 |
| | 6 | − 6 | + 2 |
| | 7 | − 23 | + 2 |
| | 8 | − 2 | + 2 |
| | 9 | − 22 | + 2 |
| | 10 | − 7 | + 1 |
| | 11 | − 21 | + 3 |
| | 12 | − 6 | + 2 |
| | 13 | − 16 | + 7 |
| | 14 | − 4 | + 6 |
| | 15 | − 8 | + 10 |
| | 16 | − 2 | + 10 |
| | 17 | + 0 | − 10 |
| | 18 | + 2 | − 11 |
| | 19 | + 8 | − 10 |
| | 20 | + 4 | − 10 |
| | 21 | + 16 | − 6 |

| STITCH | BIGHT | FEED |
|---|---|---|
| 22 | + 6 | − 7 |
| 23 | + 21 | + 2 |
| 24 | + 7 | − 3 |
| 25 | + 22 | − 1 |
| 26 | + 8 | − 2 |
| 27 | + 23 | − 2 |
| 28 | + 6 | − 2 |
| 29 | + 22 | − 2 |
| 30 | + 2 | − 2 |
| 31 | + 19 | − 2 |
| 32 | + 2 | − 2 |
| 33 | + 17 | − 2 |
| 34 | − 17 | − 2 |
| 35 | + 17 | − 2 |
| 36 | − 17 | − 2 |
| 37 | + 17 | − 2 |
| 38 | − 17 | − 2 |
| 39 | + 17 | 0 |
| 40 | + 17 | − 2 |
| 41 | + 17 | + 2 |
| 42 | 0 | + 1 |

PATTERN: A

PROGRAMMED DATA

| | |
|---|---|
| STITCH NO PER CYCLE | 35 |
| WIDTH | 8 |
| FEED | VARIABLE |
| MAX. NEEDLE BIGHT | |
| MAX. FEED VAR. | |

| STITCH | BIGHT | | FEED | |
|---|---|---|---|---|
| 0 | − | 31 | + | 1 |
| 1 | − | 31 | − | 1 |
| 2 | − | 31 | + | 1 |
| 3 | − | 31 | − | 1 |
| 4 | − | 31 | + | 1 |
| 5 | − | 10 | + | 10 |
| 6 | + | 10 | + | 7 |
| 7 | + | 31 | + | 6 |
| 8 | + | 10 | − | 5 |
| 9 | − | 10 | − | 7 |
| 10 | − | 31 | + | 10 |
| 11 | − | 10 | + | 10 |
| 12 | − | 10 | − | 16 |
| 13 | − | 11 | − | 16 |
| 14 | − | 11 | + | 16 |
| 15 | − | 31 | − | 1 |
| 16 | − | 10 | − | 1 |
| 17 | + | 10 | − | 1 |
| 18 | + | 31 | − | 3 |
| 19 | + | 31 | + | 2 |
| 20 | + | 10 | + | 3 |
| 21 | − | 10 | + | 1 |
| 22 | − | 31 | − | 1 |
| 23 | − | 31 | − | 2 |
| 24 | − | 10 | + | 1 |

| STITCH | BIGHT | | FEED | |
|---|---|---|---|---|
| 25 | + | 10 | − | 1 |
| 26 | + | 31 | − | 3 |
| 27 | + | 31 | + | 2 |
| 28 | + | 10 | + | 3 |
| 29 | − | 10 | − | 1 |
| 30 | − | 31 | − | 1 |
| 31 | − | 31 | + | 2 |
| 32 | + | 31 | − | 2 |
| 33 | − | 31 | + | 2 |
| 34 | − | 31 | − | 2 |
| 35 | − | 31 | + | 18 |

FIG. 52A

PATTERN: B

| PROGRAMMED DATA | |
|---|---|
| STITCH NO. PER CYCLE | 44 |
| WIDTH | 8 |
| FEED | VARIABLE |
| MAX. NEEDLE BIGHT | |
| MAX. FEED VAR. | |

| STITCH | BIGHT | FEED |
|---|---|---|
| 0 | - 31 | |
| 1 | - 31 | + 2 |
| 2 | - 31 | - 2 |
| 3 | - 31 | + 2 |
| 4 | - 31 | - 2 |
| 5 | - 10 | + 6 |
| 6 | + 10 | + 3 |
| 7 | + 31 | + 2 |
| 8 | + 31 | + 2 |
| 9 | + 10 | + 2 |
| 10 | - 10 | - 3 |
| 11 | - 31 | - 6 |
| 12 | - 31 | - 2 |
| 13 | - 10 | + 6 |
| 14 | + 10 | + 3 |
| 15 | + 31 | + 2 |
| 16 | + 31 | + 8 |
| 17 | + 31 | + 8 |
| 18 | + 21 | + 6 |
| 19 | + 10 | - 1 |
| 20 | 0 | - 8 |
| 21 | 0 | - 14 |
| 22 | + 15 | + 2 |
| 23 | + 30 | + 1 |
| 24 | + 30 | + 13 |

| STITCH | BIGHT | FEED |
|---|---|---|
| 25 | + 20 | + 6 |
| 26 | + 11 | + 1 |
| 27 | - 1 | - 8 |
| 28 | - 1 | - 13 |
| 29 | - 15 | - 3 |
| 30 | - 30 | + 5 |
| 31 | - 30 | + 13 |
| 32 | - 20 | + 10 |
| 33 | - 11 | + 3 |
| 34 | 0 | - 5 |
| 35 | 0 | - 1 |
| 36 | - 10 | + 5 |
| 37 | - 21 | - 3 |
| 38 | - 31 | - 10 |
| 39 | - 31 | - 14 |
| 40 | - 31 | + 14 |
| 41 | - 31 | - 4 |
| 42 | - 31 | + 4 |
| 43 | - 31 | + 13 |
| 44 | - 31 | + 12 |

| PATTERN: | C | | |
|---|---|---|---|
| PROGRAMMED DATA | | | |
| STITCH NO. PER CYCLE | | 42 | |
| WIDTH | | 8 | |
| FEED | | VARIABLE | |
| MAX. NEEDLE BIGHT | | | |
| MAX. FEED VAR. | | | |

| STITCH | BIGHT | | FEED | |
|---|---|---|---|---|
| 0 | − | 31 | | |
| 1 | − | 31 | + | 7 |
| 2 | − | 21 | − | 4 |
| 3 | − | 31 | + | 4 |
| 4 | − | 21 | − | 4 |
| 5 | − | 31 | + | 4 |
| 6 | − | 21 | − | 3 |
| 7 | − | 10 | + | 3 |
| 8 | + | 10 | + | 2 |
| 9 | + | 21 | + | 7 |
| 10 | + | 31 | + | 13 |
| 11 | + | 31 | + | 6 |
| 12 | + | 21 | − | 1 |
| 13 | + | 10 | − | 0 |
| 14 | + | 20 | − | 6 |
| 15 | + | 30 | − | 11 |
| 16 | + | 30 | − | 6 |
| 17 | + | 21 | − | 2 |
| 18 | + | 10 | − | 3 |
| 19 | − | 10 | − | 3 |
| 20 | − | 21 | − | 3 |
| 21 | − | 30 | − | 1 |
| 22 | − | 21 | + | 3 |
| 23 | − | 10 | − | 3 |
| 24 | + | 10 | + | 3 |

| STITCH | BIGHT | | FEED | |
|---|---|---|---|---|
| 25 | + | 21 | + | 2 |
| 26 | + | 30 | + | 4 |
| 27 | + | 21 | − | 2 |
| 28 | + | 10 | − | 2 |
| 29 | − | 10 | − | 3 |
| 30 | − | 21 | − | 3 |
| 31 | − | 30 | − | 1 |
| 32 | − | 30 | + | 11 |
| 33 | − | 20 | + | 10 |
| 34 | − | 10 | − | 4 |
| 35 | − | 21 | − | 3 |
| 36 | − | 31 | − | 10 |
| 37 | − | 31 | − | 13 |
| 38 | − | 31 | + | 13 |
| 39 | − | 31 | − | 4 |
| 40 | − | 31 | + | 4 |
| 41 | − | 31 | + | 13 |
| 42 | − | 31 | + | 12 |

HOUSEHOLD TYPE SEWING MACHINE HAVING MICROPROCESSOR CONTROL

BACKGROUND OF THE INVENTION

1. Field of the Invention

The present invention relates to electronic household type sewing machines and more particularly to such machines having automatic control for the needle bar transverse oscillations and the feed member displacement.

2. Description of the Prior Art

Electronic sewing machines are well known which provide for control of needle bar transverse oscillations and feed member displacement. Household types sewing machines of this type which are known to the applicants generally store information relative to the needle bar and feed positions as a digital code in a read only memory or other static memory. Such a memory is merely a data bank which is conventionally sequentially explored during the execution of a predetermined sewing program beginning from the first stitch of a selected pattern to the last one of the same pattern and so on repeatedly. An example of such an arrangement is disclosed in U.S. Pat. No. 3,984,745 which is owned by the Singer Company. Moreover, the Singer Company has commercially sold a variety of such means under what Singer has commonly termed their "TOUCH-TRONIC FAMILY" which incudes the Singer Model 2001, the Singer Model 2000, the Singer Model 1200 and the Singer Model 1060. For example, the Singer Model 2001 lets the user select any of 27 preprogrammed stitch patterns by pushing the key uniquely corresponding to that pattern as well as providing automatic selection of length and width for the pattern and, if desired, the mirror image of such a pattern. This machine, as well as the other Singer machines known to the applicants, however, are confined to selection of the stored programs, or their mirror images, and do not provide sufficient flexibility to enable the user to vary the stitch pattern data, such as to maintain a constant stitch density while the length of the selected stitch pattern is varied. In addition, the applicants are not aware of any household electronic type sewing machines capable of automatically providing alphabetic stitch patterns, such as to sew monograms. Although prior art mechanical sewing machines employing elaborated camming arrangements, such as previously sold by Borletti S.P.A. of Milan, Italy have been capable of providing monograms.

Other examples of electronic sewing machines known to applicants are disclosed in Japanese Pat. No. 8675/72, issued to Matsushita Electric Ind. Co., Ltd., Japanese Pat. No. 15713/70, issued to Janome Sewing Machine Co., Ltd.; U.S. Pat. No. 3,076,066, owned by Mefina S.A.; U.S. Pat. No. 3,005,136, also owned by Mefina S.A.; U.S. Pat. No. 3,834,332, owned by Meister-Werke Gmbh; U.S. Pat. No. 3,613,608, owned by Kayser-Roth Corporation; U.S. Pat. No. 3,752,098, owned by The Gerber Scientific Instrument Company; U.S. Pat. Nos. 3,982,491; 3,986,466 and 4,051,794 owned by Union Special Corp.; U.S. Pat. Nos. 4,078,506; 4,072,114 and 4,069,778 owned by Brother Kogyo; U.S. Pat. Nos. 4,108,093 and 4,086,862 owned by Janome; U.S. Pat. No. 4,116,144 owned by Sharp Kabushiki; and U.S. Pat. No. 4,108,091 owned by Husqvarna AB. The above art is merely exemplary of a field which is becoming increasingly crowded as technology in the sewing machine field continues to convert from the mechanical age to the electronic age. Thus, by and large, the majority of prior art electronic controlled sewing machines are merely electronic conversions of their earlier mechanical equivalents which, through the use of various cam stacks, were capable of providing a plurality of selectable patterns to the operator. These cam stacks were merely replaced by their prior art electronic equivalents, namely a static memory, such as a read only memory or some other type of electronic storage. Thus, these prior art electronic solutions did not enable the processing of the stored stitch pattern data as well as operative flexibility in the use of such data, such as to create additional stitch patterns beyond those stored in the memory through the operation on the stored stitch patterns, such as for example, interpolating the stitch pattern data to enable the maintenance of a constant stitch pattern density as the length of the stitch pattern is varied while maintaining the shape of the pattern as well as the ability to select a plurality of patterns which can be alternatively combined to create a new stitch pattern arrangement or to automatically combine stitch patterns such as to provide an initial tacking stitch automatically before commencing the sewing of a straight stitch. However, the electronic sewing machine disclosed in U.S. Pat. No. 4,122,786, owned by Sharp K.K. is enabled alternatively of combining stitch patterns to create a composite stitch pattern arrangement. With the advent of the microcomputer, it has gradually found its way into machine control, such as disclosed in U.S. Pat. No. 4,079,235 owned by McDonnell Douglas Corp.; U.S. Pat. No. 4,115,058 owned by Houdaille Industries, Inc. and U.S. Pat. No. 3,906,324. However none of these prior art systems economically and efficiently solves the problems of providing a totally electronic sewing machine. Moreover, the electronic controlled sewing machines known to applicants all provide keyboards in which a specific key is required for stitch patterns selection. This arrangement is not only unsatisfactory but is necessarily physically limiting to the amount of stitch patterns which can be provided in the household type sewing machine as there is only a limited amount of room for the keyboard on the machine, which is the presently preferred location for such keyboards.

These disadvantages of the prior art are overcome by the present invention.

SUMMARY OF THE INVENTION

An improved household type sewing machine is provided in which control of the stitch pattern arrangement provided is accomplished through the use of a numeric keyboard which provides input control signals to a microcomputer integrated circuit which selectively retrieves stitch pattern data static memory storage, such as a read only memory, and is capable of selectively controllably functionally operating on this stored stitch pattern data in response to various input control signals to controllably redefine the stored stitch pattern data for selectively creating output control signals for control of the actuators which adjust the position of the needle bar and feed mechanism of the sewing machine which are different from the output control signals corresponding to any one of the stored stitch patterns. In this manner, at least the transverse position of the needle bar as well as, if desired, the feed mechanism, may be selectively varied to redefine a stitch pattern arrangement different from any one of the stored stitch patterns as well as, if desired, providing the stored stitch pattern itself. The variations in stitch pattern arrangement may include such variations as maintaining a constant stitch pattern density as the length of the pattern is varied while maintaining the shape of the selected pattern, such as by interpolating the stored stitch pattern data to create additional stitch position coordinates, or combining a plurality of stored stitch patterns into a composite stitch pattern arrangement comprising alternate stitches of each of the selected plurality of stitch patterns.

The household type sewing machine may be one such as the type having a bed, a standard rising from the bed, a horizontal arm overhanging the bed, the arm ending with a head, a needle bar disposed in the head for enabling transverse oscillation thereof relative to the direction of fabric feed in the sewing machine, a feed mechanism for adjusting the length and the direction of the fabric feed and electromechanical actuators for adjusting the transverse position of the needle bar and the positional displacement of the feed dog in response to control signals provided thereto. The read only memory retrievably stores a plurality of different predetermined stitch patterns, such as alphabetic stitch patterns and/or conventional stitch patterns, and is preferably fixed or removably connectable to the microcomputer so that it may be interchangeably replaced by other read only memories having different stitch pattern data stored therein. The stored stitch patterns preferably each have associated retrievably stored bight and feed data corresponding to predetermined positional coordinates of the needle bar and feed dog defining associated stitch position coordinates for the stitches comprising the stored stitch patterns. Preferably, the read only memory stores only the bight and feed data which varies for the stitches comprising each of the plurality of stored stitch patterns rather than storing bight and feed data for each stitch, even where the information is repetitive, thereby enabling optimal retrieval of the stitch pattern data by the microcomputer in response to the input control signals provided from the keyboard.

The microcomputer integrated circuit preferably comprises a microprocessor which is operatively connected to the read only memory, to the actuators and to the keyboard for selectively processing the stored stitch pattern data from the read only memory and providing output control signals to the actuators based on the selectively processed stitch pattern data for controllably adjusting the transverse position of the needle bar and, where desired, the positional displacement of the feed mechanism. The microcomputer processor, as was previously mentioned, is capable of selectively controllably functionally operating on the stored stitch pattern data in response to input control signals provided from the keyboard for controllably redefining the stored stitch pattern data for selectively creating output control signals for the actuators different from the output control signals corresponding to any one of the stored stitch patterns, such as by interpolating the stored stitch pattern data for a selected stitch pattern in response to input control signals provided from the keyboard for redefining the stitch position coordinates associated with the selected stitch pattern by creating additional stitch position coordinates in the selected stitch pattern not contained in the stored stitch pattern data, such as for maintaining the constant stitch density of the selected stitch pattern and its shape while the length of the stitch pattern is varied.

The keyboard contains keys for initiating the selection of the stored stitch patterns and the functional operation to be performed on the selected stored stitch pattern data to enable the sewing machine to provide stitch pattern arrangements corresponding to the stored stitch patterns per se as well as to selectably createable variations thereof. The keyboard preferably comprises a common numeric display for displaying information corresponding to the stored stitch pattern data such as the corresponding pattern number as well as the length of the bight and feed of the selected stored stitch pattern or selected variations in such length. In addition, the keyboard preferably contains a plurality of light emitting diodes which indicate the keys which have been operated to select a function. A common set of incrementing and decrementing keys are provided on the keyboard for controlling the numeric digit display. These keys control the selection of the pattern number, and hence the corresponding stitch pattern, as well as selection of the bight and feed values, where such values are to be varied. Thus, the quantity of keys required for pattern selection is solely limited to the number of digits to be controlled rather than the number of patterns, with only two sets of keys, by way of example, being necessary to provide up to 100 different pattern numbers for a two digit display.

Preferably, in the keyboard in the presently preferred embodiment of the present invention, keys are preferably provided for the most common stitches, the straight stitch and the zig-zag stitch, two sets of keys for controlling the two digit code corresponding to the plurality of other selectable stitch patterns, a reverse feed selection key on which the selected pattern may be sewed in reverse, a tacking key which provides input control signals to the microcomputer to initiate automatic tacking and subsequent continuation of sewing of the selected stitch pattern once tacking has been completed, a single pattern selection key which enables the automatic provision of only a single stitch of a pattern, a key which enables controllable variation of the stitch length and/or bight in conjunction with the numeric display control common keys, a key which enables automatic balance control for the feed of the sewing machine, a key which enables the combining of a plurality of stitch patterns as previously mentioned, and a double needle key which automatically enables the limiting of the width of the stitch pattern selected to a predetermined value, such as 5 millimeters, to enable a double needle to be safely employed. The microcomputer and the keyboard arrangement thus provide the flexibility which has been lacking in previous electronic controlled household type sewing machines.

BRIEF DESCRIPTION OF DRAWINGS

FIG. 3 is a block diagram similar to FIG. 2 of the control system of the present invention;

FIG. 4 is a schematic diagram, partially in block, of a typical servocontrol loop for controlling the positional displacement of the needle bar of the present invention, the same type of arrangement being typical for controlling the positional displacement of the feed dog of the present invention;

FIG. 5 is a block diagram of the main motor lock functional portion of the present invention;

FIG. 47 is a graphic illustration of a plurality of different stitch patterns which may be stored in the stitch pattern memory of the present invention and provided by the sewing machine of the present invention, with exemplary pattern code numbers being shown adjacent to each of the patterns, and with the last illustration being of an exemplary non-stored stitch pattern arrangement created from the above stored stitch patterns in accordance with the present invention;

DETAILED DESCRIPTION OF THE PREFERRED EMBODIMENTS

Figure 1:
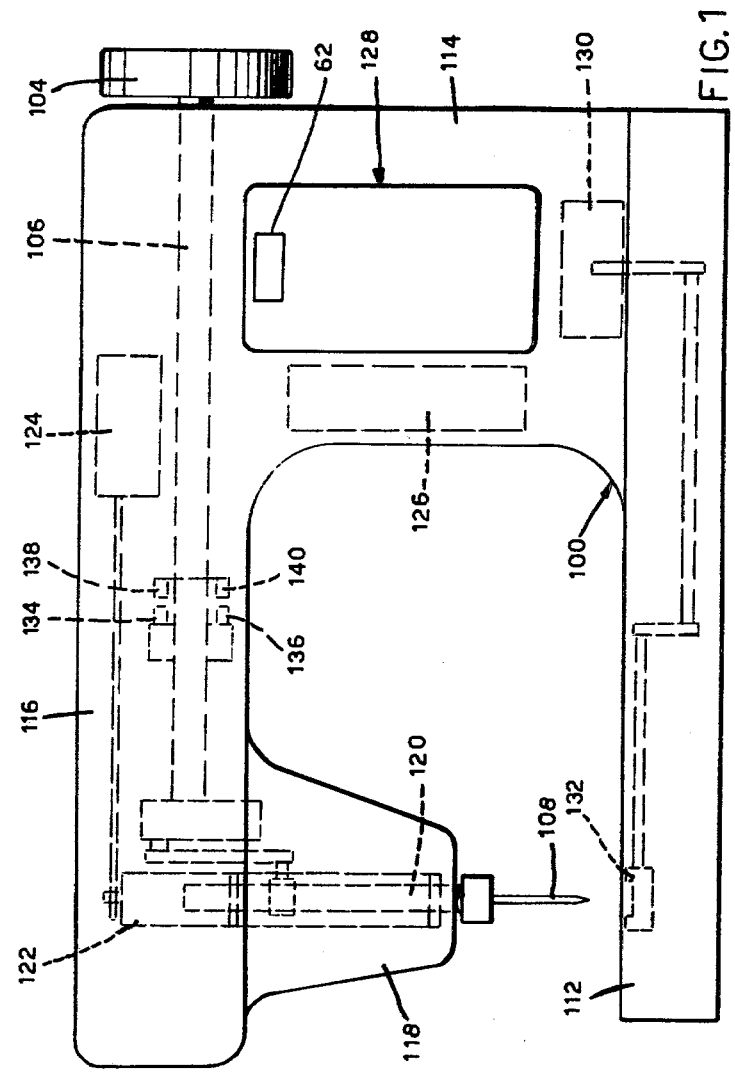
FIG. 1 is a front elevational diagrammatic illustration of the sewing machine of the present invention, illustrating the preferred location of various components.
Figure 6:
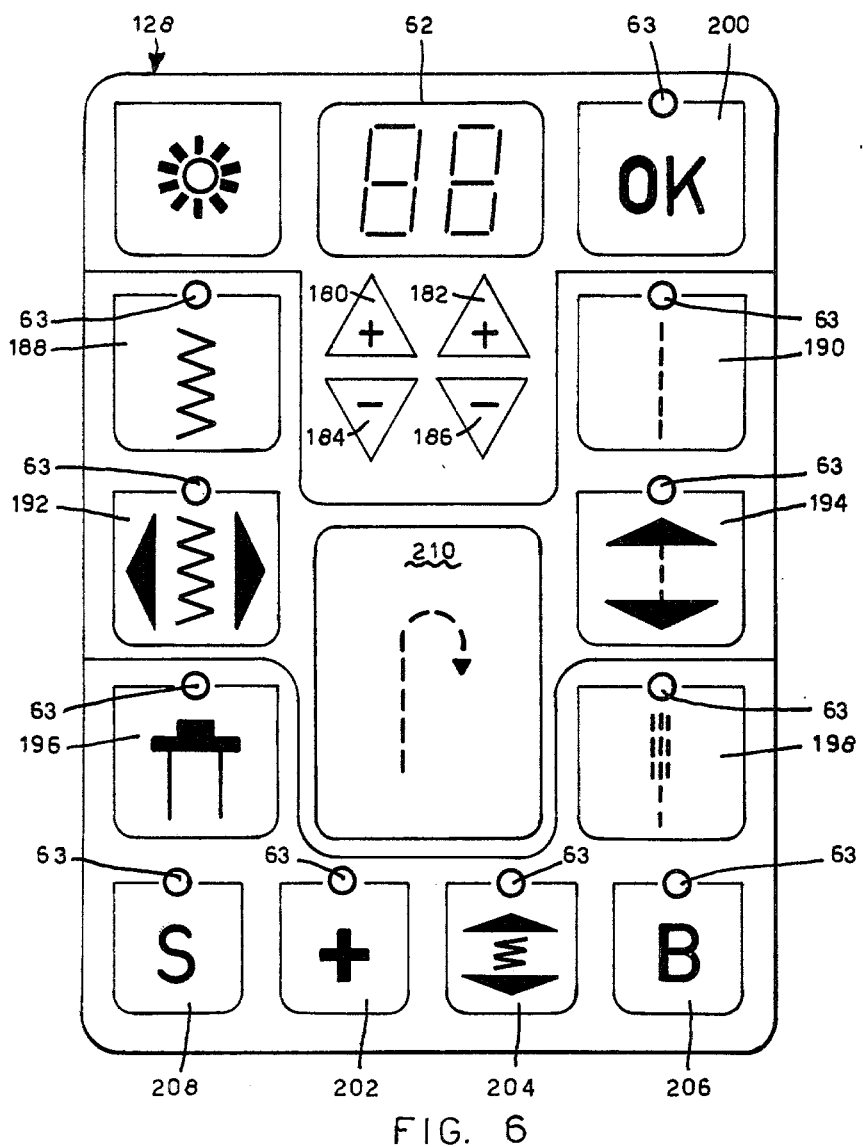
FIG. 6 is a diagrammatic illustration of a typical keyboard presentation for use with the system of the present invention.

Referring now to the drawings in detail and initially to FIG. 1 thereof, the presently preferred embodiment of the sewing machine of the present invention, generally referred to by the reference numeral 100, is diagrammatically shown. The sewing machine 100 preferably includes a housing which contains a conventional bed 112, a conventional standard 114, a conventional arm 116 overhanging the bed 112 and ending with a conventional head 118 containing a conventional type of needle bar 120 carried by a gate 122 for reciprocating motion relative thereto caused by conventional driving means. The needle bar gate 122 is preferably mounted into head 118 so as to make transverse oscillations in response to pulses received from an electromechanical actuator 124, such as preferably either a linear actuator or a rotary actuator such as a reversible DC motor. As will be described in greater detail hereinafter, such as with reference to FIGS. 2–4, 7 and 8, the electromechanical actuator 124 is preferably connected to the preferred electronic control system of the present invention, generally represented by reference numeral 126 in FIG. 1, and is responsive to output control signals provided thereby to control the transverse oscillations of the needle bar 120. Preferably, a keyboard 128, to be described in greater detail hereinafter with reference to FIG. 6 and FIG. 9, is operatively connected to the electronic control system 126 of the present invention and is operated by the operator to select a sewing pattern or create a variation thereof. This keyboard 128 is preferably located on the standard 114 of the sewing machine 100 for operator convenience although, if desired, the keyboard 128 could be located separate from the sewing machine 100 housing and electronically connected to the electronic control system 126 such as via a cable. The presently preferred physical arrangement of the keyboard panel 128 is shown in FIG. 6. Suffice it to say at this time that the preferred keyboard panel 128 preferably includes a plurality of keys, to be described in greater detail hereinafter with reference to FIGS. 6 and 9, and a common numeric display 62 for providing a digital display of the information selected by the keyboard 128, as will be described in greater detail hereinafter. The electronic control system 126, as will be described in greater detail hereinafter, is also preferably operatively connected to a separate electromechanical actuator 130 which may also be a linear or rotary actuator such as a reversible DC motor, which is preferably mechanically linked to feed dog 132 for controlling the adjustment of the length and direction of the feed dog 132.

Figure 10:
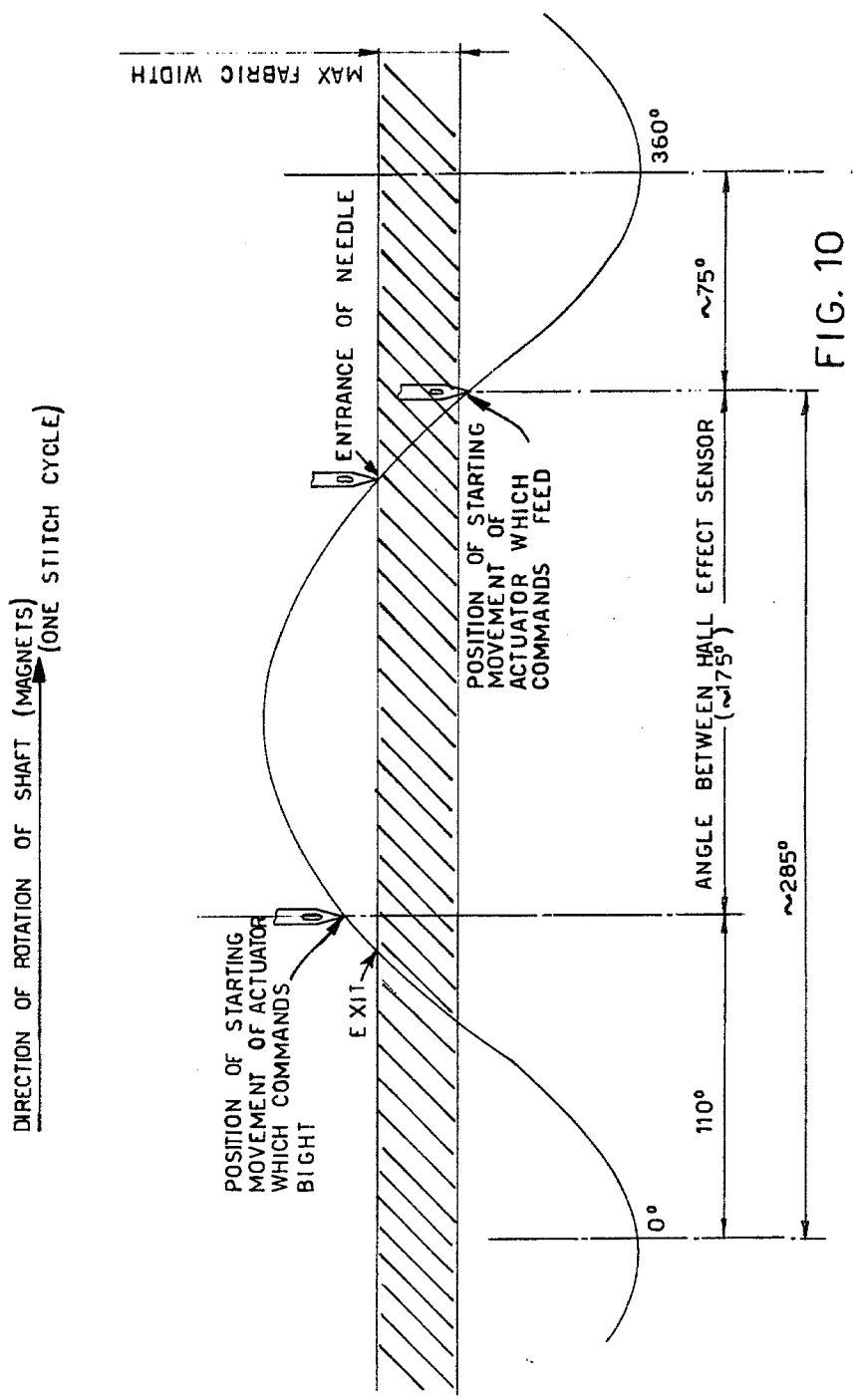
FIG. 10 is a graphic illustration of the synchronization of the control system of the present invention.
Figure 11:
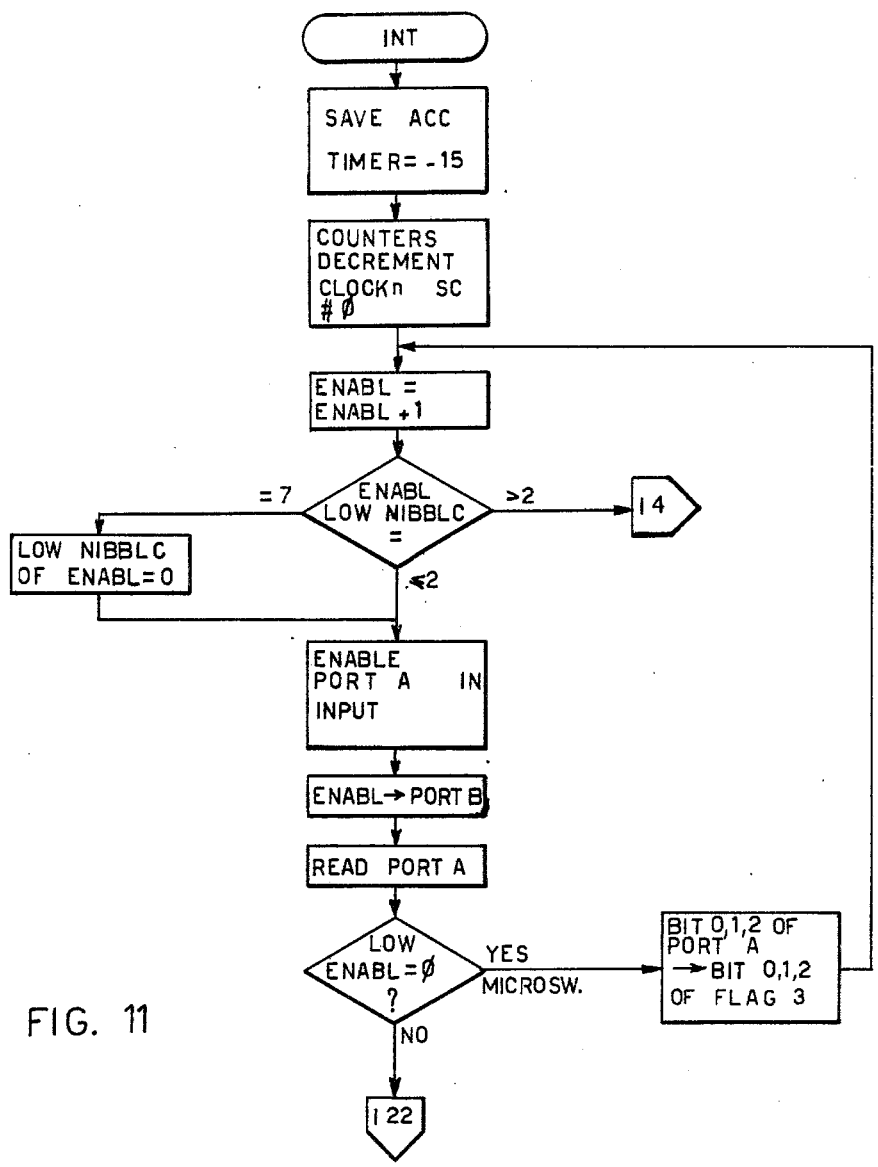
FIGS. 11–46 comprise a logic flow diagram of the various control functions of the microprocessor of the present invention.
Figure 12:
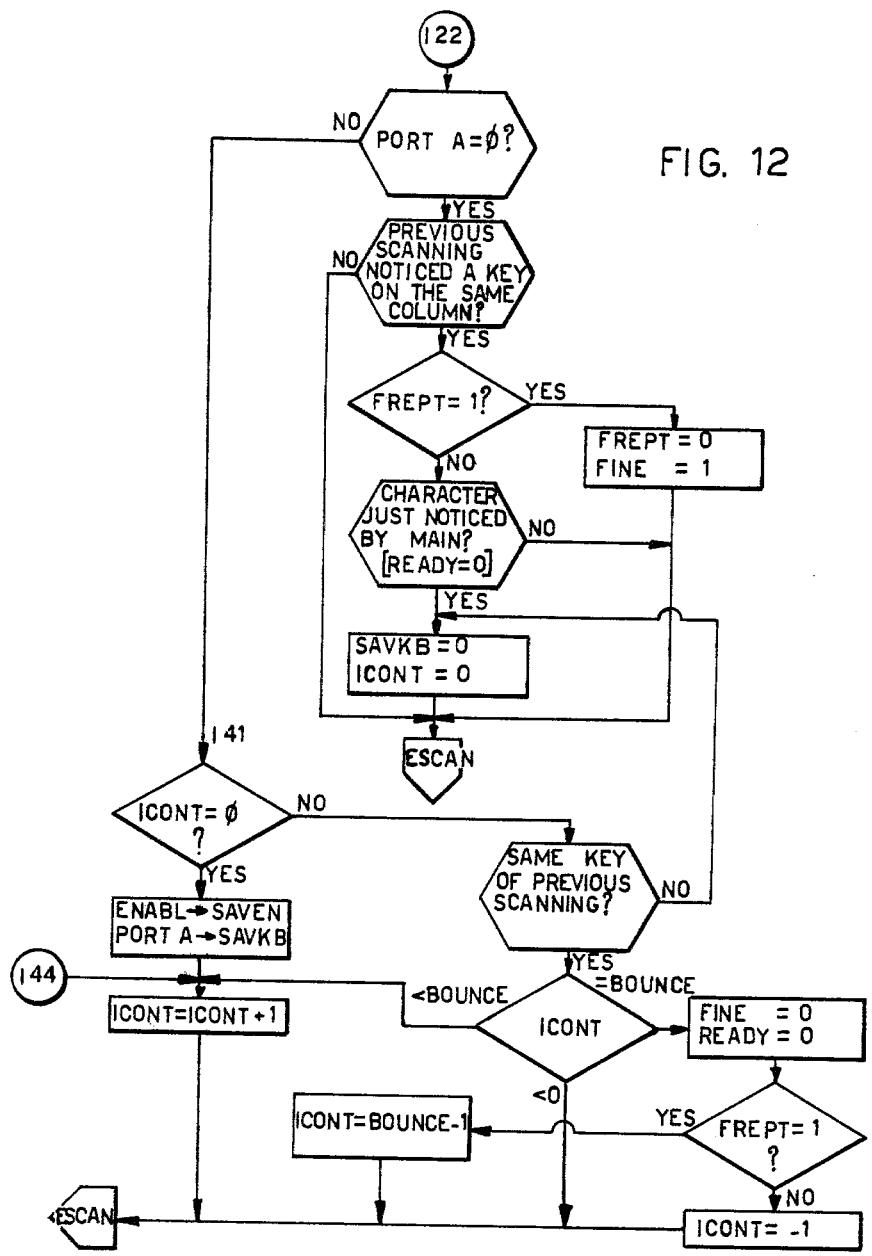
Figure 13:
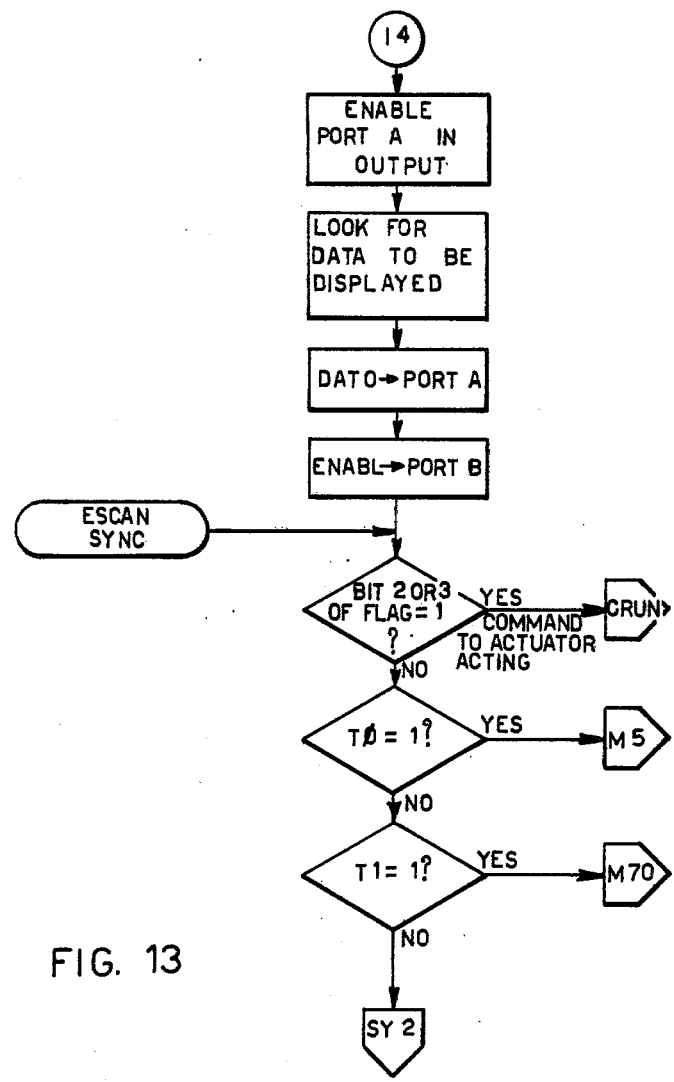
Figure 14:
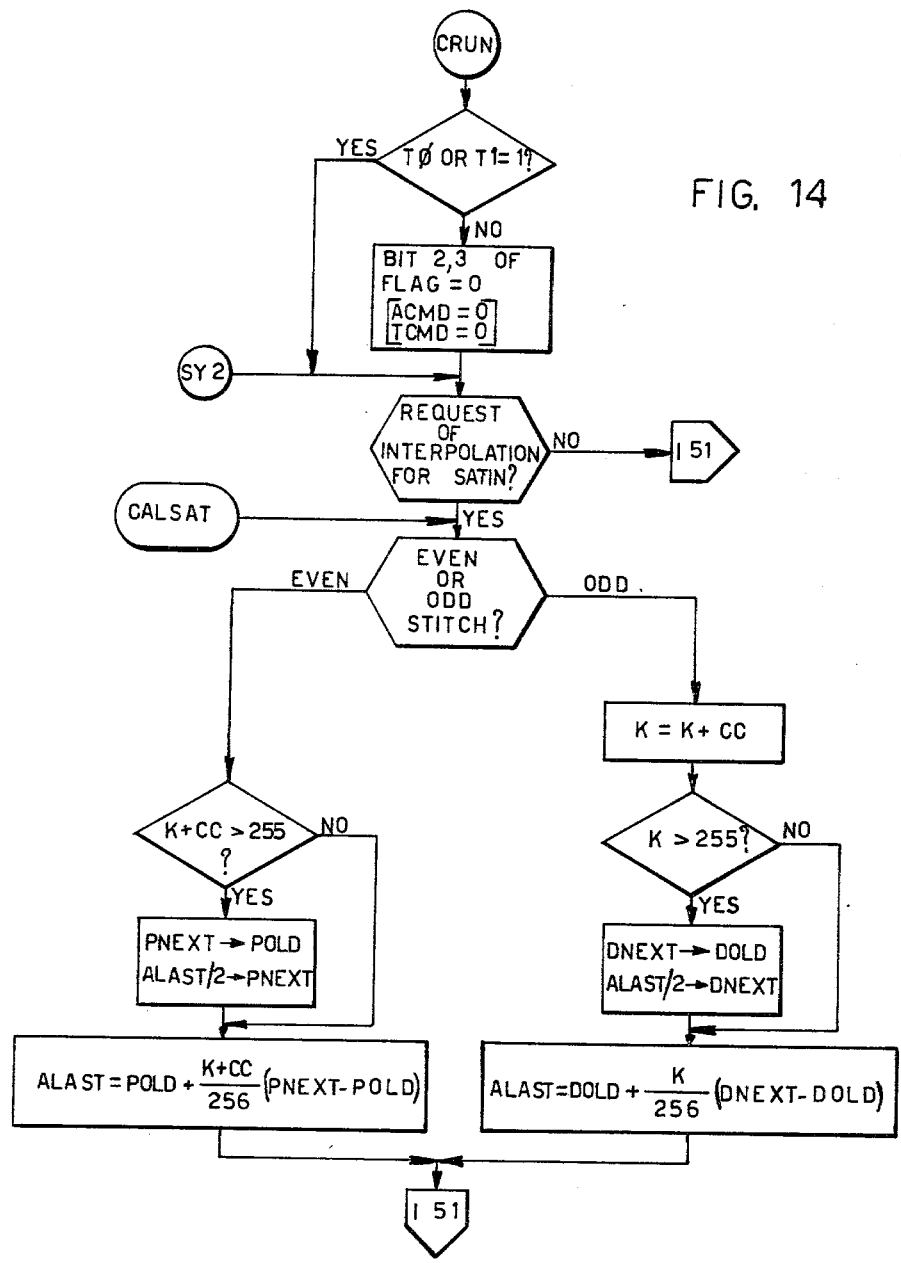
Figure 15:
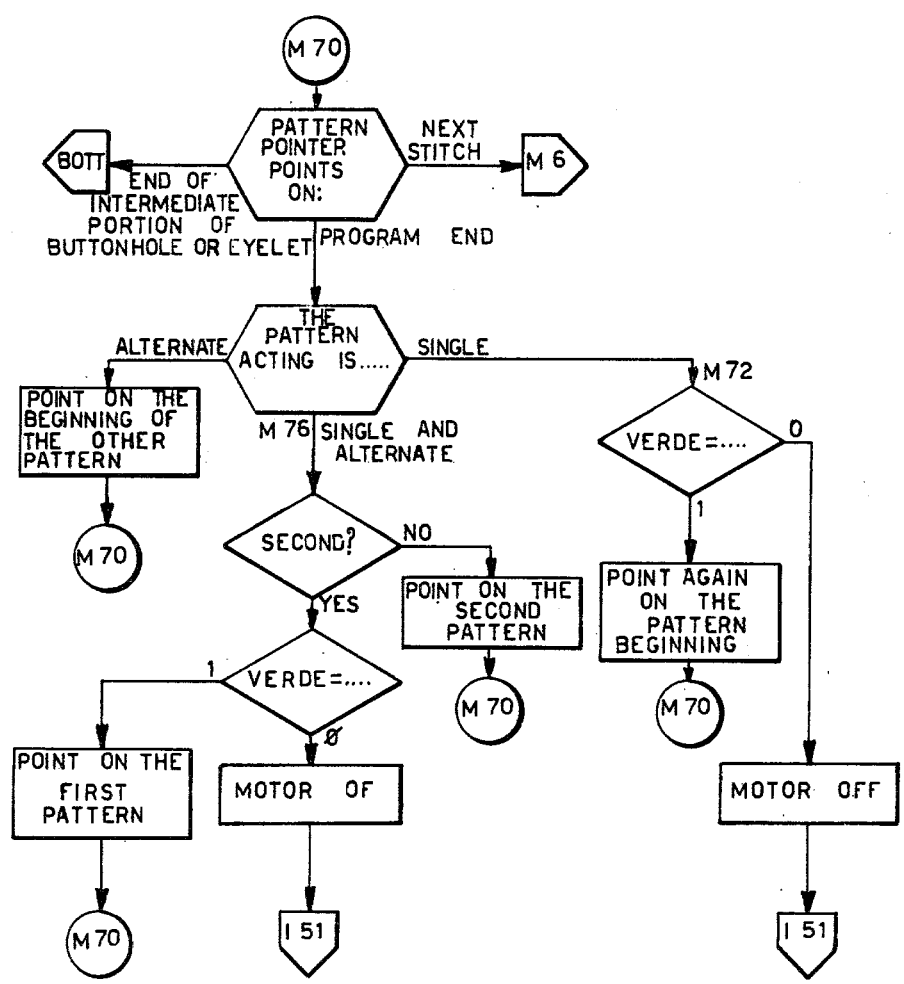
Figure 18:
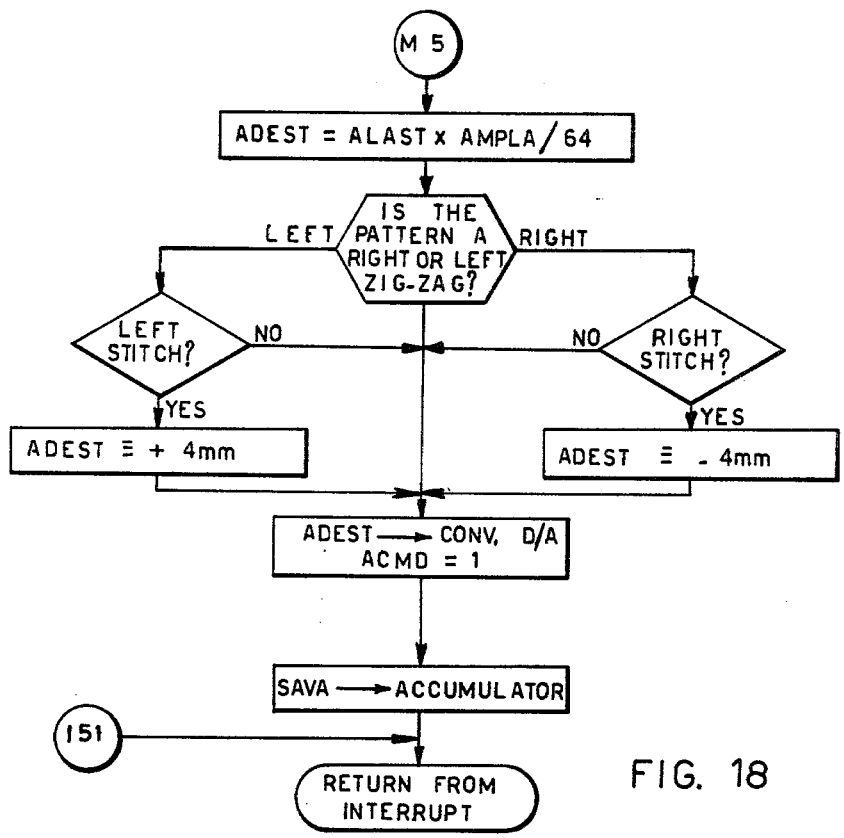
Figure 16:
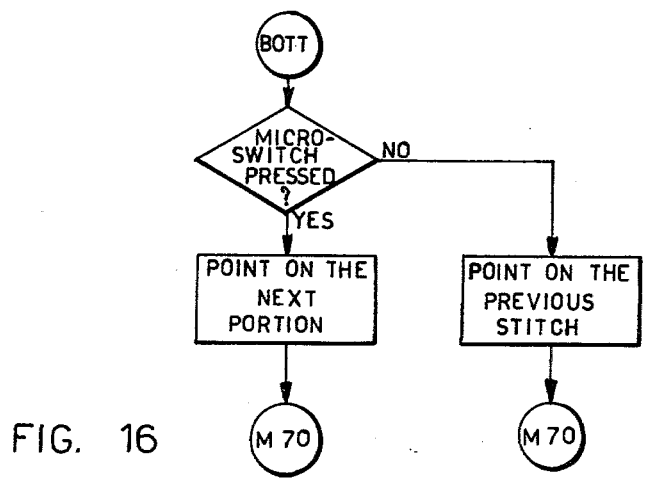
Figure 17:
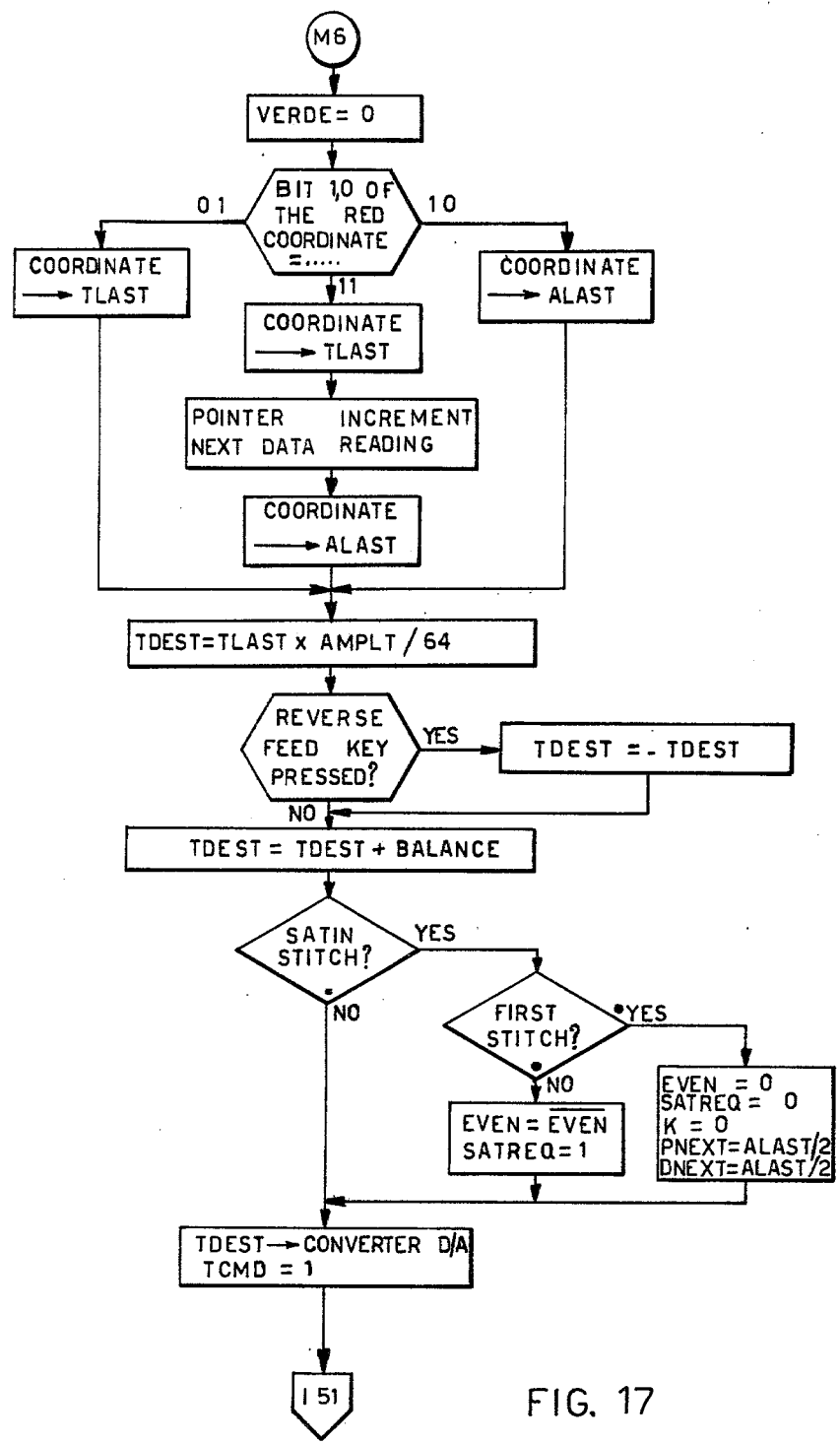
Figure 19:
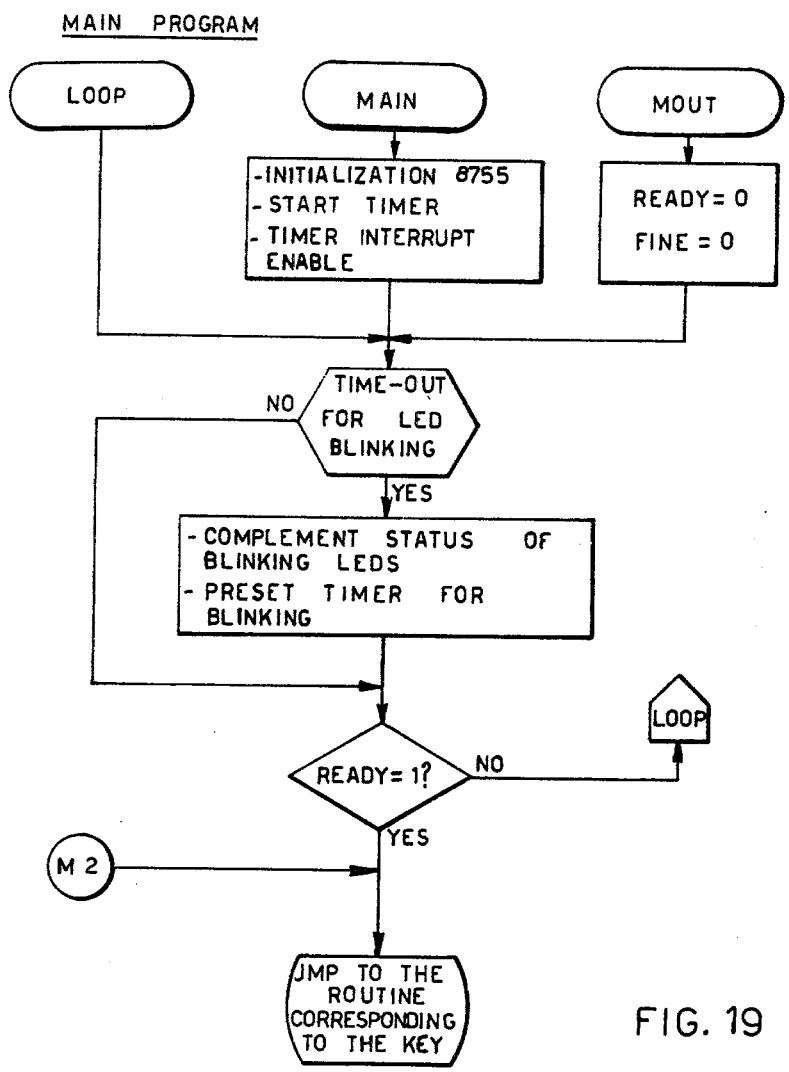
Figure 20:
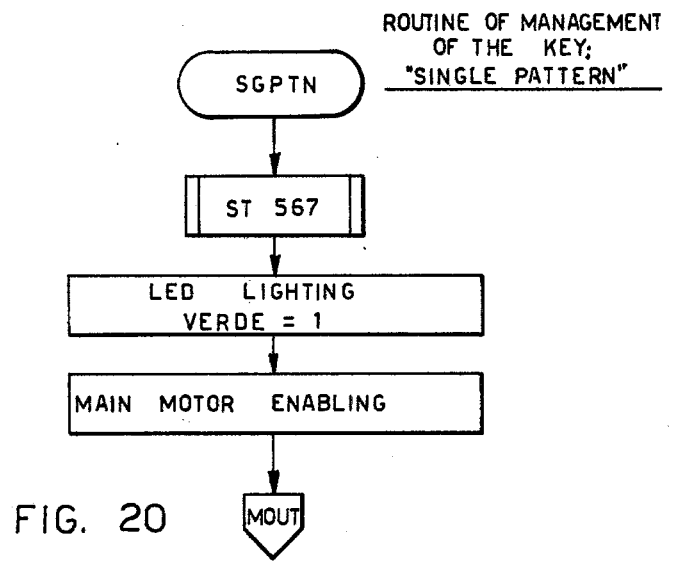
Figure 21:
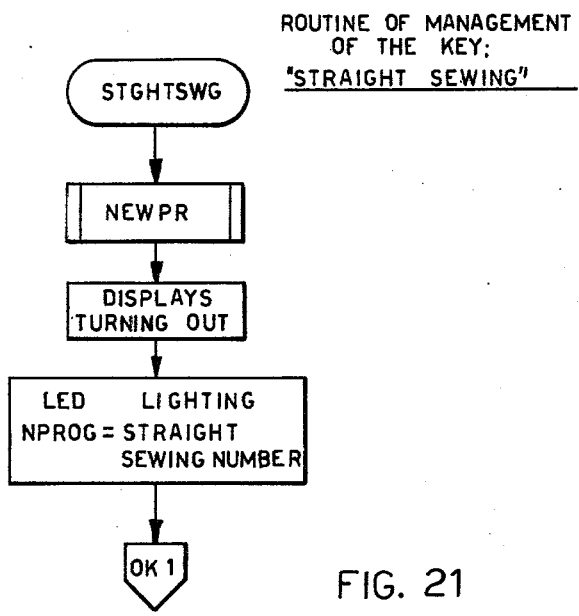
Figure 22:
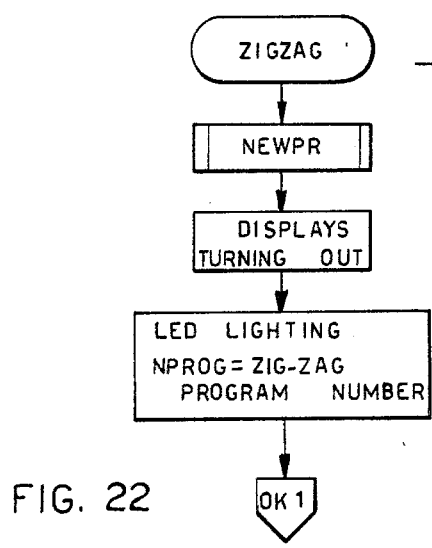
Figure 23:
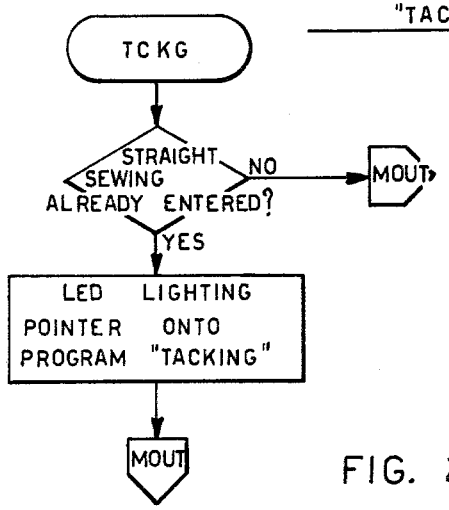
Figure 24:
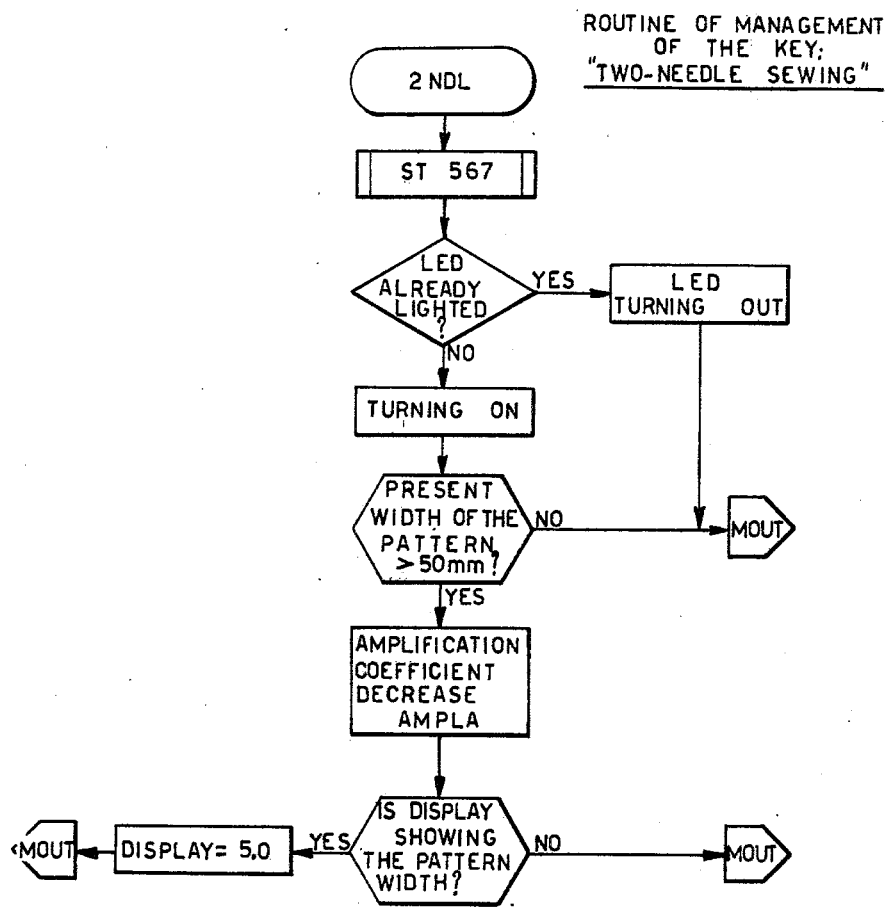
Figure 25:
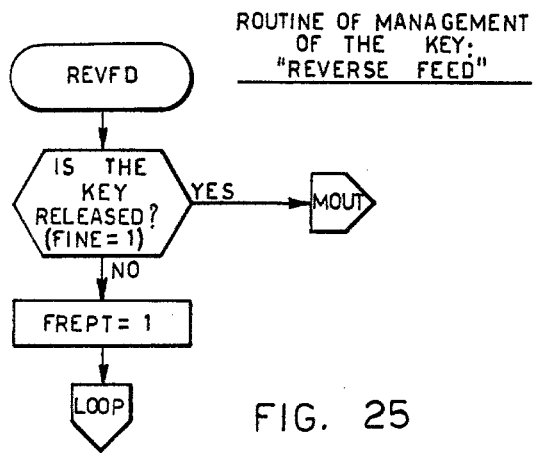
Figure 26:
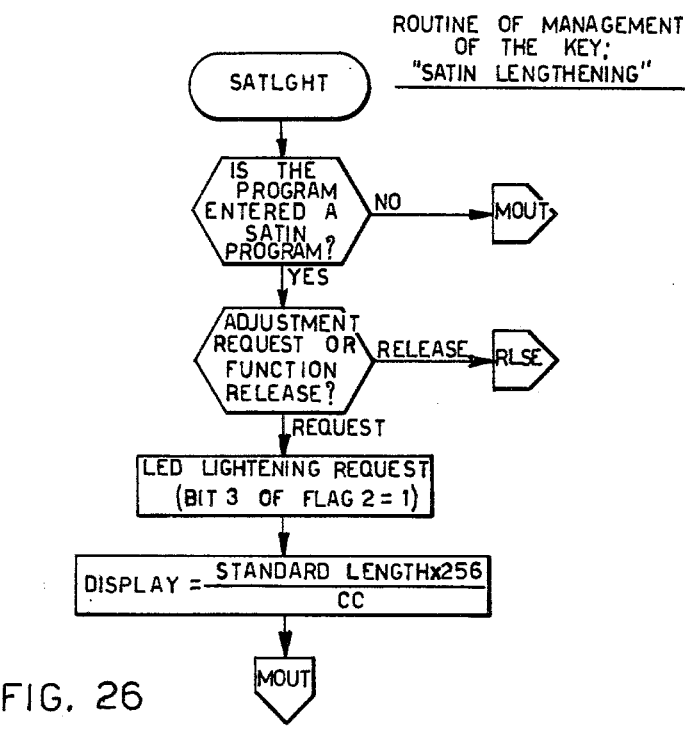
Figure 27:
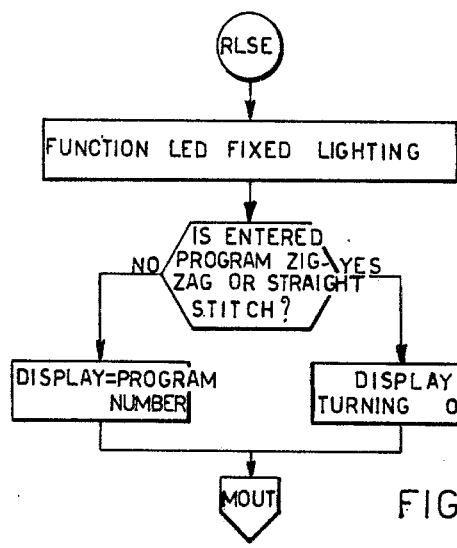
Figure 28:
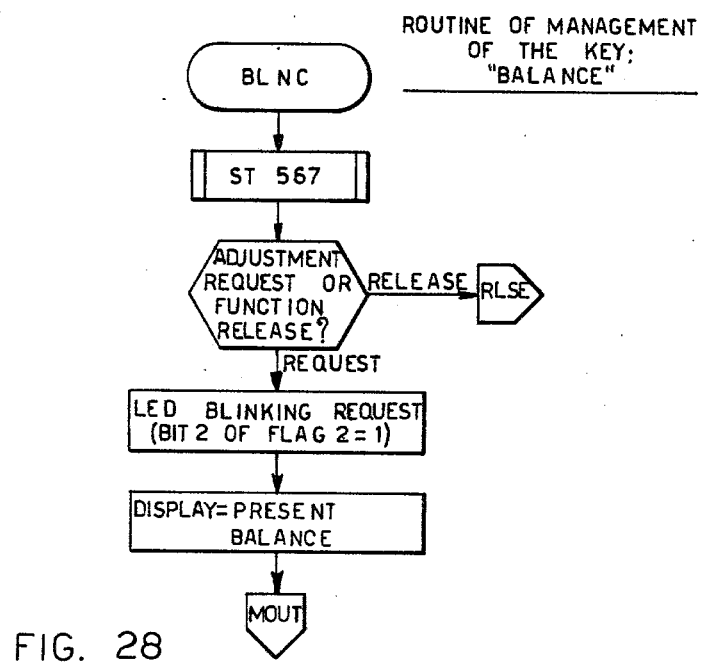
Figure 29:
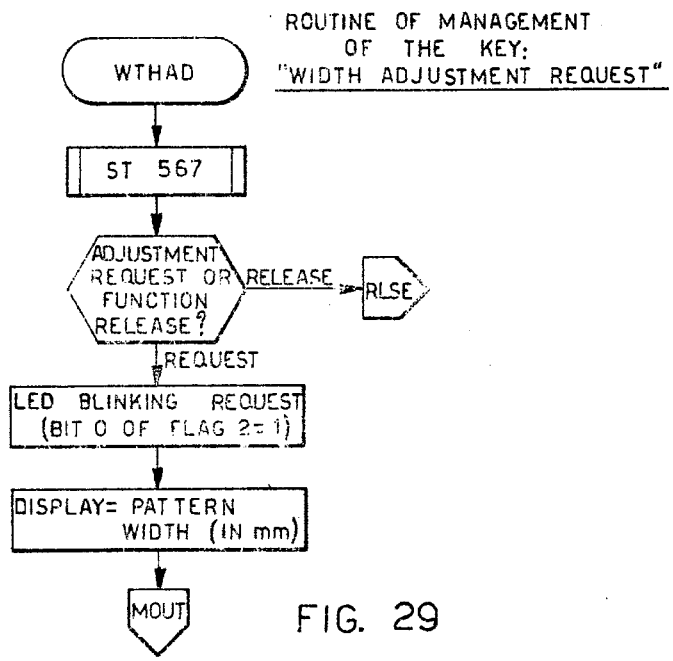
Figure 30:
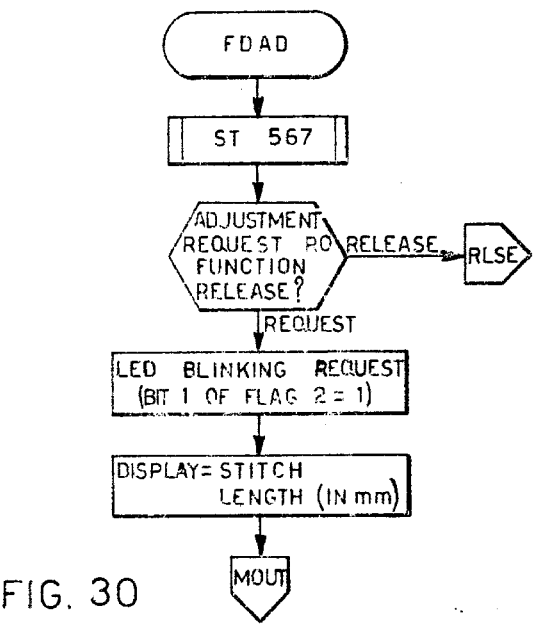
Figure 31:
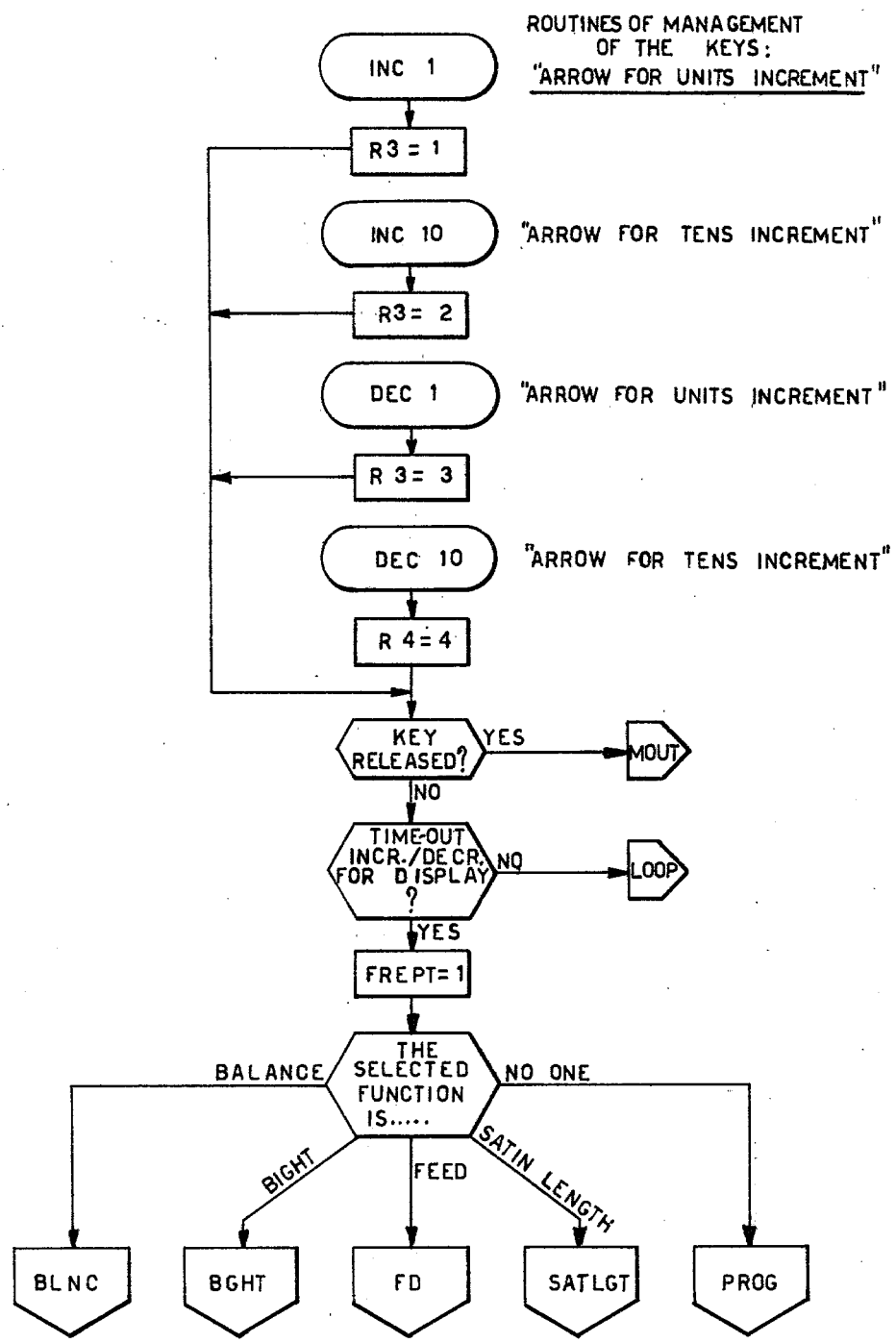
Figure 32:
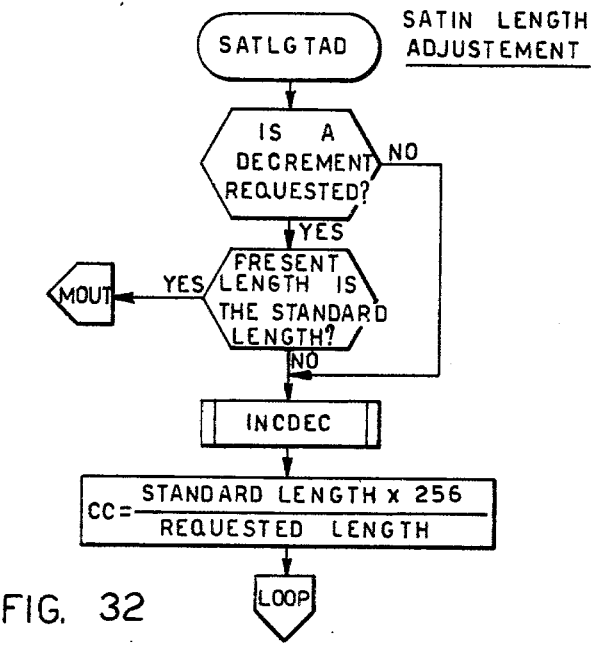
Figure 33:
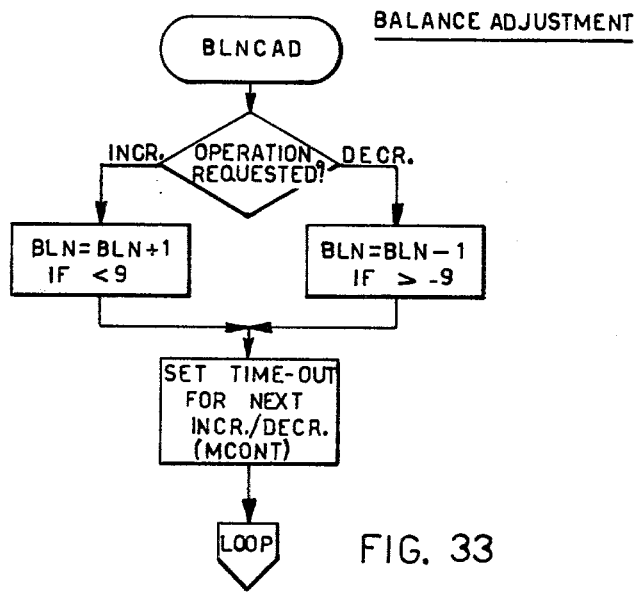
Figure 34:
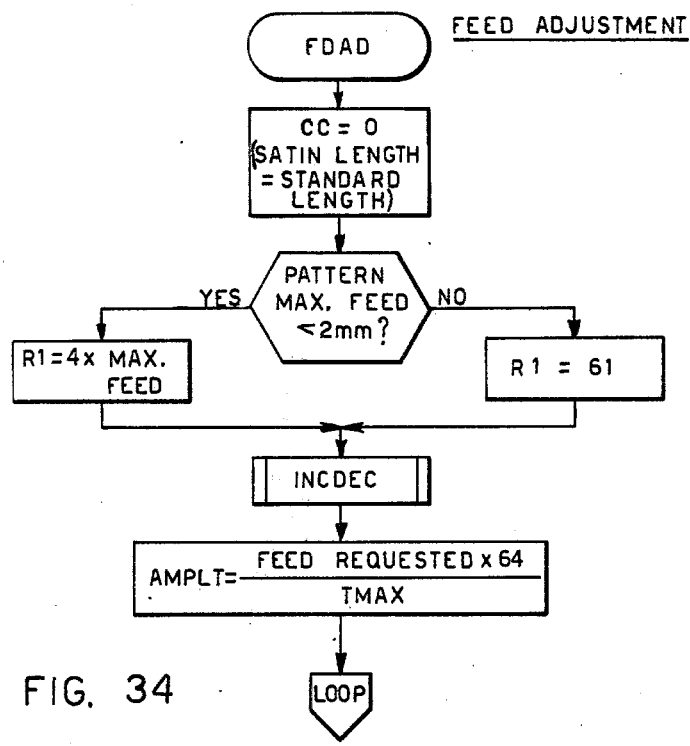
Figure 35:
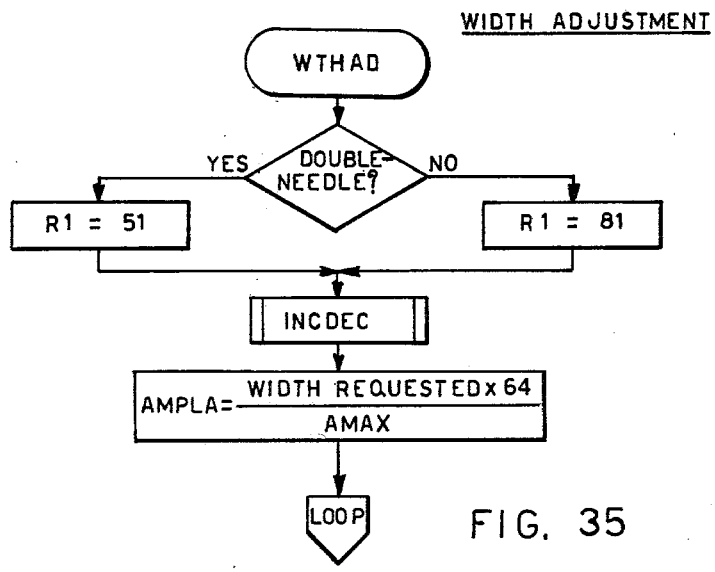
Figure 36:
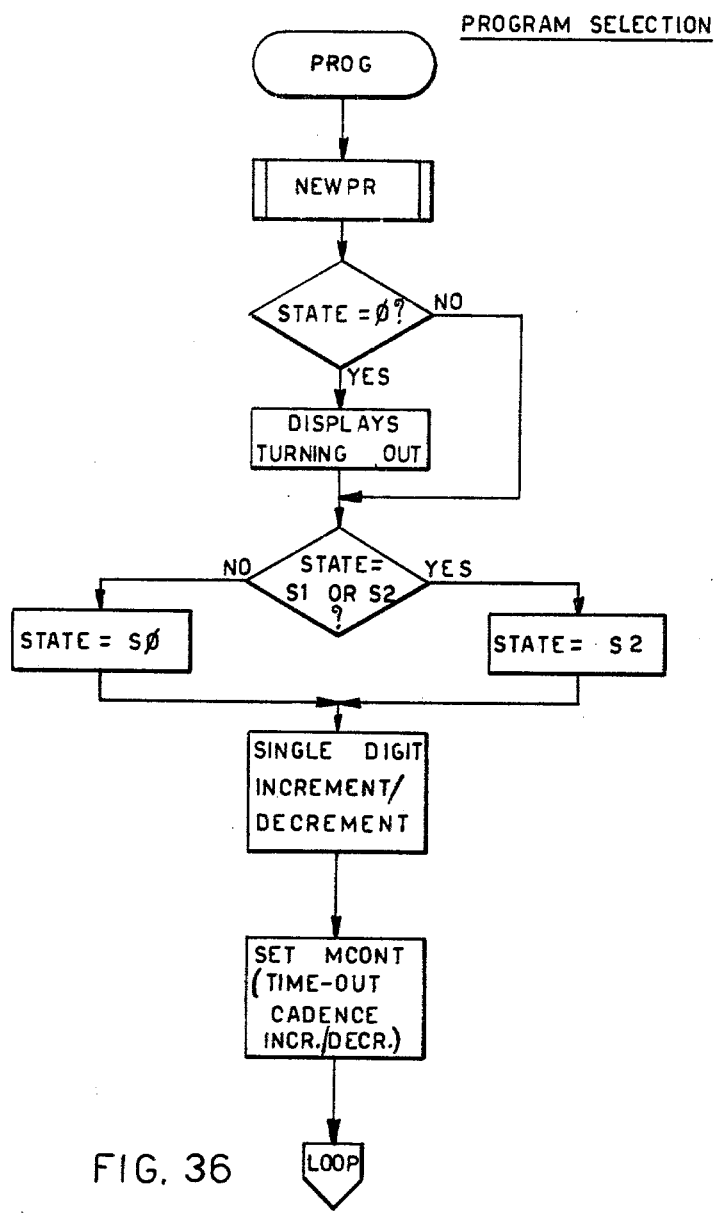
Figure 37:
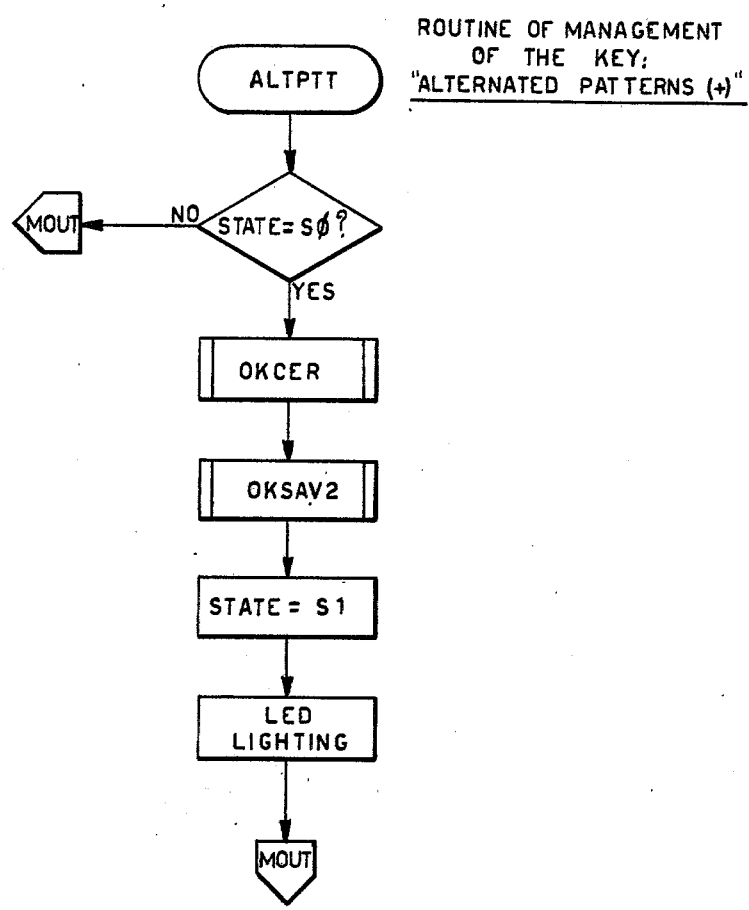
Figure 38:
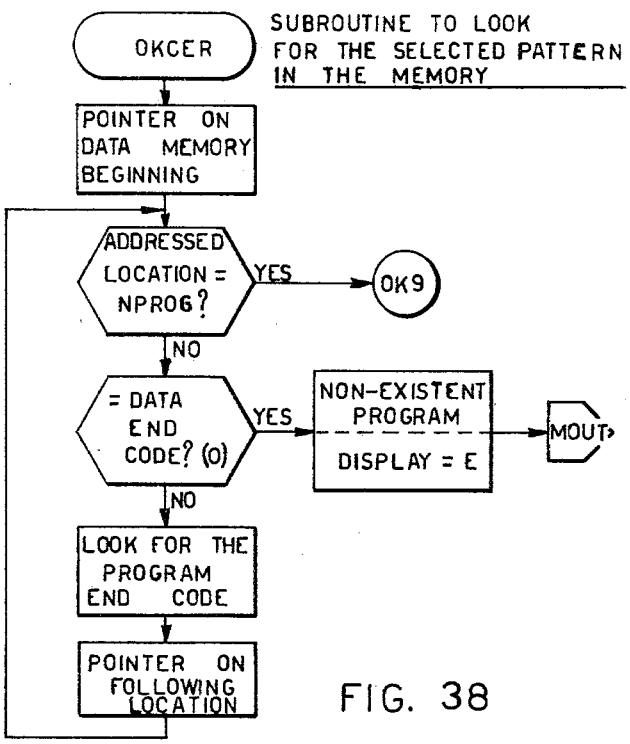
Figure 39:
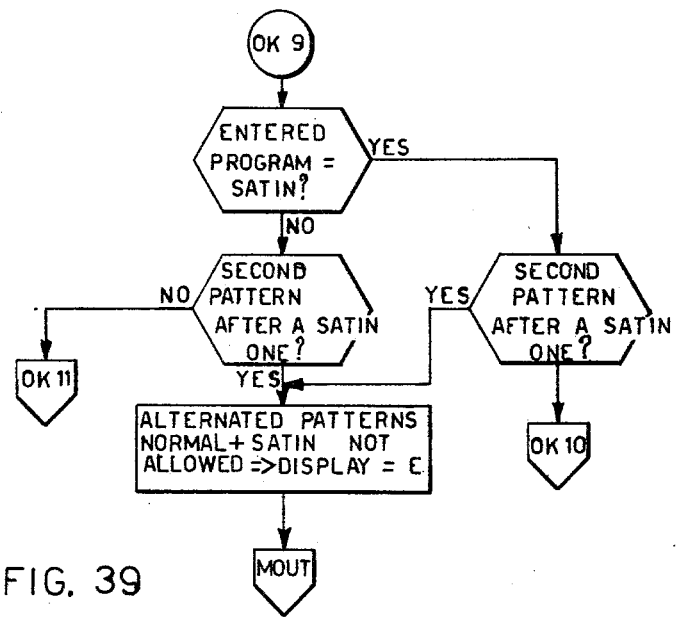
Figure 40:
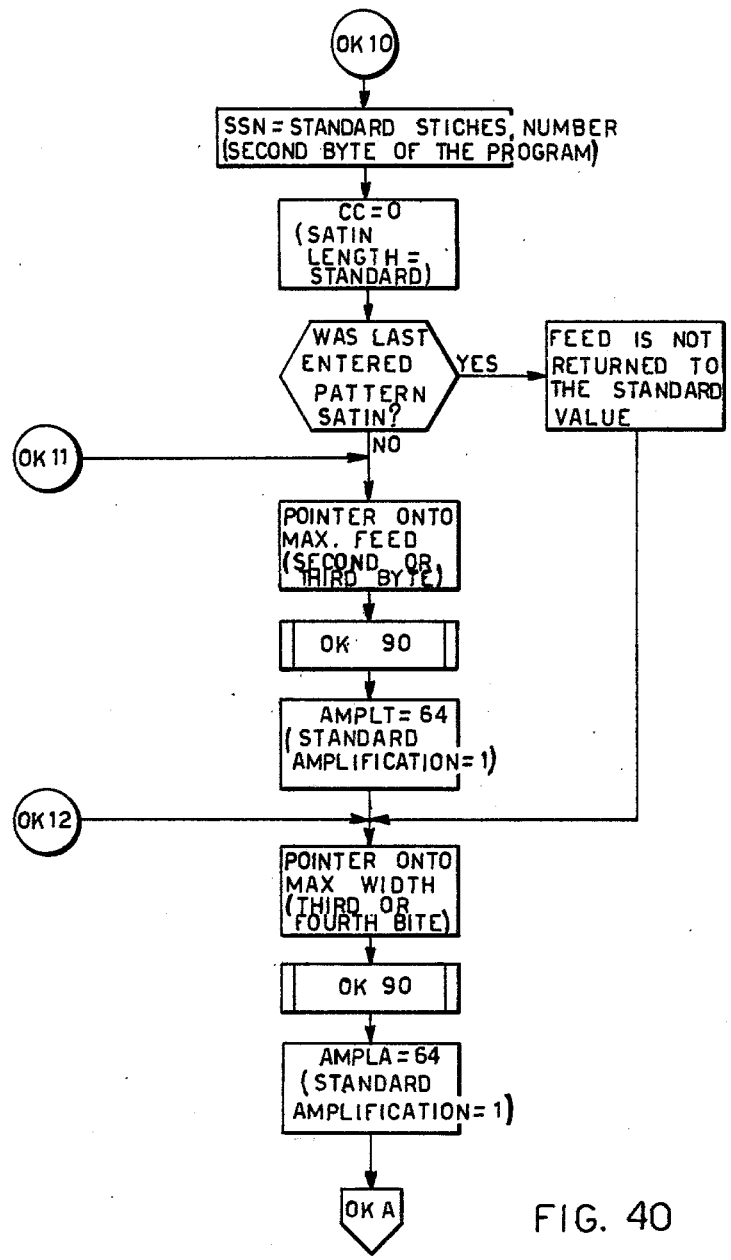
Figure 41:
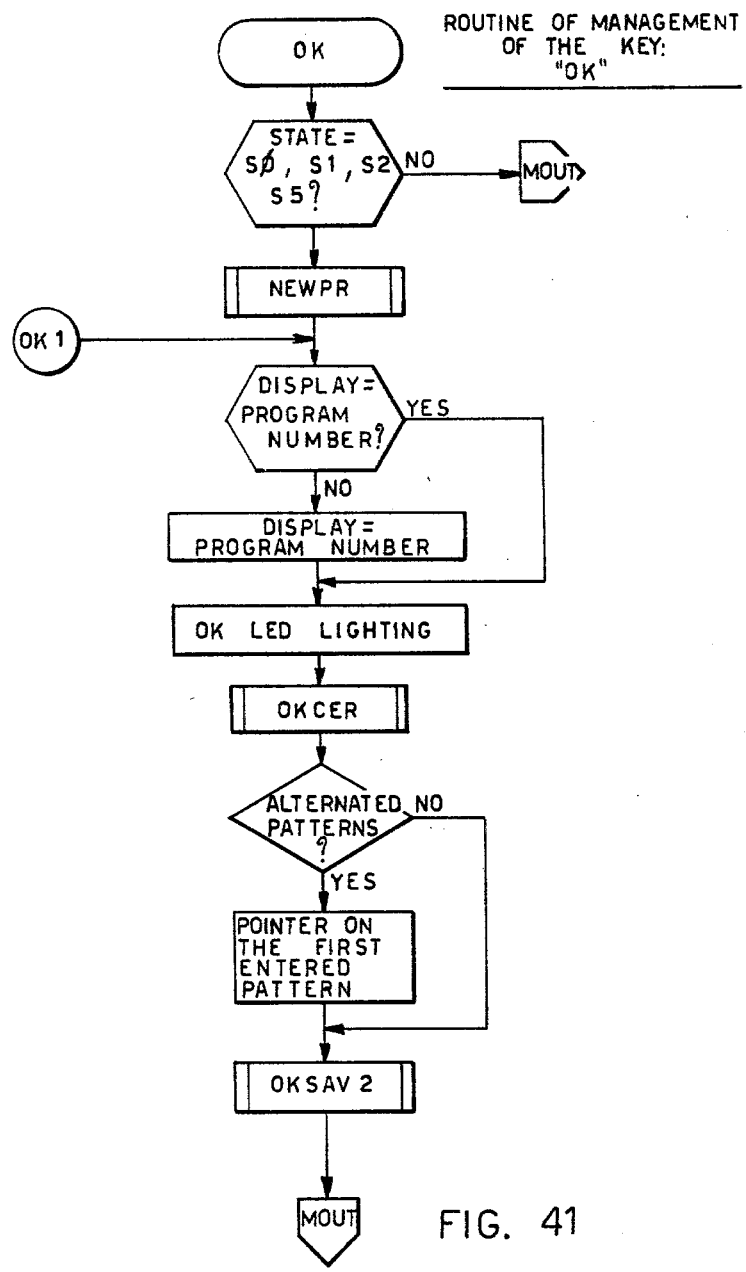
Figure 42:
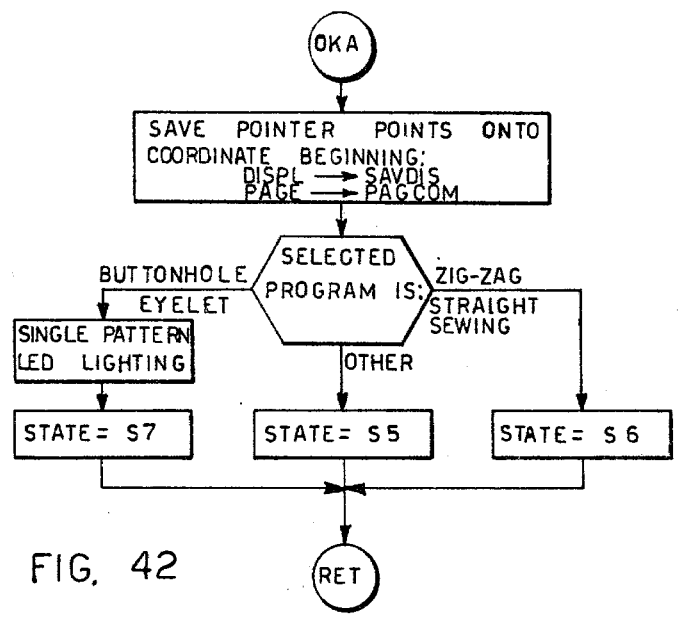
Figure 43:
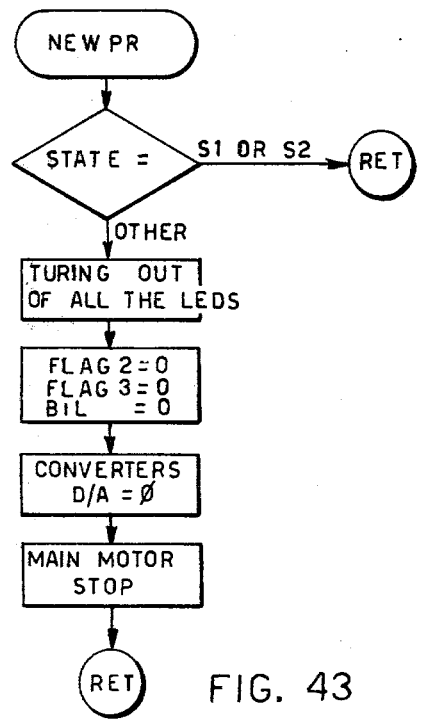
Figure 44:
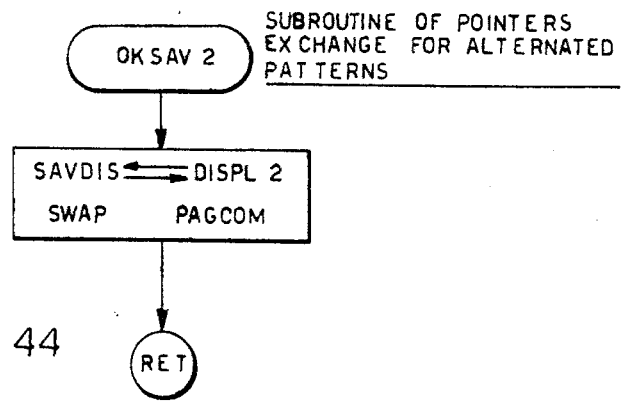
Figure 45:
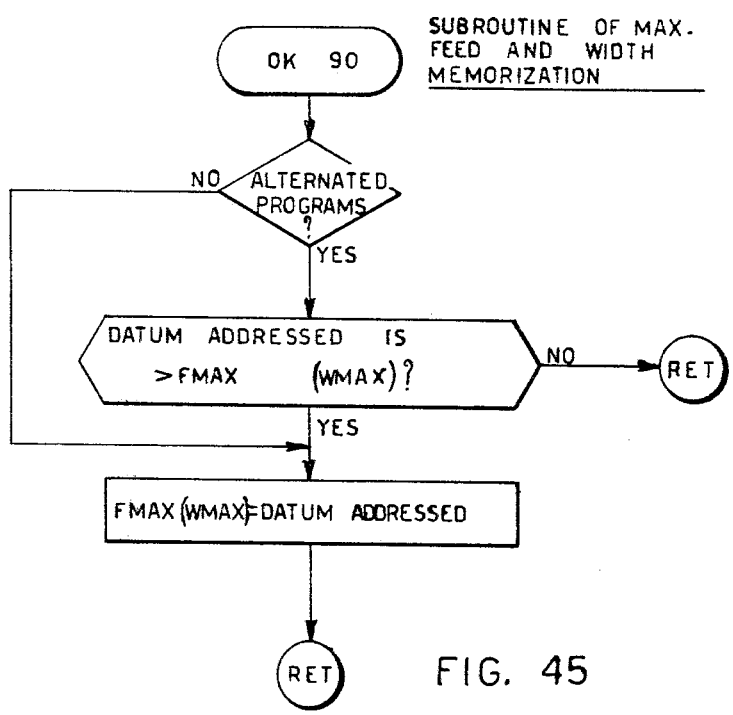
Figure 46:
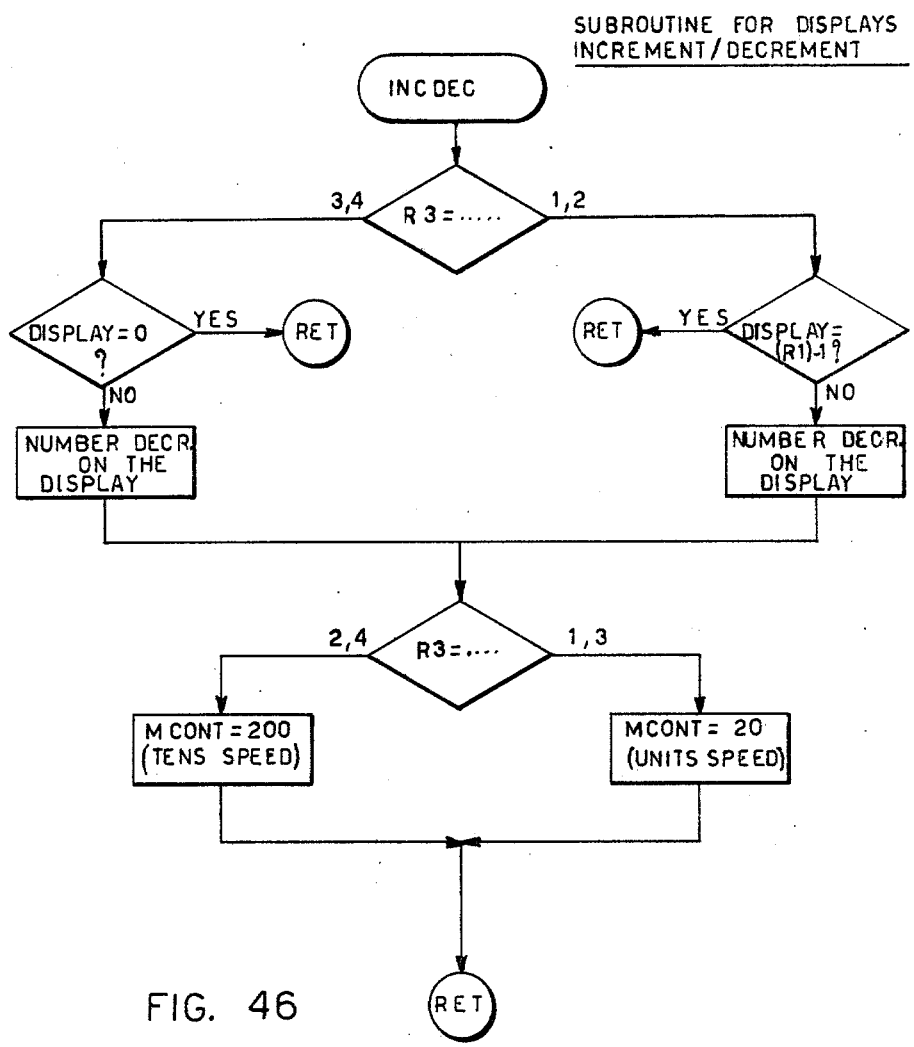

As is also shown and preferred in FIG. 1, the sewing machine 100 also preferably includes a conventional handwheel 104 which is located on the end of a common shaft 106 which rotates with the handwheel when driven by the sewing machine 100 main drive motor (not shown). The shaft 106 and main drive motor control the in and out reciprocation of the needle 108 as it conventionally sews on the fabric being fed past the needle 108 by the feed dog mechanism 132. The shaft 106 preferably contains a synchronizing signal generator arrangement 134-136-138-140 (to be described in greater detail hereinafter with reference to FIGS. 7 and 10) which preferably provides synchronizing signals to the eletronic control system 126 indicative of the position of starting movement of the actuator 124 which commands the bight of the stitch and the position of starting movement of the actuator 130 which commands the feed. Preferably these synchronization signals are provided by a system in which two synchronization signals are generated by a pair of moving magents 134–136 and a pair of stationary HALL-effect sensors or magnistors 138 and 140 which remain stationary. The two magnets 134–136 are preferably anchored to a disc of non-ferromagnetic material which rotates synchronously with the main shaft 106 of the sewing machine while the magnistors 138 and 140 remain stationary. As shown and preferred in FIG. 10, the presently preferred angle of rotation between the magnistors or HALL-effect sensors 138 and 140 is 175°, and the preferred angular points during the rotation of the main shaft 106 at which the two synchronizing signals occur are graphically illustrated in FIG. 10, with the first point being the position of starting movement of the actuator 124 which commands bight and the second position or point being the position of starting movement of the actuator 130 which commands feed and preferably occurring 175°, after the first point as the main shaft 106 rotates. Thus, FIG. 10 represents a graph of the actual needle bar stroke value versus the angular position of the handwheel 104 which corresponds to the degree of rotation of the main shaft 106 or magnets 134 and 136 which rotate synchronously therewith. The balance of the graph of FIG. 10 is self-explanatory and will not be described in any greater detail hereinafter other than to say that the control of the needle bar and the fabric feed, respectively, is supplied to the sewing machine 100 with due respect for the proper moments of synchronization with regard to the oscillation cycle of the needle 108. Accordingly, preferably the needle bar movement is imparted to the needle bar 120 while the needle 108 is out of the fabric and the drive for movement of the feed dog 132 is imparted to the feed dog 132 when the feed dog 132 is retracted.

Figure 2:
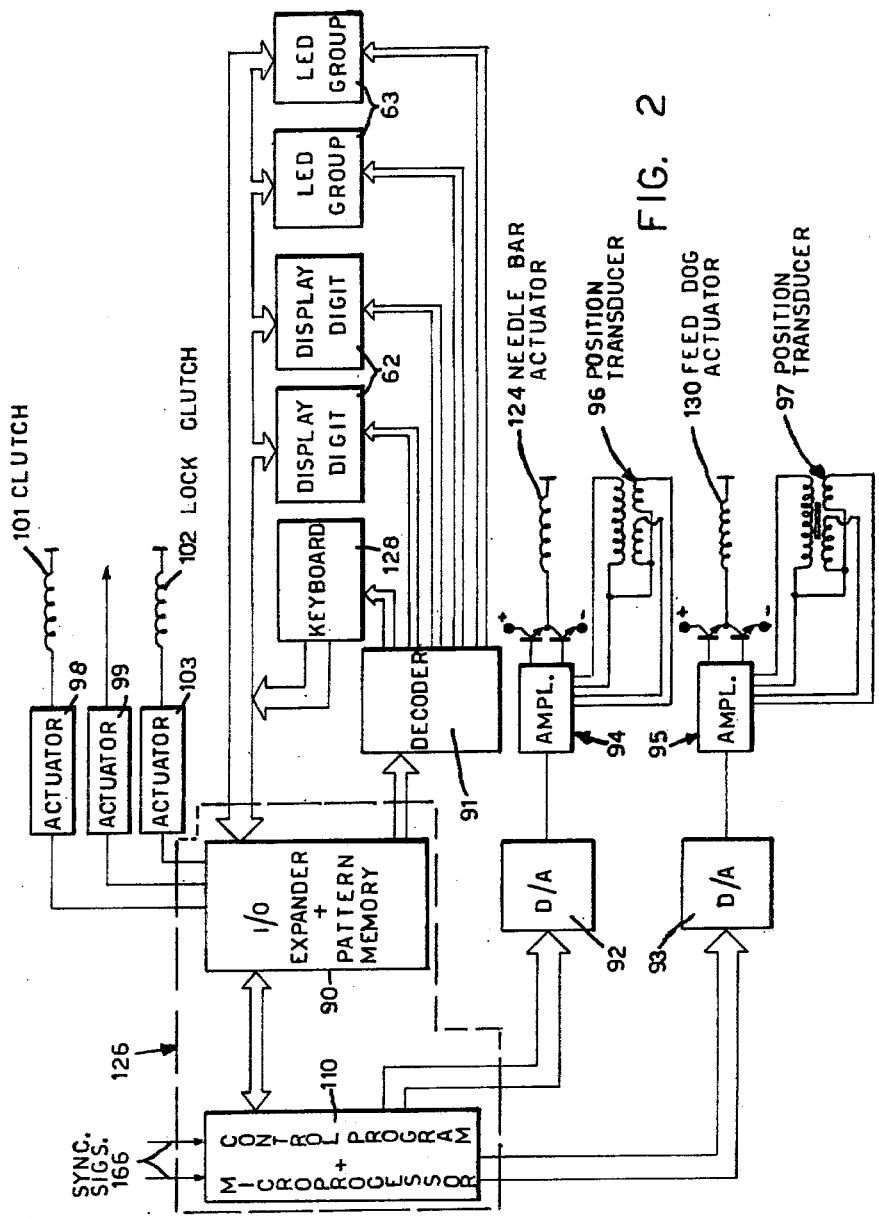
FIG. 2 is a block diagram of the preferred control system of the present invention.

Referring now to FIGS. 2 and 3, the presently preferred electronic control system 126 of the present invention is shown in greater detail than in FIG. 1, although still in terms of a functional block diagram. As shown and preferred in FIGS. 2 and 3, the electronic control system 126 of the present invention, which will be described in greater detail with reference to FIGS. 7–9, preferably includes a microprocessor or microcomputer 110 which is preferably an integrated circuit which contains the microcomputer, the associated control program read only memory, and associated input/output registers on a single chip, such as an INTEL 8049 having 2 K of ROM storage of the control program, including the executive control program. The various portions of the preferred microprocessor chip 110 are interconnected to each other on the integrated circuit chip in conventional fashion to transfer data and addresses in the appropriate manner. Thus, the microprocessor chip 110 preferably comprises a microcomputer including a central processing unit for controlling the various processing functions of microprocessor 110, such as both selection and functional operation on the stored stitch pattern data. The central processing unit of the microprocessor chip 110 performs the various functional operations in accordance with the instructions contained in the control program memory 142 (FIG. 7) which is connected on the microprocessor chip 110 via various data buses to the balance of the microprocessor circuitry, such as the central processing unit or arithmetic logic unit and input/output registers and various operative registers, all generally represented by reference numeral 144 in FIG. 7. These various operative registers contained in the microprocessor 144 are preferably used to store, for a predetermined time, intermediate results provided by the arithmetic logic operations of the central processing unit as well as to store the system state. The microprocessor 144 (FIG. 7) also preferably includes a random access memory for temporarily storing the data necessary to enable subsequent processing of data, such as stitch pattern data, by the central processing unit or arithmetic logic unit of the microprocessor 144. The input/output registers of the microprocessor 144 permit information exchange between the microprocessor chip 110 and the electromechanical actuators 124 and 130 and the keyboard 128. As further shown and preferred in FIG. 7, a clock generator 146 is provided, such as the crystal controlled clock generator 146 illustrated in FIG. 7, for providing a clocking signal to the central processing unit of the microprocessor 144 located on microprocessor chip 110. This clock generator 146 is preferably located outside the microprocessor integrated circuit chip 110 although, if desired, it could be provided as a portion thereof.

As will also be described in greater detail hereinafter, various operative control signal information corresponding to operative instructions are stored in the control program read only memory 142 which, together with the ability of the microprocessor 144 to functionally operate on this data, enables the miroprocessor chip 110 to convert stitch pattern or sewing data stored in the stitch pattern read only memory 90 into a succession of positions of the needle bar 120 and of the feed dog 132 to provide a desired stitch pattern arrangement on the fabric being sewn including the creation of stitch pattern arrangements not stored in the memory 90 per se, such as composite stitch pattern arrangements or ones in which a constant stitch density is maintained as the pattern length is varied. This ability of the microprocessor 144 to functionally operated on this stored stitch pattern data contained in pattern memory read only memory 90 permits considerable flexibility in the modification of the succession of positions of the needle bar 120 and of the feed dog 132 enabling the provision of the stored stitch patterns per se as well as the alteration of such stitch patterns to redefine them and create or provide different stitch pattern arrangements than were stored in the stitch pattern memory read only memory 90 as a result of selections made by the operator on the keyboard 128. These selections, as will be described in greater detail hereinafter, provide various input control signals to the microprocessor 144 which, in response thereto, operates on the stored stitch pattern data selected to provide the desired stitch pattern arrangement by providing output control signals appropriate to the corresponding electromechanical actuators 124 and 130 to result in the provision of the desired stitch pattern arrangement on the fabric being sewn.

As is shown and preferred in FIG. 3, the microprocessor chip 110 preferably controls separate position control circuits 148 and 150 for the needle bar 120 and the feed dog 132, respectively. Preferably, each of these position control circuits 148 and 150 is functionally identical. The microprocessor chip 110 output control signals which contain information corresponding to the desired position for the needle bar 120 and for the feed dog 132 are preferably digital output signals with the position control circuits 148 and 150 being analog circuits. However, if desired, the position control circuits 148 and 150 could be digital circuits with appropriate circuit modifications. Since the presently preferred output control signals are digital, they are provided to digital-to-analog converters 92 and 93, respectively, for position control circuits 148 and 150. As is shown and preferred in FIG. 4, the digital-to-analog converters 92 and 93, respectively, convert the digital output signal representing the desired position into corresponding analog voltage values which are provided as one input to a conventional error amplifier 156 (FIG. 4) in each of the position control circuits 148 and 150, respectively. The other input to the error amplifier, which is preferably a comparator 156, is an analog voltage corresponding to the actual position of the needle bar 120 for position control circuit 148, and to the actual position of the feed dog 132 for position control circuit 150. This "actual position voltage signal" is preferably provided to error amplifier 156 by means of a position transducer 96, for the needle bar 120, and a position transducer 97 for the feed dog 132. These position transducers 96, 97 conventionally convert the movement of the corresponding actuators 124 and 130, respectively, into appropriate voltage signals which are provided to the appropriate inputs of the error amplifiers 156. As is also shown and preferred in FIG. 3, the actuators 124 and 130 are preferably reversible DC motors, which are preferably mechanically linked via conventional mechanical linkages 158 to the appropriate position transducer 96 or 97 which, in turn, provides appropriate electrical signals to the input of the appropriate error amplifier 156. Each of the error amplifiers 156 then generates an error voltage signal as a result of the difference between the voltage representing the desired position which is provided to one input to the error amplifier 156 and the voltage representing the actual position which is provided to the other input to the error amplifier 156. As is further shown and preferred in FIG. 3, each of these error signals is then preferably provided as one input to a corresponding rate amplifier 160 whose other input is a signal proportional to the position rate or actual speed of the corresponding actuator 124 or 130, with this signal being provided from the appropriate opposite transducer 96 or 97, respectively, through an appropriate time differentiator circuit 162. The output of this rate amplifier 160 is then preferably provided to the corresponding reversible DC motor actuator 124 or 130 through an appropriate power amplifier 94 (for needle bar 120) or 95 (for feed dog 132) so as to provide the required power to the appropriate reversible DC motor actuator 124 or 130 to correct its position until the actual position corresponds to the required or desired position provided as the output signal from the microprocessor chip 110. Thus, a separate closed servo loop is preferably provided for the needle bar and feed dog position control circuits 148 and 150 providing both rate and position and feedback, with the corresponding amplifier 160 improving the dynamic performance of the closed servo loop by providing a pseudo speed loop. The error amplifier and rate amplifier 156 and 160 are generally diagrammatically represented by functional blocks 152 and 154 in FIG. 3, with functional block 152 representing the needle bar command signals provided to the power amplifier 94 and with functional block 154 representing the feed command signals provided to the power amplifier 95. This arrangement is also illustrated in FIG. 2 where the error amplifier 156, rate amplifier 160 and time differentiator circuit 162 have been omitted for purposes of clarity, as has the mechanical linkage 158 illustrated in FIG. 4.

Thus, the microprocessor chip 110 operates in conjunction with the keyboard management control circuitry, functionally represented by block 164, which controls and coordinates the operation of the keyboard 128 as will be described in greater detail hereinafter with reference to FIG. 9; with the previously mentioned static stitch pattern memory, which is a read only memory 90 for providing stitch pattern data to the microprocessor chip 110; with the previously mentioned control program memory 142 which provides control signals effecting the operation of the microprocessor chip 110; with the previously mentioned synchronizing pulses, generally represented in FIG. 3 by the functional block labeled with reference numeral 166, which are provided from the aforementioned synchronizing signal generator 134-136-138-140; and with the main motor lock function, generally represented by the functional block labeled with reference numeral 168, for stopping the main drive motor of the sewing machine 100. Preferably, this main motor lock function 168 is accomplished by providing a control signal to the relay coil of the conventional motor speed control circuit (not shown) employed in a conventional sewing machine so as to close this relay and lock the motor off. This main motor lock function is diagrammatically illustrated in greater detail in FIG. 5 by the functional block labeled main motor speed control relay lock signal 170 which is operatively connected to the conventional motor speed control circuit, represented by the functional block labeled with reference numeral 172 which is, in turn, connected to the conventional main drive motor of the sewing machine, represented by the functional block generally labeled with reference numeral 174. This main motor lock signal is provided from the microprocessor 144 as one of the output control signals therefrom via conventional input/output expander illustratively functionally shown as associated with the pattern memory 90 in FIG. 7. As shown and preferred in FIG. 7, this motor lock relay signal is provided by applying a bias signal to a conventional transistor 176 to bias the transistor into the conducting state.

Referring once again to FIG. 2, the aforementioned input/output expander which is shown as part of block 90 for purposes of illustration, has the function of substantially increasing the input and output signals available with respect to microprocessor chip 110. Preferably, eight of such input control signals are provided for conveyance of the input control signal information from the keyboard 128 to the microprocessor chip 110 and therefrom to the numeric displays 62, which preferably comprise a two digit display, as will be described in greater detail hereinafter with reference to FIG. 6, and to the light emitting diode groups 63 which are associated with the various selection keys of the keyboard 128, as will also be described in greater detail with reference to FIGS. 6 and 9. Thus, the keys of the keyboard 128, the lighting segments of the displays 62 and the light emitting diode groups 63 are preferably logically subdivided into groups of eight with there being, as shown and preferred in FIG. 9, ten groups in all comprising four groups of keys, two groups of display digit segments and four groups of light emitting diodes associated with the selection keys. Since all of the data to and from these groups preferably is transmitted over the same eight wires or circuit paths, it is essential that the microprocessor chip 110 know from which key group the signals have originated and, moreover, to which groups the control signals from the microprocessor chip 110 are to be directed. This routing function is preferably accomplished by a conventional decoder 91, which preferably comprises a keyboard display decoder and digit driver as illustratively shown in FIG. 9 which, in conjunction with the aforementioned input/output expander, outputs ten signals in sequence on as many wires, with these signals implementing, at different times, in a group at a time, data conveyance to the microprocessor chip 110 by every key group and data display by every light emitting diode group.

Although not shown, the sewing machine 100 is preferably conventionally operated by a conventional pedal control which operates the main drive motor to conventionally turn the sewing machine shaft 106. This function cannot occur in the present invention, however, until an appropriate stitch pattern arrangement has been selected by the keyboard 128 and acknowledged by the microprocessor chip 110. As was previously mentioned with respect to FIG. 10, the electronic control system 126 synchronizes its own operations according to the synchronizing signals 166 received from the synchronizing signal generator 134-136-138-140, with these signals indicating the moment at which the feed and needle bar drives must be operated. When these synchronizing signals are present, the microprocessor chip 110 preferably searches information about the feed and needle bar movement of the following stitch. When such data is found, the microprocessor chip 110 operates on this data in the manner indicated by the input control signals provided from the keyboard 128, such as by multiplying these signals by an amplification coefficient of one if the stored stitch pattern per se is to be produced and by some other factor if the stitch pattern data is to be modified or redefined. These digital output control signals, as was previously mentioned, are then sent to the digital-to-analog converters 92, 93 for driving the needle transverse oscillations and the feed strokes, respectively, with the digital output signals provided from the microprocessor chip 110 being changed into analog signals corresponding to the appropriate stitch position coordinates of the following stitch, which stitch position coordinates define the operative position of the needle bar actuator 124 and feed actuator 130 to appropriately position the needle bar 120 and feed dog 132, respectively, to accomplish the appropriate stitch position coordinates.

As is also shown and preferred in FIG. 2, under certain circumstances it may be necessary to stop the needle stroke at its upper end point, such as the end of a single pattern, or a buttonhole end, etc. In order to do so, actuators 98, 99 and 103 are preferably provided. Thus, under such circumstances, microprocessor chip 110 may in response to the appropriate input control signal from keyboard 128 provide an output control signal to actuator 98 to stop the main sewing motor by means of clutch 101, or to limit the machine speed by means of actuator 99 or to operate a special lock clutch 102 if desired by means of actuator 103.

Referring now to FIG. 6, the structure and function of the presently preferred keyboard 128 of the present invention shall be described in greater detail. As shown and preferred in FIG. 6, the keyboard 128 includes the aforementioned two digit digital display 62 with each of the digit displays preferably comprising a conventional segmented display as illustratively shown in FIG. 6. This common display 62 will display the two digit code number corresponding to the selected stitch pattern as well as other numeric information such as stitch pattern length and width, as will be described in greater detail hereinafter. The keyboard 128 also preferably includes a plurality of keys, with 16 such keys 180, 182, 184, 186, 188, 190, 192, 194, 196, 198, 200, 202, 204, 206, 208 and 210 being shown by way of example, for providing various input control signals to the microprocessor chip 110. As is also shown and preferred, keys 188-210, inclusive, all have associated light emitting diodes 63 located adjacent thereto for providing an indicating signal when the corresponding key has been selected, as will be described in greater detail hereinafter. However, as is also shown and preferred in FIG. 6, keys 180, 182, 184 and 186 which are preferably associated with incrementing and decrementing the display 62, with keys 182 and 186 being associated with the least significant digit and keys 180 and 184 being associated with the most significant digit of display 62, do not have associated light emitting diodes 63.

As was previously mentioned, the sewing machine 100 of the present invention cannot operate until the appropriate functions have been selected by the keyboard 128. Since the straight stitch and the conventional zig-zag stitch are normally frequently used stitch patterns, special keys are provided for these stitches as opposed to requiring the selection of these stitch patterns in the preferred manner for selection of any of the other stored stitch patterns. Thus, key 188 is provided for selection of the conventional zig-zag stitch and key 190 is provided for selection of the conventional straight stitch. Corresponding light emitting diode signal lamp 63 preferably turn on as soon as the corresponding key 188 or 190 is depressed. The selection must thereafter be confirmed by depressing the key 200 marked OK which confirms to the electronic control system 126 that this is the stitch pattern arrangement desired by the operator. The microprocessor chip 110 will then unlock the main drive motor and, thereafter, once the foot pedal control (not shown) is activated by the operator, the sewing machine 100 will sew in accordance with the selected stitch pattern. The previously mentioned keys 180, 182, 184 and 186 enable selection of all of the other stored stitch patterns apart from the zig-zag and straight stitch patterns, contained in the stitch pattern memory 90. As was previously mentioned, a two digit code number is assigned to each of these stored stitch patterns, such as illustrated in FIG. 47, and this two digit code number is introduced via the keyboard 128 by means of keys 180, 182, 184 and 186, with keys 180 and 182 incrementing the display from 0 through 9, and with keys 184, 186 decrementing the display from 9 through 0. When these keys 180–186 are depressed, the display 62 will immediately light up to display the corresponding digits. By keeping keys 180 or 182 depressed, the corresponding digit will continually increment. Alternatively, by keeping the corresponding key 184 or 186 depressed, the associated digit in display 62 will continually decrement. When the desired digit is reached, the key is released and the display 62 will stop. When the numerical combination in the display 62 corresponding to the desired stitch pattern is obtained, this information must be confirmed to the microprocessor chip 110. This is accomplished, as was previously mentioned, by then depressing the OK key 200 which causes a confirmation signal to be transmitted to the miroprocessor chip 110. The light emitting diode 63 located above key 200 will then turn on indicating to the operator that the machine 100 is ready to perform the selected stitch pattern arrangement. If, however, the operator selects a code number which does not correspond to a stored stitch pattern and thereafter depresses the OK key 200, the display 62 will provide an error signal indication such as the letter E, indicating to the operator that the selected stitch pattern does not exist in memory. The same error signal will appear if the operator has not appropriately selected the alternating pattern or composite stitch pattern arrangement function indicated by key 202, as will be described in greater detail hereinafter.

If it is desired to invert the stitch direction, or reverse feed, the operator then depresses the reverse feed key 210. The microprocessor chip 110 will then provide output control signals reversing the direction of feed and enabling the stitch pattern selected to be sewn in the reverse direction. The corresponding light emitting diode 63 associated with key 210 will then be turned on or lit to indicate to the operator that the reverse feed function has been selected. If the operator wishes to resume sewing in the forward direction, the reverse feed key 210 is depressed again and the microprocessor chip 110 will then provide output control signals causing the feed to revert to the forward feed direction and the associated light emitting diode 63 will go off. Thus, the output control signals from the microprocessor chip 110 which are provided in response to selection of the reverse feed function, reverses the polarity of the drive governing the feed, making possible a repetition, with reverse feed, of all of the selected patterns.

As was previously mentioned, key 190 preferably selects the straight stitch pattern. However, if key 190 is selected together with key 198, which corresponds to the tacking key, the sewing machine 100 will preferably automatically perform initial tacking and thereafter will continue to sew onward with the straight stitch pattern. When keys 190 and 198 are selected, the corresponding light emitting diode 63 will be turned on; however, when the initial tacking function has been completed, the light emitting diode 63 located adjacent key 198 will turn off indicating to the operator that the initial tacking has been completed. This initial tacking is a reinforcing operation which is carried out in a straight stitch to reinforce the sewing at the start of the stitch and prevent the unraveling of the thread. Preferably the output control signals provided by microprocessor chip 110 under these circumstances cause three straight stitches to be provided forward and three straight stitches to be provided backward to accomplish this initial tacking before the normal straight stitching pattern is commenced. Thus the microprocessor chip 110 of the present invention enables the automatic linking of different stitch patterns, such as the above example of the tacking stitch pattern and, thereafter, the straight stitch pattern, which may be automatically sequentially performed without interruption.

Selection of a single stitch of a selected stitch pattern may also be accomplished in accordance with the present invention through the use of key 208 on keyboard 128. Selection of this key 208 indicates to the microprocessor chip 110, by providing a corresponding input control signal, that the operator only desired that a single cycle of the selected pattern be performed and that the machine 100 is therefore to stop when this single pattern cycle has been performed. Thus, in response to the input control signal provided by activation of key 208, the microprocessor chip 110 provides the previously mentioned main motor lock signal to the motor speed control relay of the conventional motor speed control circuit 172 by biasing transistor 176 into the conducting state to thereafter close the motor speed control relay and lock the main drive motor off until this signal is terminated. This feature is particularly useful when sewing monograms in conjunction with selection of an alphabetic letter stitch pattern or as a method of enabling the operator to preview stitch pattern arrangements prior to actual use. As with the other function control keys, when the single pattern cycle key 208 has been selected the associated light emitting diode 63 turns on to indicate that this function has been selected.

Preferably, every stored stitch pattern has a predetermined stitch length and width which is stored in the stitch pattern memory 90. These stored associated stitch pattern lengths and widths can be controllably varied by the operator in the system of the present invention. Thus, if the operator desires to increase or decrease the associated stitch length of a previously selected pattern, the operator then selects key 194. This will provide an appropriate input control signal to the microprocessor chip 110 which will thereafter cause the stored stitch length of the previously selected stitch pattern to appear on the common display screen 62, preferably expressed in millimeters and tenth's of a millimeter, although the system can be readily arranged to express the stitch length in any desired unit of measure. The light emitting diode 63 located adjacent key 194 will then be lit or turned on to indicate to the operator that the digits displayed on the display screen 62 at that time correspond to the stored stitch length of the previously selected stitch pattern and not to the stitch pattern code number. The circuit is now enabled to permit the stitch pattern length to be varied by using the same incrementing and decrementing keys 180–182 and 184–186, respectively, which are used to change the display 62 in connection with selection of the stitch pattern code number and when the final desired stitch length appears in the display 62, the keys 180–186, are then released. If the operator now wishes to confirm the pattern code number of the stitch pattern whose length has just been varied, the operator need only press key 194 again and this will provide an input control signal to microprocessor chip 110 which will cause the stitch pattern code number to appear in display 62 in place of the previously displayed stitch length.

Similarly, the operator may increase or decrease the associated stored stitch width, that is the zig-zag width of the stitch. Thus, after the operator has selected the desired stitch pattern whose width is to be varied, the operator depresses key 192 which corresponds to the stitch width function. This provides an input control signal to the microprocessor chip 110 which will cause the stored stitch pattern width to then appear on the common display 62 in place of the selected stitch pattern code number in the same manner as was previously desired with respect to the stitch length. Again, the circuit is now enabled to permit this width to then be increased or decreased through the use of the incrementing and decrementing keys 180–182, 184–186, respectively, in the manner previously described with respect to the stitch length and the pattern code number. At this time, the light emitting diode 63 associated with key 192 will preferably be blinking to indicate to the operator that the width of the stitch pattern is being changed. Again, if the operator wishes to recheck which stitch pattern had been previously selected and whose width is being changed, the operator need only depress key 192 again and this will provide an input control signal to microprocessor chip 110 which will cause the corresponding stitch pattern code numer to appear in display 62 in place of the stitch pattern width.

The sewing machine 100 of the present invention also preferably provides for electronic balance control since balancing stitches may sometimes be useful to compensate for possible variations in fabric feeding. To accomplish such balancing, the operator first selects the corresponding stitch pattern code number and then depresses key 206 which corresponds to this balance function. This will provide an input control signal to the microprocessor chip 110 which will then cause the display 62 to display the number 0 indicating to the operator that the feeding values are perfectly adjusted or balanced in the machine memory. However, this adjustment is preferably on an assumption of normal sewing using standard fabrics and threads. Since the circuit is now enabled to permit the use of keys 180-186 to change this balance, if the operator wishes to change this balance, the incrementing and decrementing keys 180-182, 184-186 are then employed to increase or decrease this value. Preferably, however, the circuit is arranged to enable the balance to be varied only up to a maximum or down to a minimum of preferably plus or minus 0.9 millimeters, although other arrangements may be provided if desired. Preferably, the light emitting diode 63 located above ley 206 will begin blinking as soon as one of the incrementing or decrementing keys 180-186 is depressed to indicate to the operator that the balance value has been modified. If the operator wishes to again display the pattern code number of the selected stitch pattern, the operator need only depress key 206 again and this will provide an input control signal to microprocessor chip 110 which will cause this pattern code number to be displayed on display 62 in place of the balance data.

Figure 48:
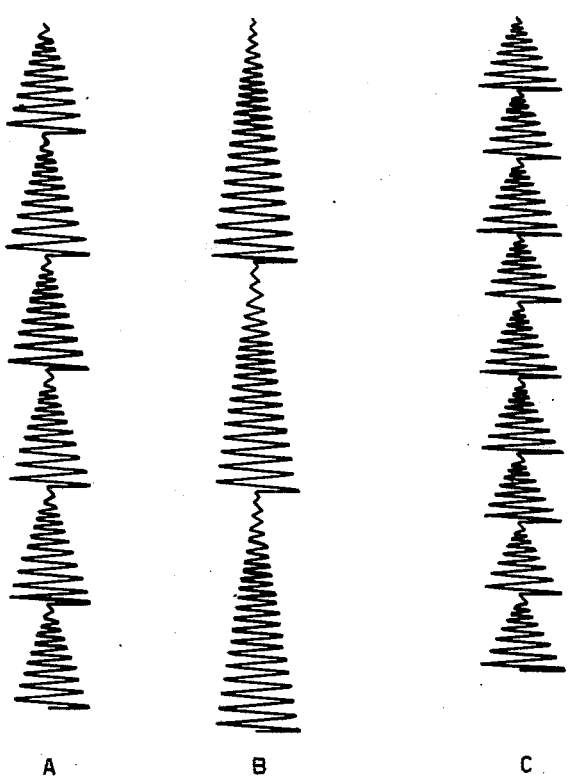
FIGS. 48A–C are a graphic illustration of the interpolation function of the system of the present invention for an arrow satin stitch pattern (pattern number 98 of FIG. 47), illustrating the maintenance of a constant stitch density and shape for the pattern as the stitch pattern length is varied.

As also shown and preferred in FIG. 6, and as illustrated in FIG. 48, in the presently preferred embodiment of the present invention, any satin pattern may have its length increased while the density of the stitch pattern remains unchanged as does the shape of the pattern. In order to accomplish this, the microprocessor chip 110 preferably interpolates the selected stitch pattern data to provide additional stitch position coordinates between the previously stored stitch position coordinates so as to thereby maintain the constant stitch density. In order to provide the appropriate input control signals to enable the microprocessor chip 110 to perform this function, the keyboard 128 is operated in the following manner. The desired stitch pattern code number is provided to the microprocessor chip 110 by the keyboard 128 in the manner previously described, such as the pattern code number corresponding to the arrow pattern (pattern number 98 in FIG. 47) illustrated in FIGS. 47-49. The density control key, key 204, is then depressed and the display 62 will then, under control of the microprocessor chip 110, display the stored stitch length of the selected stitch pattern. In addition, the light emitting diode 63 located adjacent key 204 will start blinking to indicate to the operator that the information displayed on display 62 now shows the length of a pattern and not its corresponding pattern code number. The operator would then depress the incrementing or decrementing keys 180-182, 184-186, respectively, to increase or decrease the length of the satin stitch pattern selected in the manner previously described. It should be noted that preferably a selected satin stitch pattern may be increased up to a length of preferably 99 millimeters, although this may be changed without departing from the present invention. If key 204 is again depressed this will provide an input control signal to microprocessor chip 110 which will cause the pattern code number corresponding to the selected satin stitch pattern code to again appear on the common display 62. Besides stretching or increasing the length of the selected satin stitch pattern, if the operator wishes to increase the density of the stitches, this may be accomplished by first repeating the operation described above with respect to varying the stitch length and thereafter repeating the operation described above with respect to varying the length of a satin stitch pattern. Thus, the operator may vary this satin stitch pattern length between the standard length, which is defined as the stored number of stitches multiplied by the actual feed, and the maximum permissible value, such as the previously mentioned 99 millimeters. This variation in satin stitch pattern length is the result of the interpolation of new intermediate positions among the previously stored stitch position coordinates for a given satin stitch pattern. The presently preferred interpolation algorithm for accomplishing this is as follows:

On selecting a satin stitch pattern the following variable is considered:

c = standard length/requested length

The variable "x" is considered as being equal to 0 and the variable "y" is defined by the expression $y = y_n + K(y_{n+1} - y_n)$ where the parameter y is defined as the needle bar coordinate of the next pattern repeat to be interpolated, the parameter $y_n$ is defined as the needle bar coordinate of the stored pattern repeat already executed, and the parameter $y_{n+1}$ is defined as the needle bar coordinate of the following stored pattern repeat. The variable K is the stitch point which initially = 0, but is increased in value at each interpolation of the above quantity c. Whenever the quantity c exceeds 1, this indicates that the interpolation has gone beyond the next pattern repeat of the selected stitch pattern. Under such circumstances, the above expression is still applicable with the exception that $K = K - 1$ and $n = n - 1$ (the next pattern repeat becomes the past pattern repeat; the new next pattern repeat is the following stored pattern repeat). It should be noted that in reality there are preferably two interpolations because even stitches and odd stitches of the selected stitch pattern must be interpolated independently. In addition, it should also be noted that the numerical values actually used in the interpolation program (see TABLE A) are not the same as mentioned above for the actual calculation; the factor K preferably varying between 0 and 255 instead of between 0 and 1.

Figure 49:
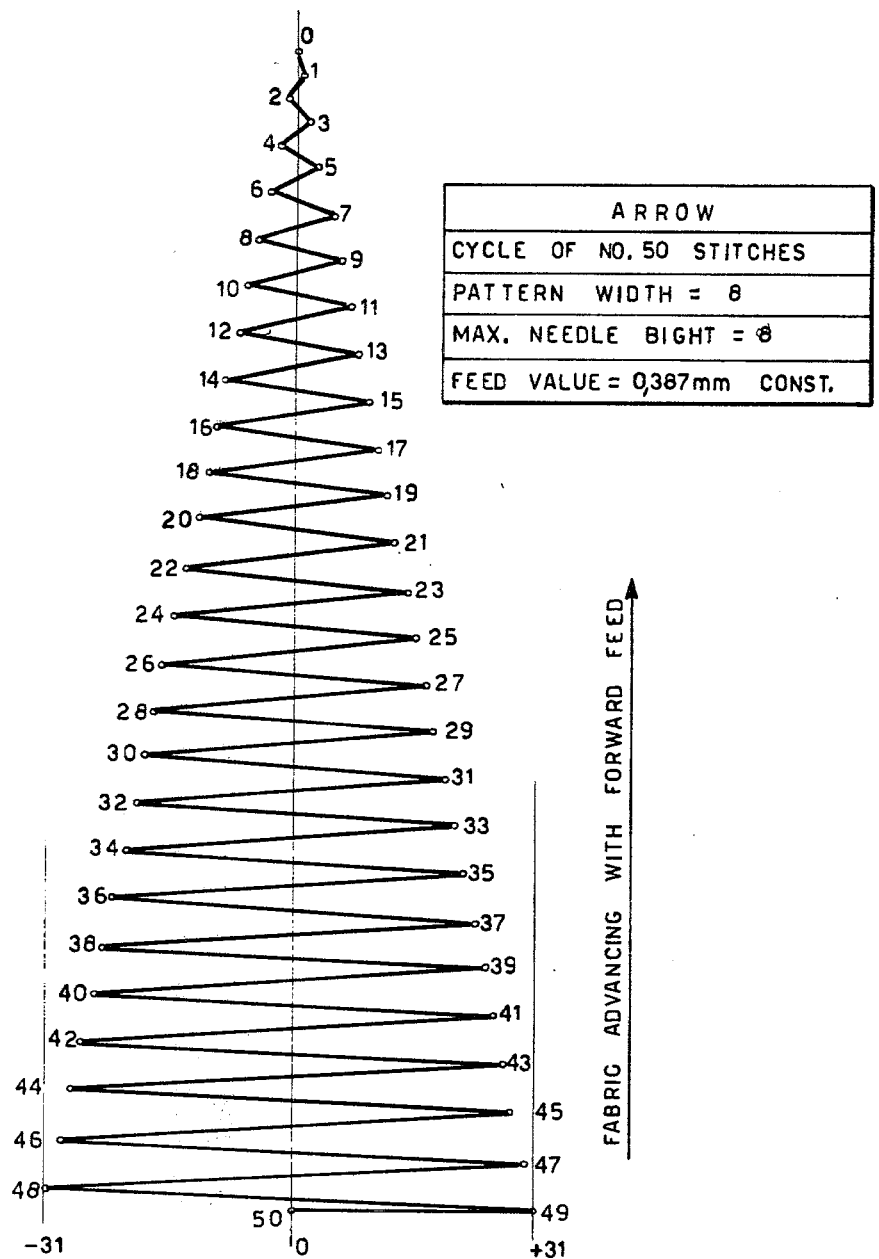
FIG. 49 is a graphic illustration of the arrow pattern of FIG. 48 showing the various stitch points comprising the stored stitch pattern data for this pattern.

In order to assist in understanding the function of maintaining a constant stitch density as the length of a satin stitch pattern is varied, the following example is given. Let us assume that the operator wishes to produce an arrow satin pattern (pattern number 98 in FIG. 47), such as indicated in FIG. 48. Now let us assume that the operator has available a thread of a diameter of 0.2 millimeters and a thickness of 0.3 millimeters. Assuming that the stored arrow pattern is formed of 50 stitches having a total associated desired length of 15 millimeters, and the operator wishes to change the stored value of the feed from 0.3 millimeters to 0.2 millimeters, it is apparent that the total length of the arrow, such as indicated in FIG. 49, if the number of stitches remained unchanged, would become 10 millimeters as compared with the associated length of 15 millimeters. This value could result in an appearance of the arrow which is not satisfactory or, in any event, which is different from the standard one. In order to bring the total length of the arrow to the desired 15 millimeters, it is therefore necessary to vary the number of stitches. Thus, if instead of 50 stitches, 75 were employed, still with a thread having a diameter of 0.2 millimeters, the total length of the pattern would remain 15 millimeters. Therefore, in the case of full stitches, this possibility permits varying the length of the total pattern as desired as a function of the diameter of the thread. Upon the variation of the two significant parameters of a satin stitch pattern, namely the diameter of the thread (and, therefore, the step of the feed) and the number of stitches (and, therefore, the total length of the pattern), the first variation must always precede the second from an operating standpoint. The provision of the aforementioned interpolation capability of the preferred system of the present invention enables a potential reduction in the number of stored stitch patterns and, thus, in the size or storage capacity of the stitch pattern memory 90, while making it possible to produce different forms of stitch patterns from a single matrix. As was previously mentioned, the results of such an interpolation function are illustrated, by way of example, in FIG. 48 for the arrow stitch pattern (pattern number 98 of FIG. 47), with the stored stitch position coordinates or stitch points for the arrow pattern being illustrated in FIG. 49.

Figure 50:
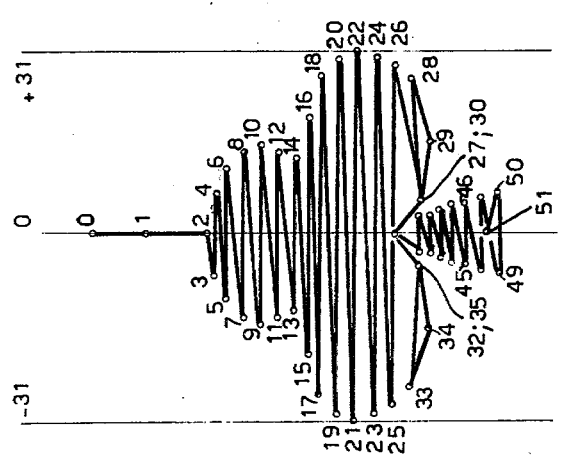
FIG. 50 is a graphic illustration similar to FIG. 49 illustrating the stored stitch pattern data corresponding to a club or clover pattern (pattern number 43 of FIG. 47)
Figure 51:
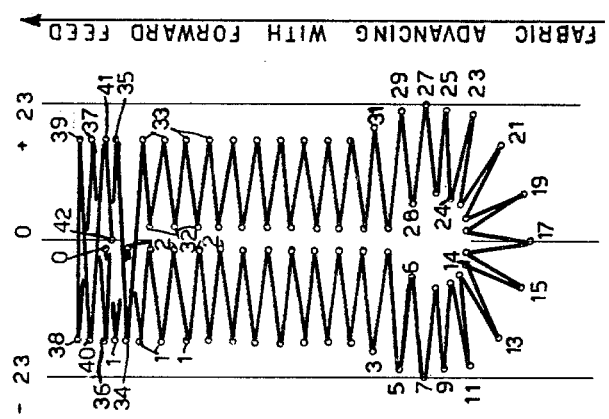
FIG. 51 is a graphic illustration similar to FIGS. 49 and 50 illustrating the stored stitch pattern data corresponding to a buttonhole stitch pattern.
Figure 52:
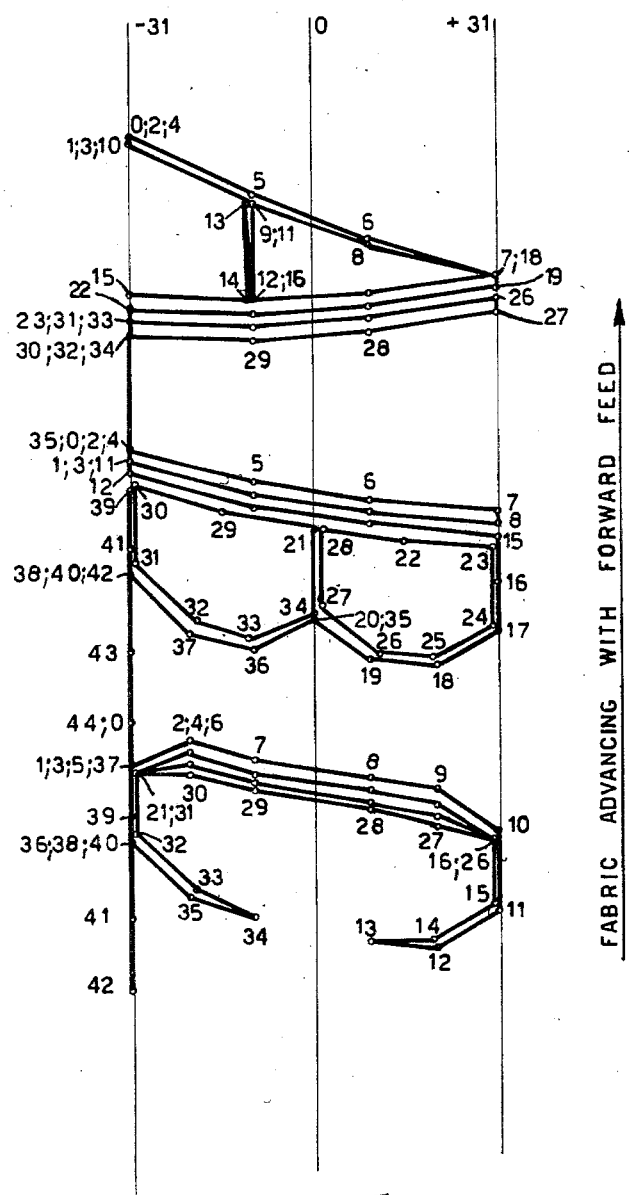
FIG. 52 is a graphic illustration similar to FIGS. 49–51 illustrating the stored stitch pattern data corresponding to various typical alphabetic letter patterns, such as the letters A, B, C, by way of example.

By way of example, other stored stitch pattern stitch position coordinates are illustrated in FIGS. 50–52. These stitch patterns are merely exemplary of the multitude of stitch patterns possible with the system of the present invention including the alphabetic letters illustratively represented, by way of example, by the letters A, B, C, in FIG. 52.

It should be noted that any time the current or power to the sewing machine system 100 is turned off, all changes or selections made by the operator are preferably automatically cancelled so that the system 100 will be in its initial state on power on. In this initial state, if the operator then selects a particular stitch pattern, the stitch pattern will be provided with its original stored stitch length and bight width values. In addition, if the operator desires to reset any individual stitch pattern to its original or stored values of stitch length and bight width without turning the unit off, the operator need only press key 200 which will provide an input control signal resetting the system and the modified stitch length, bight or zig-zag width, balance value, pattern length or stitch density will automatically be reset or restored to its original initial value.

As was previously mentioned, the system 100 of the present invention is also capable of automatically alternating selected stitch patterns to provide a composite stitch pattern arrangement consisting of alternate stitches from the selected patterns. Such an arrangement is illustrated by way of example in FIG. 47 at the bottom thereof. In order to provide the appropriate input control signals to the microprocessor chip 110 to obtain this alternate stitch pattern arrangement, such as the composite stitch pattern arrangement illustrated in FIG. 47 which alternates between the arrow pattern (pattern number 98) and the scallop pattern (pattern number 95), by way of example. However, in the system 100 of the present invention, the patterns which comprise the composite alternate stitch pattern arrangement must preferably all be of the same kind, that is they must all be satin stitch patterns or non-satin stitch patterns, with the exemplary arrangement illustrated in FIG. 47 being a composite stitch pattern arrangement of satin stitch patterns. In order to provide the appropriate input control signals to the microprocessor chip 110 to provide the composite stitch pattern arrangement, the operator first inserts the pattern code number of the first pattern which the operator wishes to employ in the composite stitch pattern arrangement in the manner previously described by utilizing the increment-decrement keys 180–186. The operator then depresses key 202 which is the key corresponding to the alternating or composite pattern function on the keyboard 128, thereby providing an input control signal corresponding thereto to microprocessor chip 110. At this time the light emitting diode 63 associated with key 202 will turn on to indicate to the operator that this function has been selected. The operator then again employs the increment-decrement keys 180–186 to select the next pattern code which the operator desires to employ in the composite stitch pattern arrangement. When this is completed, the operator depresses key 200 to provide an input control signal confirming to the microprocessor chip 110 that the desired composite stitch pattern arrangement has been selected. Although the above example only employs two different stitch patterns to provide a composite stitch pattern arrangement, it is of course within the skill of the art to employ more than two different stitch patterns in such a composite stitch pattern arrangement. Of course, if the operator only desires the machine 100 to perform a single repeat of the selected composite stitch pattern arrangement, then the operator also depresses key 208 as was previously described with reference to the single stitch function of machine 100. This is particularly useful when the operator desires to have the machine 100 stitch a monogram since the operator need only select a composite stitch pattern arrangement of alphabetic letter patterns comprising the desired monogram which will then be stitched with only one repeat of the letters.

In certain instances, the operator may desire to sew ornamental stitches using a double or twin needle. However, when such a twin needle is employed, the allowable width of the transverse oscillation of the needle 108, or corresponding needle bar 120, must be reduced so as to insure that the double needle remains within the defined area of the needle plate. Accordingly, when a double needle is inserted in place of needle 108, the operator then depresses key 196 on keyboard 128 to provide an input control signal to the microprocessor chip 110 indicating that a double needle has been inserted. This key 196 is depressed after the operator has selected the desired stitch pattern or patterns to be performed in the manner previously described. In response to this input control signal, the microprocessor chip 110 provides an output control signal to the needle bar actuator 124 to limit the width of the selected pattern to the preselected value, preferably 5 millimeters, so that the twin or double needle may be safely used. When key 196 is depressed, its associated light emitting diode 63 is lit to indicate to the operator that this function has been selected. It should be noted that in the presently preferred system 100 of the present invention, if the assigned width of the selected stitch pattern is less than the preselected 5 millimeter value required for the use of a double needle, then the microprocessor chip 110 does not provide any additional limiting output control signals to the actuator 124 since the stitch pattern width need not be changed. Thus, the width of the stitch pattern when the double needle function is selected is only varied in response to the activation of the double needle key 196 if the selected stitch pattern has a width greater than 5 millimeters, with the value in such an instance being reduced to 5 millimeters. The microprocessor chip 110 preferably accomplishes the required variation in width of the pattern in the same manner as previously described with respect to operator modification of the stitch pattern width in connection with key 192 on keyboard 128. Thus, as was described with respect to key 192, the stitch pattern memory 90 also contains data corresponding to the maximum coefficient of amplification for each stored stitch pattern, with this system 100 being capable of varying the stitch pattern width in an upward or downward direction since the system 100 of the present invention permits a maximum possible width of 8 millimeters when a single needle 108 is employed. For example, if the selected stitch pattern is the festoon pattern which has a corresponding stored pattern width of 5 millimeters, this stored stitch pattern width would not be changed when the double needle key 196 is activated. However, if a single needle is employed, and the operator wishes to vary the stored width of this pattern in conjunction with the operation of key 192, the microprocessor chip 110 may provide an output control signal having a maximum coefficient of amplification of 1.6 which is based on the ratio between the maximum permissible sewing width of 8 millimeters and the assigned stitch pattern width of 5 millimeters. There would, of course, for all practical purposes be no limitations in a downward direction. It should be noted that, preferably when the stitch pattern width is varied by the operator, the increment-decrement keys 180–186 instead of operating on the two digits independently as previously described with reference to variation in the pattern code number, preferably operate on the two digits jointly; that is, keys 180–184 preferably cause an advance or decrease in the pattern width number contained on the display 62 at a high speed to enable rapid change in the most significant digit while keys 182–186 preferably cause an increase or decrease in the least significant digit at a slower speed so as to permit a precise positioning of the least significant digit. During this stitch width variation function, the display 62 preferably operates for all intents and purposes as a two digit counter in which the most significant digit is obtained by carry-over from the least significant digit.

As illustratively shown in FIG. 51, one of the stored stitch pattern arrangements, by way of example, may be a buttonhole arrangement if desired, such as the conventional buttonhole or the buttonhole arrangement of the type illustrated in FIG. 51 wherein radial stitches are distributed to provide an eyelet with two lateral zig-zag stitch cordings and final tacking to provide the complete buttonhole illustrated in FIG. 51.

Figure 7:
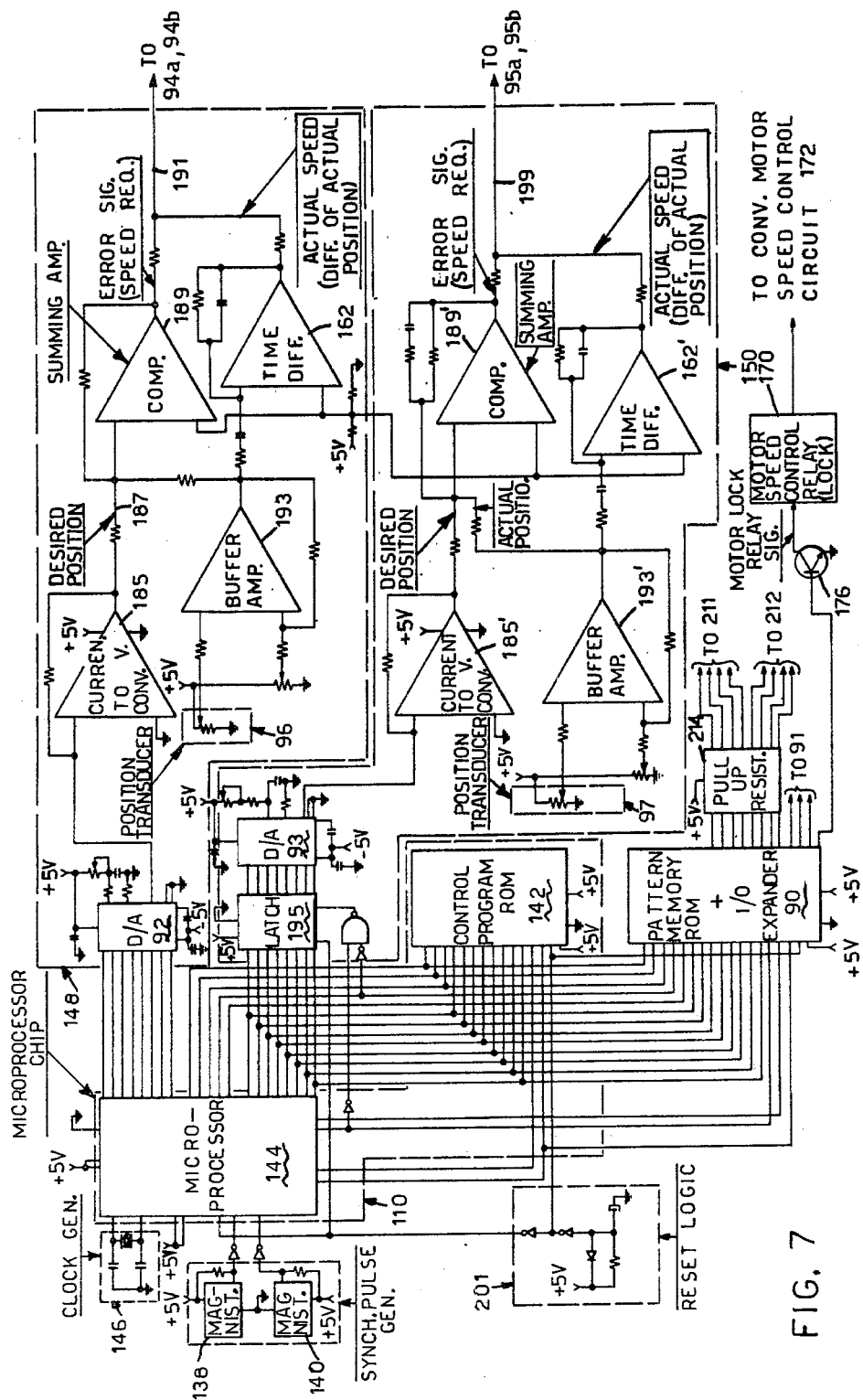
FIGS. 7, 8 and 9, taken together, comprise a schematic diagram, partially in block, of the control system of FIGS. 2–5, with FIG. 9 corresponding to the keyboard management control portion of the control system of the present invention.
Figure 8:
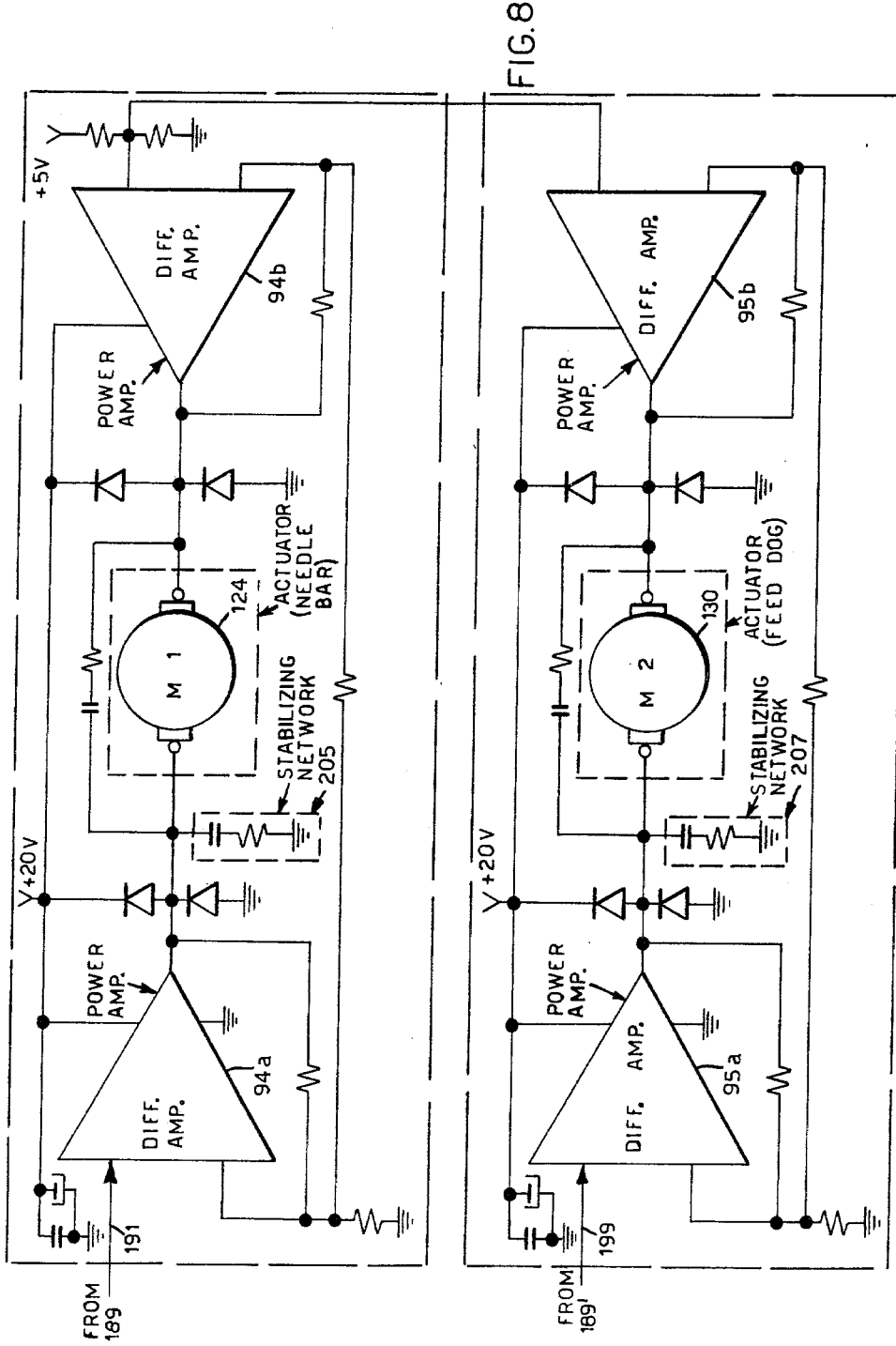
Figure 9:
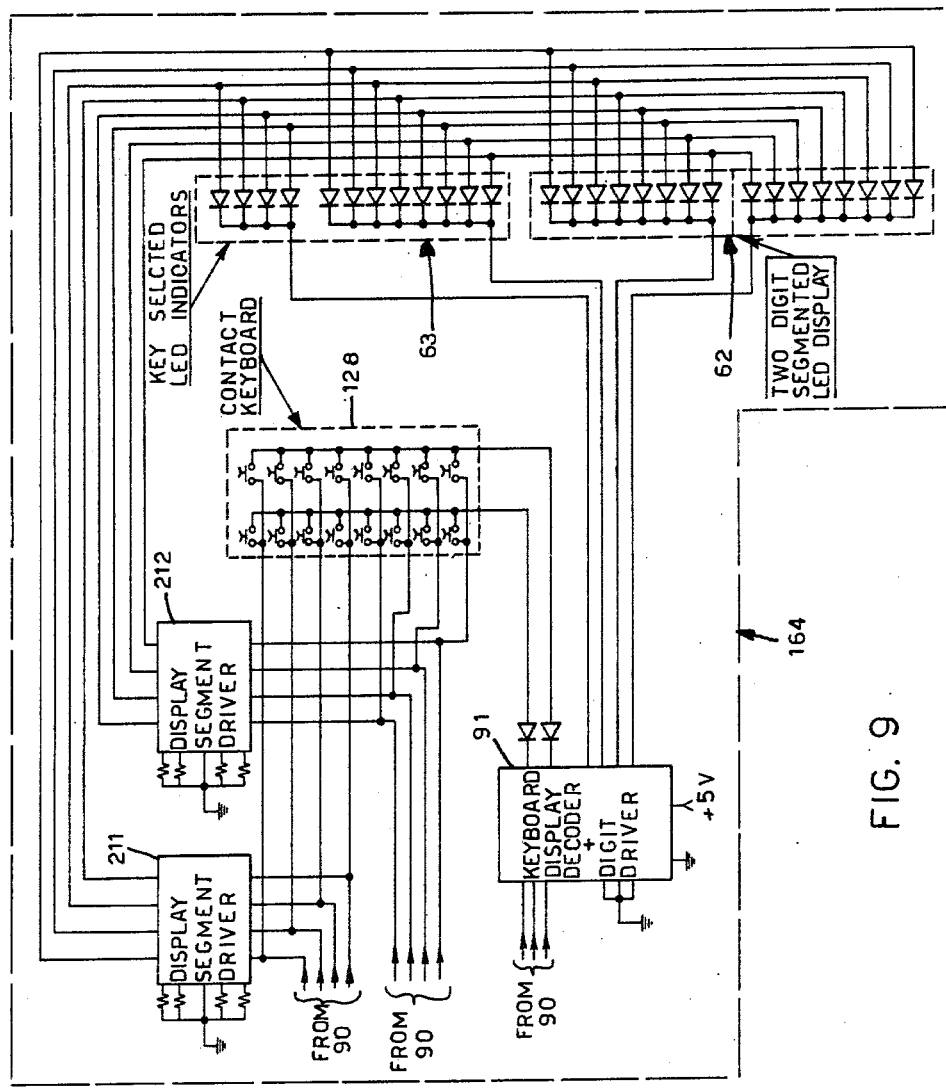

Now referring to FIGS. 7–9, a detailed schematic diagram of the system of the present invention corresponding to the functional block diagram of FIG. 3 is shown. Referring initially to FIG. 7, as was previously mentioned, the microprocessor integrated circuit chip 110, which may preferably be an INTEL 8049 having 2 K of ROM, comprises the microprocessor circuitry 144 together with the control program ROM 142. Of course, if desired, instead of employing the equivalent of an INTEL 8049, the system may employ the equivalent of an INTEL 8039 chip together with an INTEL 8755 EPROM, although it is preferred that a single microprocessor chip such as the INTEL 8049 be employed in the system of the present invention. As was previously mentioned, magnistors 138 and 140 provide sync pulses to microprocessor 144, with preferably two sync pulses being provided per cycle of shaft 106 and with magnistor 138 providing the bight sync pulse to microprocessor 144 via path 180 and with magnistor 140 providing the feed sync pulse to microprocessor 144 via path 182. Referring now to the needle bar control circuit 148, preferably the 8 bit output control signal of microprocessor 144 is connected to the input of the digital-to-analog converter 92, such as an Analog Device AD1408-7D. The output of digital-to-analog converter 92 is preferably connected to one input to a current-to-voltage converter 184, such as a National Semiconductor LM324N, to provide an analog voltage signal corresponding to the desired needle bar position via path 187 as one input to a comparator 189 connected as a summing amplifier, such as another National Semiconductor LM324N, which provides an error signal, in terms of a speed request, via path 191 to the differential amplifier configuration 94a, 94b connected as a power amplifier 94 (FIG. 8), such as SGS TDA2030 differential amplifiers. The needle bar control circuit 148 also preferably includes a conventional buffer amplifier 193, such as a National Semiconductor LM324N, which interfaces between the position transducer 96 and the time differential circuit 162, such as a National Semiconductor LM324N, whose output is the actual speed which is a differentiation of the actual position signal received from the position transducer 96.

Similarly, for the portion of the feed dog position control circuit 150 illustrated in FIG. 7, the 8 bit output control signal from microprocessor 144 is provided to a conventional latch 195, such as a Texas Instruments 74LS273, and therefrom to the digital-to-analog converter 93, such as an Analog Device AD1408-7D. The balance of the feed dog position control circuit 150 illustrated in FIG. 7 is preferably functionally identical with that described above with respect to needle bar position control circuit 148 and, accordingly, corresponding reference numerals followed by a prime are employed to indicate identically functioning components in the feed dog position control circuit 150. Suffice it to say that the resulting error signal or speed request output of comparator 189' is provided via path 199 to the differential power amplifier configuration 95a, 95b (FIG. 8), such as SGS TDA2030 differential amplifiers, connected as a power amplifier 95.

As is also shown and preferred in FIG. 7, reset logic 201 is preferably operatively connected to the microprocessor 144 and latch 195 for initializing the microprocessor 144 on power on, at which time the microprocessor 144 also preferably locks the main drive motor (not shown) until an appropriate stitch pattern such as one stored in pattern memory 90 is selected. Thereafter, as previously described, the main drive motor is released. This locking of the main drive motor was previously described with reference to FIG. 5 with respect to the motor lock relay signal output of transistor 176 which supplies a signal to the relay coil of the conventional motor speed control relay to close the relay and lock the main drive mmotor off until this signal is removed under control of the microprocessor 144.

Referring now to FIG. 8, the power amplifier-actuator portions of the needle bar position control circuit 148, and of the feed mechanism position control circuit 150 is shown. Each of these circuit portions preferably contains the aforementioned pair of differential power amplifiers, 94a, 94b, for needle bar circuit 148 and 95a, 95b for feed dog circuit 150, so as to preferably provide bidirectional control for the respective reversible DC motors 124 and 130 which preferably comprise the electromechanical actuators for effecting needle bar and feed mechanism positional control, respectively. Each of these actuators 124 and 130 has a respective associated conventional stabilizing network 205 and 207, respectively, as well as conventional diode protection circuitry.

Referring now to FIG. 9, a detailed schematic of the keyboard management control circuitry 164 is shown.

Keyboard management control circuit 164 preferably includes display segment drivers 211 and 212, such as Texas Instruments 75491 display segment drivers, for controlling the two digit segmented light emitting diode common display 62 as well as for controlling the various light emitting diodes 63 associated with the previously described activation of the keys on the keyboard 128. As shown and preferred in FIG. 7, a conventional pull-up resistor network 214 is provided between the pattern memory-I/O expander, functionally represented by block 90, which may be an INTEL C8755A, with this conventional pull-up resistor network being such as a Beckman 3.3 K package resistance. These display segment drivers 211 and 212 are conventional display segment drivers which, as shown and preferred in FIG. 9, are connected to the diode matrix comprising the two digit segmented LED display 62 as well as to the key selection or key activated light emitting diode indicators 63. The two digit segmented LED display 62 preferably provides a segmented display of the stitch pattern code number, the bight amplitude, the feed amplitude, the full pattern length and the amount of balance, as was previously described, whereas the single LEDs or light emitting diodes 63, which, as previously mentioned, are employed as signal indicators to indicate which key on keyboard 128 has been activated, preferably flash to indicate that the two digit display 62 corresponds to the key selection function as opposed to the stitch pattern code number and remains lit to then indicate that the function associated with the activated key corresponding to that light emitting diode indicator has been selected. The microprocessor 144 preferably conventionally scans the keyboard/LED matrix, via conventional key and display decoder and digit driver 91, such as a Signetics NE590, to control the operation of the various light emitting diodes in response to the input control signals provided from the keyboard 128, which is preferably a contact keyboard as illustrated in FIG. 9.

It should be noted that the feed actuator 130 associated with feed dog 132 preferably adjusts a device which determines the amount of positional displacement of the feed dog 132 but does not accomplish the actual displacement or movement which is accomplished by the main drive motor for the machine 100. This device (not shown) is preferably positioned when the feed dog 132 is under the needle plate. In addition, with respect to the synchronizing of the operation of the microprocessor chip 110, when the first pulse is sensed from magnistor 138, the microprocessor 144 commands the bight operation. This preferably occurs with the needle 108 out of the fabric. When the second pulse is sensed from magnistor 140, the microprocessor 144 establishes the feed displacement value. This preferably occurs when the feed dog is under the needle plate. In this manner, the microprocessor 144 preferably operates in synchronism with the operation of the machine 100.

Before describing the presently preferred control program which is stored in control program ROM 142, by way of example, and the stitch pattern memory programs corresponding either to an alphabetic letter program or a stitch pattern program other than alphabetic letters (such as illustrated in FIG. 47) which is stored, by way of example, in pattern memory ROM 90, some general aspects of the organization of the pattern program ROM 90 should be discussed. It should be noted that, as shown and preferred in FIG. 7, this pattern memory ROM 90 is preferably removably connectable to the microprocessor 144, such as via a standard EICO type of pluggable connector, so that it may be interchanged if desired with other pattern memory ROMs 90 having different information stored therein, such as by employing one pattern memory ROM having an alphabetic letter program stored therein which may be exchanged with another pattern program ROM having stitch pattern data other than alphabetic data stored therein. Thus, the library of selectable stitch patterns becomes infinite for all intents and purposes. In this regard, it should be noted that the stitch pattern capacity of the machine 100 is therefore unlimited since the pattern memory 90 may be readily replaced and since the keyboard 128 is a numeric selection keyboard not physically or conceptually confined to any particular patterns, since it merely selects a pattern code number.

In discussing the organization of the pattern program ROM 90, it should be noted that preferably every stitch is defined by two stitch position coordinates, one coordinate for the feed and the other coordinate for the needle bar. Preferably, every stitch position coordinate can be formed by 6 memory bits. Consequently, there are 63 different possible values, from −31 to +31, defining a network of 63 by 63 needle positions. The measuring unit of such stitch position coordinates or stitch points is termed the network step which preferably, by way of example, for the feed will be 12 millimeters/62 or 0.19 millimeters and preferably, by way of example, for the needle bar, 8 millimeters/62 or 0.13 millimeters. As was previously mentioned in describing position control circuits 148 and 150, a byte or 8 bits is preferably associated with each stitch position coordinate, with the two remaining bits of the byte preferably being employed for information concerning the stitch position coordinates. This information may be represented in biasing fashion, by way of example, as follows:

1-1—the coordinate is a feed; in the following byte the corresponding needle bar displacement is contained.

0-1—the coordinate is a feed; the corresponding needle bar displacement is not indicated expressly because it is the same as the preceding stitch pattern repeat.

1-0—the coordinate is a needle bar displacement; the corresponding feed is intended to be the same as the preceding stitch pattern repeat.

Storage of the above information in memory is represented below, by way of example, for an illustrative stitch pattern:

| feed | 1-1 | } 1st stitch |
| needle bar | ///// | |
| feed | 0-1 | 2nd stitch |
| feed | 0-1 | 3rd stitch |
| feed | 1-1 | } 4th stitch |
| needle bar | ///// | |
| needle bar | 1-0 | 5th stitch |
| needle bar | 1-0 | 6th stitch |
| feed | 1-1 | } 7th stitch |
| needle bar | ///// | |

The clear advantage of the above optimal coding method is in the memory saving obtained whenever the next stitch in a stitch pattern has either a feed value or a needle bar displacement which remains the same relative to the preceding stitch. Moreover, in such a system, each stitch pattern stored in the ROM 90 only needs the following information to be encoded:
- byte 1—pattern identification code number;
- byte 2—maximum feed of the stored stitch pattern;
- byte 3—maximum needle bight of the stored stitch pattern;
- byte 4 and following—stitch position coordinates; and
- last byte—stored stitch pattern program end.

It should also be noted that in the presently preferred encoding scheme, for satin stitch patterns the second byte, that is the byte after the pattern identification code number, also preferably contains information corresponding to the number of stitches comprising the satin stitch pattern. Thus, under such circumstances all of the remaining information of the type discussed above will be consequently shifted by one byte. It should also be noted that a particular end stitch pattern code may be provided which allows the microprocessor 144 to identify, such as in the execution of buttonholes and eyelets, the end of an intermediate portion which, contrary to the general operation of the microprocessor 144, will cause the sewing machine 100 to go on to the execution of the following portion of the stitch pattern rather than to resume sewing from the beginning of the same pattern (pattern repeat). It should also be noted that, preferably, in the system 100 of the present invention, 8 millimeters of lateral stroke of the needle 108 may be provided and plus or minus 6 millimeters for the feed of the material, although other parameters can be selected if desired. Moreover, the possible resolution of the useful stroke of the needle 108 and the feed in the machine 100 of the present invention is preferably the aforementioned one part in 255 which corresponds to the aforementioned coding of 8 resolution bits. However, in order to reduce the size of the ROM 90 storage capacity for the coding of all of the patterns which the machine 100 can produce, the resolution has been limited, by way of example, to 63 parts or approximately ¼ of the potential resolution of 255 parts possible with the system 100 of the present invention. However, the procedure for varying the parameters of the stitch pattern by the keyboard 128 is accomplished within the definition of resolution of one part in 255 thereby providing much greater operational flexibility, such as the aforementioned interpolation function. Thus, the resolution of one part in 63 merely refers to the stored stitch pattern data.

Referring now to FIGS. 11–46, these figures, which are self-explanatory, are program flow charts or logic control flow diagrams for the operation of the microprocessor chip 110 as it responds to the input control signals provided from the keyboard 128 to provide the appropriate output control signals to control the actuators 124 and 130. Since these FIGS. 11–46, which are to be read in conjunction with TABLES A–C, are self-explanatory, further explanation is not necessary. Suffice it to say that the following additional explanation of the various terms used in the flow diagrams of FIGS. 11–46 will provide all of the additional information that is necessary for one to readily understand these flow diagrams.

| | STATE WORDS | |
|---|---|---|
| (1) STATE. | It can take the following values: | |
| | 00H SZ | keyboard out; display = E |
| | 01H SO | program to be entered after SZ |
| | 02H S1 | key + pressed (only after S5) |
| | 04H S2 | program to be entered after S1 |
| | 20H S5 | normal program has been entered |
| | 40H S6 | zig-zag or straight sewing have been entered |
| | 80H S7 | buttonhole or eyelet has been entered |
| (2) FLAG. | Each bit has the following meaning: | |
| | bit0 FINE | released key |
| | bit1 FREPT | pressed key with request of periodical execution of the routine |
| | bit2 TCMD | acting feed control |
| | bit3 ACMD | acting needle bar control |
| | bit4 FPIU | acting request of alternate pattern |
| | bit5 | not used |
| | bit6 VERDE | single pattern request |
| | bit7 READY | pressed key |
| (3) FLAG2. | Four less significant bits of the byte indicate the variable shown on the display (LED lighting). Other four bits indicate the modified sizes (LED fixed light). The meaning of the bits is as follows: | |
| | bit0 and bit4 | pattern width |
| | bit1 and bit5 | feed |
| | bit2 and bit6 | balance |
| | bit3 and bit7 | satin length |
| (4) FLAG3. | Each bit has the following meaning: | |
| | bit0 S0 | signal from buttonhole/eyelet microswitch |
| | bit1 S1 | signal from microswitch (not used) |
| | bit2 S2 | signal from microswitch (not used) |
| | bit3 | not used |
| | bit4 RPARI | alternate pattern: even = 1; odd = 0 |
| | bit5 | acting satin stitch |
| | bit6 EVEN | even stitch = 1; odd stitch = 0 (only for satin stitch) |
| | bit7 SATREQ | interpolation request for satin. |

As was previously mentioned, an INTEL 8049 microprocessor chip may preferably be employed as the microprocessor chip 110 in the present invention, although other suitable microprocessor chips, or the equivalent thereof, may be employed. By way of example, the microprocessor chip 110 operational or control program which is stored in control program ROM 142 may preferably be conventionally written in the ASSEMBLER language normally employed for the INTEL 8049 microprocessor.

Similarly, the program listing of the stitch pattern program, such as for producing the various stitch patterns illustrated in FIG. 47, which is stored in the pattern memory ROM 90, is also written in the ASSEMBLER language normally employed with the INTEL 8049 microprocessor.

Similarly, the program listing corresponding to the alphabetic letter program for the 26 letters of the alphabet and which is stored in the pattern memory ROM 90, such as in a separate pattern memory ROM which may preferably be inserted in place of the pattern memory ROM which contains the stitch pattern information of FIG. 47, and which is exemplified by the typical letters A, B, C, illustrated in FIG. 52 is, written in the ASSEMBLER language used with the INTEL 8049 microprocessor.

Thus, the microprocessor chip 110 of the present invention is capable of processing in real time control signals corresponding to the needle bar and feed positions as well as functionally operating on the stored stitch pattern data to redefine this data to provide different stitch pattern arrangements than are stored in the memory 90 per se. By utilizing the system 100 of the present invention, much greater flexibility is provided than was previously available in the prior art known to applicants, both in the capacity of the system per se, as well as in its modularity or adaptability to expand or change the selectable stitch patterns which the system is capable of providing by merely changing the stitch pattern ROM 90.

What is claimed is:

1. In a household type sewing machine having a bed, a standard rising from said bed, a horizontal arm overhanging said bed, said arm ending with a head, a needle bar means disposed in said head for enabling transverse oscillation thereof relative to the direction of fabric feed in said sewing machine, feed means for adjusting the length and direction of said fabric feed, actuator means for adjusting the transverse position of said needle bar means and the positional displacement of said feed means in response to control signals provided thereto and first static memory means for retrievably storing a first plurality of different predetermined stitch patterns each having associated retrievably stored bight and feed data corresponding to predetermined positional coordinates of said needle bar and feed means for defining associated stitch position coordinates for the stitches comprising said stitch patterns; the improvement comprising microcomputer integrated circuit means operatively connected to said static memory means and to said actuator means for selectively processing said stored stitch pattern data from said static memory means and providing output control signals to said actuator means based on said selectively processed stitch pattern data for controllably adjusting at least the transverse position of said needle bar means, said microcomputer processing means comprising means capable of selectively controllably functionally operating on said stored stitch pattern data in response to input control signals for controllably redefining said stored stitch pattern data for selectively creating output control signals for said actuator means different from the output control signals corresponding to any one of said stored stitch patterns whereby at least the transverse position of said needle bar means may be selectively varied to redefine a stitch pattern arrangement different from any one of said stored stitch patterns; and keyboard means operatively connected to said microcomputer means for providing said input control signals to said microcomputer processing means for initiating the selection of at least one stored stitch pattern and the functional operation to be performed on said associated selected stored stitch pattern data for controllably adjusting at least the transverse position of said needle bar means for selectively providing a final stitch pattern arrangement from said plurality of stored stitch patterns, said keyboard means comprising a first common key selector having a plurality of modes for initiating selection of at least any one of a plurality of said stored stitch patterns in a first mode and for varying the positional coordinate data associated with said one selected stored stitch pattern in a second mode for providing said input control signals for enabling said selecting and redefining of said stored stitch pattern for providing said different stitch pattern arrangement whereby said sewing machine is capable of providing stitch pattern arrangements corresponding to said stored stitch patterns per se as well as to selectably creatable variations thereof.

2. An improved household type sewing machine in accordance with claim 1 wherein said keyboard means further comprises a second plurality of common keys for providing input control signals for enabling selection of at least one of a plurality of different ones of said functional operations to be performed on the stored stitch pattern data selected by said first common key selector.

3. An improved household type sewing machine in accordance with claim 2 wherein said keyboard means further comprises means for enabling display by said common display means of information corresponding to the functional operation selected by said second plurality of common keys.

4. An improved household type sewing machine in accordance with claim 3 wherein said keyboard means further comprises signal indicator means for indicating the status of at least said second plurality of common keys to the operator of said sewing machine.

5. An improved household type sewing machine in accordance with claim 4 wherein said signal indicating means comprises light signal indicating means.

6. In a household type sewing machine having a bed, a standard rising from said bed, a horizontal arm overhanging said bed, said arm ending with a head, a needle bar means disposed in said head for enabling transverse oscillation thereof relative to the direction of fabric feed in said sewing machine, feed means for adjusting the length and direction of said fabric feed, actuator means for adjusting the transverse position of said needle bar means and the positional displacement of said feed means in response to control signals provided thereto and first static memory means for retrievably storing a first plurality of different predetermined stitch patterns each having associated retrievably stored bight and feed data corresponding to predetermined positional coordinates of said needle bar and feed means for defining associated stitch position coordinates for the stiches comprising said stitch patterns; the improvement comprising microcomputer integrated circuit means operatively connected to said static memory means and to said actuator means for selectively processing said stored stitch pattern data from said static memory means and providing output control signals to said actuator means based on said selectively processed stitch pattern data for controllably adjusting at least the transverse position of said needle bar means, said microcomputer processing means comprising means capable of selectively controllably functionally operating on said stored stitch pattern data in response to input control signals for controllably redefining said stored stitch pattern data for selectively creating output control signals for said actuator means different from the output control signals corresponding to any one of said stored stitch patterns whereby at least the transverse position of said needle bar means may be selectively varied to redefine a stitch pattern arrangement different from any one of said stored stitch patterns; and keyboard means operatively connected to said microcomputer means for providing said input control signals to said microcomputer processing means for initiating the selection of at least one stored stitch pattern and the functional operation to be performed on said associated selected stored stitch pattern data for controllably adjusting at least the transverse position of said needle bar means for selectively providing a final stitch pattern arrangement from said plurality of stored stitch patterns, said microcomputer processing means comprising means capable of interpolating said stored stitch pattern data for a selected stitch pattern in response to said input control signals provided from said keyboard means for redefining said stitch position coordinates associated with said selected stitch pattern by creating new stitch position coordinates in said selected stitch pattern for generating an increased number of stitches for said selected stitch pattern without varying the shape associated with said selected stitch pattern, whereby the density and/or proper length of said selected stitch pattern may be controlled.

7. An improved household type sewing machine in accordance with claim 6 wherein said stored stitch patterns comprise a plurality of different satin patterns and said selected stitch pattern is selected from said plurality of satin stitch patterns.

8. An improved household type sewing machine in accordance with claim 6 wherein said interpolating means further comprises means for dynamically maintaining said constant stitch density as stitch feed is dynamically varied.

9. An improved household type sewing machine in accordance with claim 1 wherein said microcomputer processing means comprises means for selectively creating said different output control signals capable of enabling the bight of the stiches comprising said selected stitch pattern to be varied in response to said input control signals provided from said keyboard means, said bight being varied by said first common key selector in a second mode, said stored pattern being selected in a first mode.

10. In a household type sewing machine having a bed, a standard rising from said bed, a horizontal arm overhanging said bed, said arm ending with a head, a needle bar means disposed in said head for enabling transverse oscillation thereof relative to the direction of fabric feed in said sewing machine, feed means for adjusting the length and direction of said fabric feed, actuator means for adjusting the transverse position of said needle bar means and the positional displacement of said feed means in response to control signals provided thereto and first static memory means for retrievably storing a first plurality of different predetermined stitch patterns each having associated retrievably stored bight and feed data corresponding to predetermined positional coordinates of said needle bar and feed means for defining associated stitch position coordinates for the stitches comprising said stitch patterns; the improvement comprising microcomputer integrated circuit means operatively connected to said static memory means and to said actuator means for selectively processing said stored stitch pattern data from said static memory means and providing output control signals to said actuator means based on said selectively processed stitch pattern data for controllably adjusting at least the transverse position of said needle bar means, said microcomputer processing means comprising means capable of selectively controllably functionally operating on said stored stitch pattern data in response to input control signals for controllably redefining said stored stitch pattern data for selectively creating output control signals for said actuator means different from the output control signals corresponding to any one of said stored stitch patterns whereby at least the transverse position of said needle bar means may be selectively varied to redefine a stitch pattern arrangement different from any one of said stored stitch patterns; and keyboard means operatively connected to said microcomputer means for providing said input control signals to said microcomputer processing means for initiating the selection of at least one stored stitch pattern and the functional operation to be performed on said associated selected stored stitch pattern data for controllably adjusting at least the transverse position of said needle bar means for selectively providing a final stitch pattern arrangement from said plurality of stored stitch patterns, said static memory means comprising means for storing only said bight or said feed data which varies for the stitches comprising each of said plurality of stored stitch patterns for enabling optimal retrieval of said stitch pattern data by said microcomputer means in response to said input conntrol signals provided from said keyboard means.

11. An improved household type sewing machine in accordance with claim 1 wherein said keyboard means comprises means capable of initially providing input control signals corresponding to a plurality of different selected stitch patterns to said microcomputer means for providing a composite stitch pattern arrangement from said initially provided different selected stitch patterns, said microcomputer processing means comprising means capable of selectively creating said different control output signals from said plurality of different selected stitch pattern data in response to said initially provided input control signals from said keyboard means by selectively alternatively combining control signal information corresponding to individual stitch patterns of said plurality of different selected stitch patterns to provide composite output control signals to said actuator means based on said stored stitch pattern data corresponding to said different selected stitch patterns for providing said composite stitch pattern arrangement.

12. An improved household type sewing machine in accordance with claim 11 wherein said stored stitch patterns comprise a plurality of different satin stitch patterns and said selected stitch pattern is selected from said plurality of satin stitch patterns.

13. An improved household type sewing machine in accordance with claim 12 wherein said composite output signal creating means comprises means for repetitively creating said composite output signals.

14. An improved household type sewing machine in accordance with claim 11 wherein said composite output signal creating means comprises means for repetitively creating said composite output signals.

15. An improved household type sewing machine in accordance with claim 1 wherein said keyboard means comprises a common display means capable of selectively displaying information corresponding to the feed data and the bight data of said selected stitch pattern and of said final stitch pattern arrangement in a second mode, said pattern being selected in a first mode.

16. An improved household type sewing machine in accordance with claim 15 wherein said keyboard means further comprises means for selectively enabling display by said common display means of coded information corresponding to the selected stitch pattern.

17. An improved household type sewing machine in accordance with claim 15 wherein said keyboard means further comprises means for selectively enabling display by said common display means of the value of the feed data and the bight data of said selected stitch patterns and of said final stitch pattern arrangement.

18. An improved household type sewing machine in accordance with claim 16 wherein said common display means comprises a numeric signal display means.

19. An improved household type sewing machine in accordance with claim 1 wherein said microcomputer means has a plurality of input and output ports for said input and output control signals, respectively, said sewing machine further comprising an input/output expander means operatively connected to said microcomputer means input/output ports for increasing the capability of said microcomputer means to respond to and provide input and output control signals, respectively.

20. An improved household type sewing machine in accordance with claim 19 wherein said keyboard means comprises a plurality of common selection keys including said first common key selector, said machine further comprising a decoder means operatively connected between said microcomputer means and said expander means for controllably providing said input control signals from said keyboard means by key group to said microcomputer means.

21. An improved household type sewing machine in accordance with claim 20 wherein said keyboard means comprises a common display means capable of displaying both data stored in said static memory means and data provided as a result of the provision of selected input control signals from said keyboard means, said decoder means being further operatively connected to said keyboard means for controllably enabling said common display means.

22. An improved household type sewing machine in accordance with claim 1 wherein said microcomputer means output control signals are digital output control signals and said actuator means comprise analog means, said sewing machine further comprising analog-to-digital converter means operatively connected between said microcomputer means digital output and said actuator means analog input for converting said digital output control signals from said microcomputer means into analog output control signals for said actuator means.

23. An improved household type sewing machine in accordance with claim 1 wherein said first static memory means is removably connectable to said micrcomputer means and is interchangeable with a second static memory means containing a second plurality of different predetermined stitch patterns each having associated retrievably stored bight and feed data corresponding to predetermined positional coordinates of said needle bar and feed means for defining associated stitch position coordinates for the stitches comprising said second plurality of stitch patterns, said interchangeable second static memory means being removably connectable to said microcomputer means in place of said first static memory means for retrievably providing said stored stitch pattern data thereto.

24. An improved household type sewing machine in accordance with claim 23 wherein said second static memory means second plurality of stitch patterns comprise stored stitch patterns corresponding to the letters of the alphabet.

25. An improved household type sewing machine in accordance with claim 1 wherein said first static memory means first plurality of stitch patterns comprise stored stitch patterns corresponding to the letters of the alphabet.

26. An improved household type sewing machine in accordance with claim 1 wherein said actuator means comprises separate electromechanical actuator means for said needle bar means and said feed means.

27. An improved household type sewing machine in accordance with claim 1 wherein said microcomputer processing means functional operating means is capable of controllably functionally operating on said stored stitch pattern data in accordance with at least any one of a plurality of different functional operations in response to said input control signals for controllably redefining said stored stitch pattern for selectively creating said different output control signals, and said keyboard means comprises means for initiating said selection of said stored stitch pattern from said plurality of stored stitch patterns and said selection of said functional operation from said plurality of functional operations for providing said selectably creative variations.

28. An improved household type sewing machine in accordance with claim 1 wherein said microcomputer processing means functional operating means is capable of selectively creating said different output control signals for selectively varying both said transverse position of said needle bar means and said positional displacement of said feed means to redefine said different stitch pattern arrangement.

29. An improved household type sewing machine in accordance with claim 1 wherein said keyboard means comprises a first common key selector for enabling numeric selection of said stored stitch pattern data for a plurality of different stored stitch patterns, each of said numerically selectable different stored stitch patterns having a different corresponding numeric selection code, the number of keys comprising said first common key selector being less in number than the number of possible stitch patterns numerically selectable by said common key selector.

30. An improved household type sewing machine in accordance with claim 29 wherein said keyboard means further comprises a common digital display means for displaying numeric information corresponding to the stored stitch pattern data selected by said first common key selector, said first common key selector comprising means for incrementing and decrementing said digital display in accordance with selection of the numeric indication corresponding to the desired stored stitch pattern to be selected.

31. An improved household type sewing machine in accordance with claim 1 wherein said microcomputer integrated circuit means is a microprocessor means.

32. In a household type sewing machine having a bed, a standard rising from said bed, a horizontal arm overhanging said bed, said arm ending with a head, a needle bar means disposed in said head for enabling transverse oscillation thereof relative to the direction of fabric feed in said sewing machine, feed means for adjusting the length and direction of said fabric feed, actuator means for adjusting the transverse position of said needle bar means and the positional displacement of said feed means in response to control signals provided thereto and first static memory means for retrievably storing a first plurality of different predetermined stitch patterns each having associated retrievably stored bight and feed data corresponding to predetermined positional coordinates of said needle bar and feed means for defining associated stitch position coordinates for the stitches comprising said stitch patterns; the improvement comprising microcomputer integrated circuit means operatively connected to said static memory means and to said actuator means for selectively processing said stored stitch pattern data from said static memory means and providing output control siggnals to said actuator means based on said selectively processed stitch pattern data for controllably adjusting at least the transverse position of said needle bar means, said microcomputer processing means comprising means capable of selectively controllably functionally operating on said stored stitch pattern data in response to input control signals for controllably redefining said stored stitch pattern data for selectively creating output control signals for said actuator means different from the output control signals corresponding to any one of said stored stitch patterns whereby at least the transverse position of said needle bar means may be selectively varied to redefine a stitch pattern arrangement different from any one of said stored stitch patterns; and keyboard means operatively connected to said microcomputer means for providing said input control signals to said microcomputer processing means for initiating the selection of at least one stored stitch pattern and the functional operation to be performed on said associated selected stored stitch pattern data for controllably adjusting at least the transverse position of said needle bar means for selectively providing a final stitch pattern arrangement from said plurality of stored stitch patterns, said static memory means plurality of stored stitch patterns comprising an initial tacking stitch pattern and a straight stitch pattern, said keyboard means comprising means for providing said input control signals for initiating selection of said initial tacking stitch pattern coupled with said straight stitch pattern, said microcomputer means providing output control signals to said actuator means for controlling said position of said needle bar means and said feed means to provide said tacking stitch pattern followed by said straight stitch pattern as said stitch pattern arrangement in response to said output control signals, said tacking stitch pattern only being provided for a predetermined number of stitches, said straight stitch pattern being continuously providable thereafter.

33. In a household type sewing machine having a bed, a standard rising from said bed, a horizontal arm overhanging said bed, said arm ending with a head, a needle bar means disposed in said head for enabling transverse oscillation thereof relative to the direction of fabric feed in said sewing machine, feed means for adjusting the length and direction of said fabric feed, and actuator means for adjusting the transverse position of said needle bar means and the positional displacement of said feed means in response to control signals provided thereto; the improvement comprising static memory means for retrievably storing stitch pattern data capable of providing a plurality of different composite stitch pattern arrangements having associated bight and feed data corresponding to stitch positional coordinates of said needle bar and feed means; microcomputer integrated circuit means operatively connected to said static memory means and to said actuator means for selectively processing said stored stitch pattern data from said static memory means and providing output control signals to said actuator means based on said selectively processed stitch pattern data capable of selectably controllably adjusting the transverse position of said needle bar means and the positional displacement of said feed means, said microcomputer processing means comprising means capable of selectively controllably functionally operating on said stored stitch pattern data in response to input control signals for selectively creating output control signals for said actuator means capable of defining a selected composite stitch pattern arrangement; and keyboard means operatively connected to said microcomputer means for providing said input control signals to said microcomputer processing means for initiating the selection of said stored stitch pattern data and the functional operation to be performed on said selected stored stitch pattern data for selectably controllably adjusting the transverse position of said needle bar means and the positional displacement of said feed means for selectively providing said selected composite stitch pattern arrangement from said stored stitch pattern data, said keyboard means comprising a first common key selector having a plurality of modes for initiating selection of at least any one of a plurality of said stored stitch patterns in a first mode and for varying the positional coordinate data associated with said one selected stored stitch pattern in a second mode for providing said input control signals for enabling said selecting and redefining of said stored stitch pattern for providing said different stitch pattern arrangement whereby said sewing machine is capable of selectably creating composite stitch pattern arrangements which are variations of said stored stitch pattern data.

34. An improved household type sewing machine in accordance with claim 1 wherein said first common key selector comprises means for varying said pattern selection in said first mode and for varying said associated positional coordinates of said selected pattern in said second mode.

35. An improved household type sewing machine in accordance with claim 34 wherein said keyboard means further comprises a common display means for displaying information corresponding to said selected pattern in said first mode and corresponding to said associated positional coordinates in said second mode.

36. An improved household type sewing machine in accordance with claim 35 wherein said means for varying said associated positional coordinates comprises means for varying the rate of change of said display thereof on said display means in said second mode.

37. In a household type sewing maching having a bed, a standard rising from said bed, a horizontal arm overhanging said bed, said arm ending with a head, a needle bar means disposed in said head for enabling transverse oscillation thereof relative to the direction of fabric feed in said sewing machine, feed means for adjusting the length and direction of said fabric feed, actuator means for adjusting the transverse position of said needle bar means and the positional displacement of said feed means in response to control signals provided thereto and first static memory means for retrievably storing a first plurality of different predetermined stitch patterns each having associated retrievably stored bight and feed data corresponding to predetermined positional coordinates of said needle bar and feed means for defining associated stitch position coordinates for the stitches comprising said stitich patterns; the improvement comprising microcomputer integrated circuit means operatively connected to said static memory means and to said actuator means for selectively processing said stored stitch pattern data from said static memory means and providing output control signals to said actuator means based on said selectively processed stitch pattern data for controllably adjusting at least the transverse position of said needle bar means, said microcomputer processing means comprising means capable of selectively controllably functionally operating on said stored stitch pattern data in response to input control signals for controllably redefining said stored stitch pattern data for selectively creating output control signals for said actuator means different from the output control signals corresponding to any one of said stored stitch patterns whereby at least the transverse position of said needle bar means may be selectively varied to redefine a statich pattern arrangement different from any one of said stored stitch patterns; and keyboard means operatively connected to said microcomputer means for providing said input control signals to said microcomputer processing means for initiating the selection of at least one stored stitch pattern and the functional operation to be performed on said associated selected stored stitch pattern data for controllably adjusting at least the transverse position of said needle bar means for selectively providing a final stitch pattern arrangement from said plurality of stored stitch patterns, said keyboard means including means for enabling said positional coordinate data to be continuously varied during the sewing of said selected stitch pattern.

38. An improved household type sewing machine in accordance with claim 35 wherein said microcomputer processing means, said common display means and said keyboard means are digital means.

39. In a household type sewing machine having a bed, a standard rising from said bed, a horizontal arm overhanging said bed, said arm ending with a head, a needle bar means disposed in said head for enabling transverse oscillation thereof relative to the direction of fabric feed in said sewing machine, feed means for adjusting the length and direction of said fabric feed, and actuator means for adjusting the transverse position of said needle bar means and the positional displacement of said feed means in response to control signals provided thereto; the improvement comprising static memory means for retrievably storing stitch pattern data capable of providing a plurality of different composite stitch pattern arrangements having associated bight and feed data corresponding to stitch positional coordinates of said needle bar and feed means; microcomputer integrated circuit means operatively connected to said static memory means and to said actuator means for selectively processing said stored stitch pattern data from said static memory means and providing output control signals to said actuator means based on said selectively processed stitch pattern data capable of selectably controllably adjusting the transverse position of said needle bar means and the positional displacement of said feed means, said microcomputer processing means comprising means capable of selectively controllably functionally operating on said stored stitch pattern data in response to input control signals for selectively creating output control signals for said actuator means capable of defining a selected composite stitch pattern arrangement; and keyboard means operatively connected to said microcomputer means for providing said input control signals to said microcomputer processing means for initiating the selection of said stored stitch pattern data and the functional operation to be performed on said selected stored stitch pattern data for selectably controllably adjusting the transverse position of said needle bar means and the positional displacement of said feed means for selectively providing said selected composite stitch pattern arrangement from said stored stitch pattern data, said keyboard means comprising a first common key selector having a plurality of modes for initiating selection of at least any one of a plurality of said stored stitch patterns in a first mode and for varying the positional coordinate data associated with said one selected stored stitch pattern in a second mode for providing said input control signals for enabling said selecting and redefining of said stored stitch pattern for providing said different stitch pattern arrangement whereby said sewing machine is capable of providing stitch pattern arrangements corresponding to said stored stitch patterns per se as well as to selectably creatable variations thereof.

* * * * *